United States Patent [19]

Taniguchi et al.

[11] Patent Number: 5,142,318
[45] Date of Patent: Aug. 25, 1992

[54] CAMERA SYSTEM CAPABLE OF AUTOMATIC FOCUS CONTROL

[75] Inventors: Nobuyuki Taniguchi, Tondabayashi; Norio Ishikawa, Osaka; Yasuaki Akada, Sakai; Takeshi Egawa, Sennan; Kunio Kawamura, Sakai, all of Japan

[73] Assignee: Minolta Camera Co., Ltd., Osaka, Japan

[21] Appl. No.: 748,794

[22] Filed: Aug. 22, 1991

Related U.S. Application Data

[60] Division of Ser. No. 585,935, Sep. 18, 1990, Pat. No. 5,065,176, which is a division of Ser. No. 485,781, Feb. 22, 1990, abandoned, which is a continuation of Ser. No. 402,976, Sep. 5, 1989, abandoned, which is a continuation of Ser. No. 256,082, Oct. 6, 1988, abandoned, which is a continuation of Ser. No. 118,783, Nov. 5, 1987, abandoned, which is a division of Ser. No. 841,219, Mar. 18, 1986, Pat. No. 4,733,262, which is a division of Ser. No. 575,839, Jan. 31, 1984, Pat. No. 4,623,238.

[30] Foreign Application Priority Data

| Feb. 1, 1983 | [JP] | Japan | 58-15860 |
| May 9, 1983 | [JP] | Japan | 58-81533 |
| Jul. 11, 1983 | [JP] | Japan | 58-126433 |
| Jul. 26, 1983 | [JP] | Japan | 58-137371 |

[51] Int. Cl.⁵ ............................................. G03B 13/36
[52] U.S. Cl. ..................................... 354/402; 354/286
[58] Field of Search .............................. 354/400–409, 354/286

[56] References Cited

U.S. PATENT DOCUMENTS

| 4,091,395 | 5/1978 | Kozuki et al. |
| 4,182,563 | 1/1980 | Biber et al. |
| 4,200,378 | 4/1980 | Shenk |
| 4,387,975 | 6/1983 | Araki |
| 4,400,075 | 8/1983 | Tomori et al. |
| 4,410,261 | 10/1983 | Masunaga et al. |
| 4,423,935 | 1/1984 | Eguchi et al. |
| 4,469,417 | 9/1984 | Masunaga et al. |
| 4,473,287 | 9/1984 | Fukuhara et al. |
| 4,474,447 | 10/1984 | Kawabata et al. |
| 4,477,164 | 11/1984 | Nakai et al. |
| 4,482,235 | 11/1984 | Yasakawa et al. |
| 4,483,603 | 11/1984 | Metabi et al. |
| 4,488,798 | 12/1984 | Iida et al. |
| 4,509,842 | 4/1985 | Taniguchi et al. |
| 4,509,846 | 4/1985 | Nakai et al. |
| 4,529,288 | 7/1985 | Nakai et al. |
| 4,537,487 | 8/1985 | Taniguchi et al. |
| 4,540,260 | 9/1985 | Nakano |
| 4,557,579 | 12/1985 | Nakajima |
| 4,560,267 | 12/1985 | Nakai et al. |
| 4,602,861 | 7/1986 | Taniguchi et al. |
| 4,623,238 | 11/1986 | Taniguchi et al. |

FOREIGN PATENT DOCUMENTS

| 54-108628 | 8/1979 | Japan |
| 55-105230 | 6/1980 | Japan |
| 55-127524 | 10/1980 | Japan |

*Primary Examiner*—Russell E. Adams
*Attorney, Agent, or Firm*—Price, Gess & Ubell

[57] ABSTRACT

A camera system with an auto-focusing system includes a camera body and an interchangeable zoom lens. The interchangeable objective lens stores various data to be sent to the camera body for improving automatic focus adjustment, such as an information necessary to convert the detected defocus information into a movement of the driving power source to carry out the automatic focus adjustment. The driving power source in the camera body is controlled in responses to the data from the interchangeable objective lens and the detected focus information, the driving power being transmitted to the interchangeable objective lens. The camera body is further capable of inhibiting the focus adjustment or focus indication in response to a data from the interchangeable objective lens under an unfavorable condition.

4 Claims, 27 Drawing Sheets

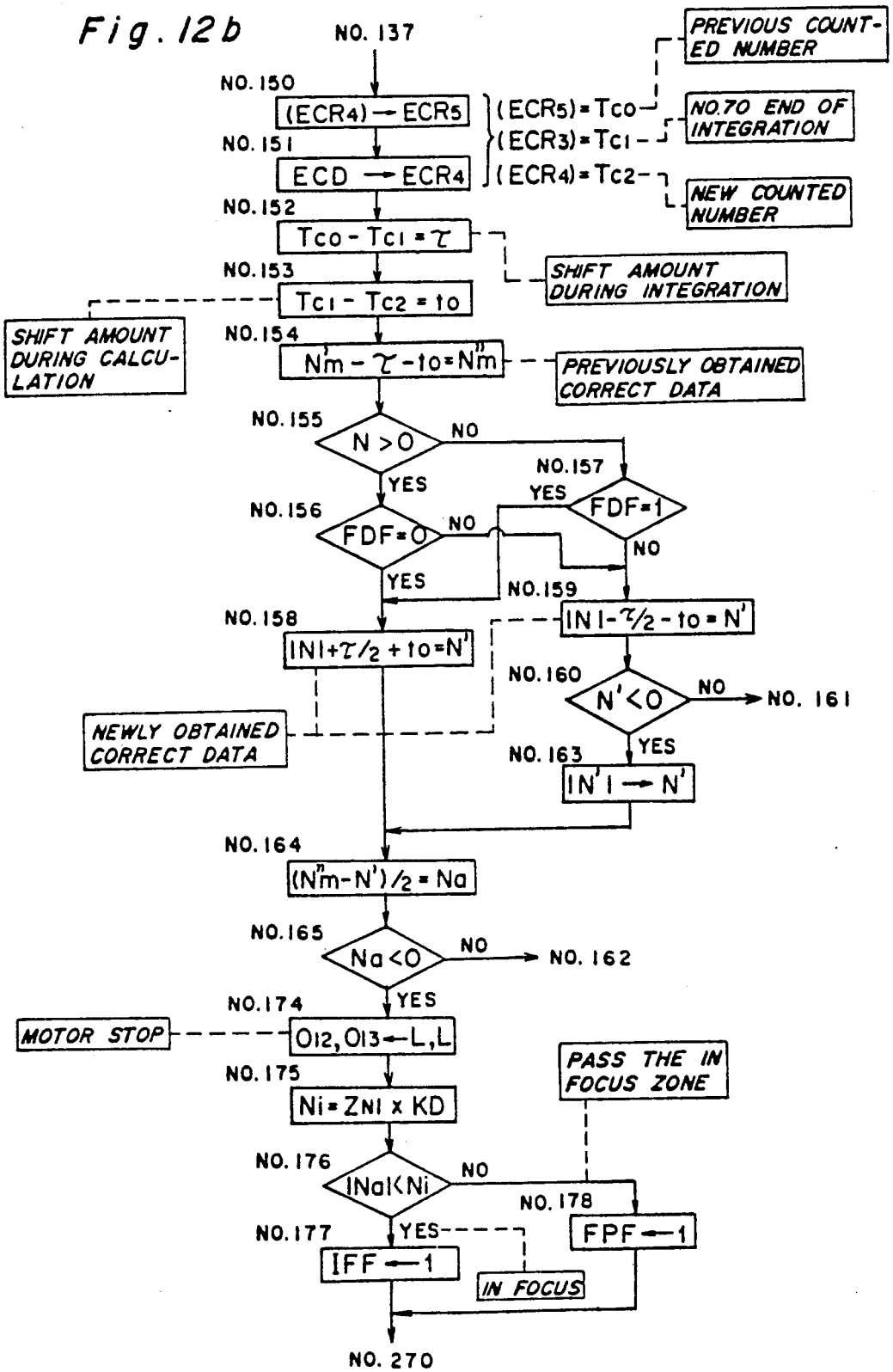

CAMERA SYSTEM CAPABLE OF AUTOMATIC FOCUS CONTROL

This is a division of application Ser. No. 585,935, filed on Sep. 18, 1990, now U.S. Pat. No. 5,065,176 which is a divisional application of Ser. No. 485,781, filed on Feb. 22, 1990, now abandoned which is a continuation of Ser. No. 402,976, filed on Sep. 5, 1989 now abandoned, for a CAMERA SYSTEM CAPABLE OF AUTOMATIC FOCUS CONTROL, which is a continuation of Ser. No. 256,082, filed on Oct. 6, 1988 now abandoned, which is a continuation of Ser. No. 118,783, filed on Nov. 5, 1987 now abandoned, which is a divisional application of Ser. No. 841,219, filed on Mar. 18, 1986 now U.S. Pat. No. 4,733,262 which is a divisional application of Ser. No. 575,839, filed on Jan. 31, 1984 now U.S. Pat. No. 4,623,238.

BACKGROUND OF THE INVENTION

1. Field of the Invention

The present invention relates to a camera system capable of automatic focus control in response to focus detection through an objective lens.

2. Description of the Prior Art

In this field of art there has been disclosed a camera having a focus sensing device responsive to a light transmitted through the objective lens, means for generating a driving power for automatic focus control in response to the focus sensing device, and means for detecting a condition for stopping the generation of the driving power to stop the generation of the driving power on the condition. For example, such a condition corresponds to an in-focus condition, or a condition in which the focus adjustment is brought to one end of its adjustable range before the desired focus adjustment has not been completed.

With respect to the stop of the generation of the driving power on the in-focus condition, there has been known to finish the generation of the driving power when once the in-focus condition is detected, to fix the focus adjustment for a shot. In this manner of automatic focus adjustment, however, there is a problem that the shot would result in a misadjustment of focus if the in-focus condition is erroneously detected. According to another type of automatic focus adjustment in which the generation of the driving power is intermitted during the in-focus condition is being detected for making the focus adjustment automatically follow the change between in-focus and out-of-focus conditions, the quickness of focus adjustment would be insufficient or an unsteady focus adjustment would be caused.

On the other hand, in stopping the generation of the driving power at one end of the focus adjustable range, it has been desired to avoid a possibility that the focus adjustment would erroneously lock at the end of the adjustable range in spite of a fact that the focus adjustment should be properly made within its adjustable range.

SUMMARY OF THE INVENTION

It is an object of the present invention to provide a camera system capable of properly stopping the generation of the driving power for automatic focus control.

It is another object of the present invention to provide a camera system capable of quickly and correctly bringing the automatic focus adjustment into a definite in-focus condition.

It is still another object of the present invention to provide a camera system capable of finishing the generation of the driving power to correctly fix the focus adjustment for a shot.

It is a further object of the present invention to provide a camera system in which a manner of stopping the generation of the driving power for automatic focus adjustment at one end of its adjustable range is improved.

It is a still further object of the present invention to provide a camera system in which the construction necessary to realize the desired stop of the generation of the driving power is simplified.

According to a feature of the present invention, the improvement is characterized by an inclusion of means for causing the focus sensing device to periodically output the focus sensing result during the generation of the driving power to keep the control means for controlling the driving power generation informed of the newest focus sensing result in the course of generating the driving power, and the improvement further comprises means for detecting a condition for stopping the generation of the driving power to stop the generation of the driving power on that condition, and means for confirming the establishment of the condition in response to the focus sensing result with the generation of the driving power completely stopped to determine the necessity of reopening the generation of the driving power in case that the condition is not really established.

According to a specific feature of the present invention, the detected and confirmed condition is the in-focus condition. Or, the condition is that the focus adjustment is brought to one end of its adjustable range although the focus sensing result still requires the focus adjustment toward the same direction beyond the end. In any case, according to the present invention, the focus adjustment is quickly and properly carried out, and the driving power generation once stopped can be reopened if necessary.

According to another feature of the present invention, the driving power generation is temporarily stopped at the first detection of the in-focus condition in the course of focus adjustment, and the in-focus condition is confirmed with the generation of the driving power temporarily stopped to finally finish and fix focus adjustment for a shot. The fixed focus adjustment, accordingly, is extremely correct since the generation of the driving power is reopened to seek a true in-focus condition if the in-focus condition is failed to be confirmed.

According to still another feature of the present invention, the driving power generation for automatic focus control is stopped when a change in defocusing direction is once caught in accordance with the focus sensing result since such a change in defocusing direction is likely occur about the in-focus position. Due to this feature, such an undesirable case is avoided that the direction of focus adjustment is alternately and unsteadily changing about a true in-focus position. Further, at the stopping position, the in-focus condition is confirmed to reopen the generation of the driving power since it is not sure that the driving power generation is stopped on an in-focus condition. Thus, the undesirable state in the focus adjustment is avoided according to the present invention.

According to a further feature of the present invention, a counting means for counting a pulse which is produced at every movement of a movable member by a predetermined degree in response to focus adjustment is provided, a number of pulses to be counted by the counting means being preset in accordance with the focus sensing result. The generation of the driving power is stopped with the count contents found to reach a predetermined number for the purpose of bringing the focus adjustment into the in-focus condition. In addition, the generation of the driving power is also stopped with the count contents discovered to be unchanged for a predetermined period for the purpose of stopping the driving power generation at the end of the focus adjustable range, since it is a sign of a forced stop of the movable member at the end of the focus adjustable range that the count contents of the counter ceases to change through lack of a coming pulse. Thus, one counting means is utilized for dual purposes to simplify the construction necessary to realize the desired stop of the driving power generation.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIGS. 11a, 11b, 11c, 12a, 12b, 12c, 13a, 13b, 13c and 13d show a flow of operations carried out by a microcomputer MC1 shown in FIG. 5;

DESCRIPTION OF THE PREFERRED EMBODIMENT

Figure 4:
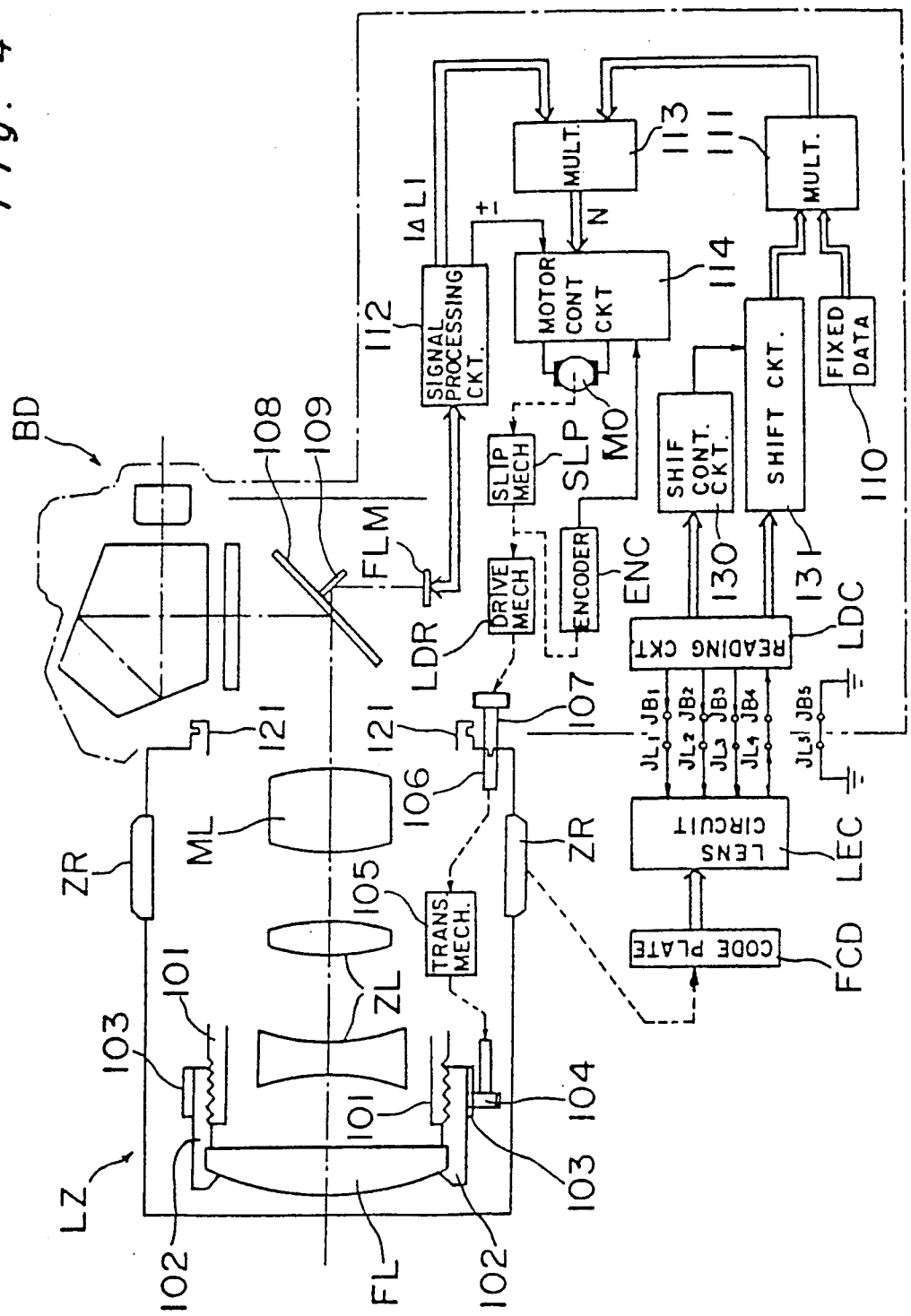
FIG. 4 is a block diagram of a camera system according to the present invention.

Referring to FIG. 4, a block diagram of a camera system having an auto-focus system according to the present invention is shown. In the drawing, parts shown on the left-hand side of a chain line belong to a zoom lens LZ, and parts shown on the right-hand side of the same belong to camera body BD. The zoom lens LZ is an interchangeable lens and is mounted on the camera body BD. The transmission of driving force from body BD to lens LZ is effected by a clutch arrangement 106 and 107 and transmission of electric signals between body BD and lens LZ is effected by terminals JL1-JL5 and terminals JB1-JB5. According to the camera system shown, the light beams reflected or emitted from an object to be photographed path through focusing lens FL of the zoom lens LZ, zooming lens ZL, and master lens ML. The light beams further path through the central half-mirror portion of a reflection mirror 108 provided in the camera body BD, reflect on a sub-mirror 109, and impinges on a light receiving device FLM for the focus detection.

A signal processing circuit 112 is provided to receive signals from light receiving device FLM, and based on such signals, it produces a defocus signal $|\Delta L|$ representing a degree of out of focus and a direction signal representing a direction of out of focus whether it is near focused or far focused. A motor MO is provided to be driven in accordance with these signals and its rotational force is transmitted to the zoom lens LZ through slip mechanism SLP, driving mechanism LDR and clutch 107 provided in the camera body. It is to be noted that the slip mechanism SLP is provided to cut the transmission of rotational force to the driving mechanism thereby preventing the motor MO from being over-loaded such that the slip mechanism SLP slips when a torque above a predetermined level is applied to a shaft after the slip mechanism SLP.

The zoom lens LZ shown has a focus adjustment member 102 for shifting the focusing lens FL. The focus adjustment member 102 is formed with a female-helicoid thread on its inner surface which engages with a male-helicoid thread on the outer surface of a cylinder 101 provided integrally to the lens mount 121. A large gear 103 is fixedly mounted on the peripheral outer surface of the focus adjustment member 102. The large gear 103 is engaged to a small gear 104 which is connected through a transmission mechanism 105 to the clutch 107 provided in the lens. By the above arrangement, the rotational force of the motor MO is transmitted to the focus adjustment member 102 through slip mechanism SLP in the camera body, clutch 107 in the camera body, clutch 106 in the lens, transmission mechanism 105 in the lens, small gear 104 and large gear 103. Then, by the engagement between the male- and female-helicoid threads, the focusing lens FL is shifted in the optical axis direction, thereby effecting the focus adjustment. Also, in order to monitor the amount of shift the focusing lens FL, an encoder ENC is coupled to the driving mechanism in the camera body BD such that the encoder ENC produces a train of pulses with its number corresponding the amount of shift of the lens FL.

When terms are defined as follows:
NM (rot): the number of rotation of the motor MO;
N: the number of pulses from the encoder ENC;
ρ (1/rot): resolving power of the encoder ENC;
μP: rate of speed reduction in mechanical transmission arrangement between the shaft of motor MO and the shaft of encoder ENC;
μB: rate of speed reduction in mechanical transmission arrangement between the shaft of motor MO and clutch 107 of the camera body;
μL: rate of speed reduction in mechanical transmission arrangement between clutch 106 of the lens and large gear 103;
LH (mm/rot): a helicoid lead of the focus adjustment member; and
Δd (mm): amount of shift of the focusing lens FL, following relationships are obtained.

$$N = \rho \cdot \mu P \cdot NM$$

$$\Delta d = NM \cdot \mu B \cdot \mu L \cdot LH$$

Thus, $$\Delta d = N \cdot \mu B \cdot \mu L \cdot LH / (\rho \cdot \mu P). \tag{1}$$

Also, when a relation between the above given Δd and ΔL (mm) representing the amount of shift of the image forming plane when the lens is shifted Δd (mm) is defined as:

$$Kop = \Delta d / \Delta L, \tag{2}$$

a following equation (3) is obtained using equations (1) and (2).

$$N = Kop \cdot \Delta L \cdot \rho \cdot \mu P / (\mu B \cdot \mu L \cdot LH) \tag{3}$$

When terms are defined as:

$$KL = Kop / (\mu L \cdot LH) \tag{4}$$

and $$KB = \rho \cdot \mu P / \mu B. \tag{5}$$

a following equation (6) is obtained.

$$N = KB \cdot KL \cdot \Delta L \tag{6}$$

In the equation (6) given above, ΔL is obtained from the signal processing circuit 112 using the defocus signal |ΔL| and the direction signal. Furthermore, the term KL in equation (4) corresponds to the focal length of the zoom lens as set by the rotational operation of a zooming ring ZR, and is produced from a lens circuit LEC. In other words, a code plate FCD produces data representing the rotated position of the zooming ring ZR, and the produced data are applied to the lens circuit LEC. In the LEC, the received data are used for designating an address at which KL is stored. Data KL are read out serially bit-by-bit and are supplied to a reading circuit LDC in the camera body. Moreover, the term KB in equation (5) is a data determined by the type of camera body, and is produced from a fixed data producing circuit 110.

From reading circuit LDC of the camera body to lens circuit LEC of the lens, electric power is supplied through terminals JB1 and JL1, synchronizing clock pulses are applied through terminals JB2 and JL2, and a read-start signal is applied through terminals JB3 and JL3. Contrary, from lens circuit LEC to reading circuit LDC, data KL are transmitted in series through terminals JL4 and LB4. Now, terminals JB5 and JL5 are connected with each other as a common ground.

The code plate FCD is arranged in a predetermined code pattern so as to produce data corresponding to the rotated position of the zooming ring ZR. The lens circuit includes a memory, such as a ROM, in which various data KL corresponding to various focal length set by the zooming ring ZR are stored at different addresses determined by the code plate FCD. Therefore, when the read-start signal is applied, lens circuit LEC produces bit-by-bit the data KL corresponding to the focal length set by the zooming ring in a synchronized manner with the clock pulses. And, the produced data KL are applied serially through terminals JL4 and JB4 to reading circuit LDC in which the data KL are aligned parallelly.

For the zoom lens having a focusing system in which focusing lens FL is disposed in front of zooming lens ZL, i.e., for the zoom lens of front lens shifting type, the above given amount Kop can be expressed as follows:

$$Kop = f1^2 / f^2, \tag{7}$$

wherein f1 is a focal length of focusing lens FL. Thus, one zoom lens has a wide variation of a value KL. To memorize a wide variation of a value KL, the data of each value KL are defined by bits representing the significant digits and bits representing the floating point coefficient.. For example, if the data is 8-bit long, the upper four bits may be used as a part for designating the floating point coefficient, and the lower four bits may be used as a part for designating the significant digits. In the preferred embodiment shown in FIG. 4, a shift circuit 131 receives lower four bits of the data KL for specifying the significant digits, and a shift control circuit 130 receives upper four bits of the data KL for specifying the floating point coefficient. The significant digits established in the shift circuit 131 is shifted to change its floating point in accordance with the data from the shift control circuit 130. With this arrangement, shift circuit 131 can cover a widely changing value of the data KL.

A multiplication circuit 111 is provided to receive data KL from shift circuit 131 and data KB from fixed data producing circuit 110, and it carries out a multiplication $KL \times KB = K$. Another multiplication circuit 113 receives defocus signal |ΔL| from signal processing circuit 112 and data K from multiplication circuit 111, and it carries out a multiplication $K \times |\Delta L| = N$, thereby calculating the number of pulses to be detected by encoder ENC. A motor control circuit 114 drives motor MO in a clockwise or counterclockwise direction depending on the direction signal from the signal processing circuit 112. The amount of rotation of the motor MO is controlled by the data N obtained from multiplication circuit 113 and the pulses obtained from the encoder ENC, such that motor MO stops when N pulses are produced from encoder ENC. When this is done, focusing lens FL is shifted a distance Δd towards an in-focus position.

According to the above description, the data K is produced by the multiplication of data KL from the lens by the data KB which is intrinsic to each type of camera body and is stored in fixed data producing circuit 110 in the camera body. Instead of the above steps, the data K can be obtained through other methods.

For example, one method is to arrange zoom lens LZ such that lens circuit LEC produces $Kl=KL\times KBl$ corresponding to a standard type of camera body in response to the setting of focal length. When this arrangement is employed, it is not necessary to provide fixed data producing circuit 110 and multiplication circuit 111 in the standard type camera body such that the data Kl from the reading circuit LDC are applied directly to multiplication circuit 113. But when this zoom lens is mounted no a non-standard type camera body having data KB2 ($\neq$KB1), the non-standard type camera body must have fixed data producing circuit 110 and multiplication circuit 111 such that fixed data producing circuit 110 produces data KB2/KB1 and multiplication circuit 111 calculates $$K2=K1\times KB2/KB1=KL\times KB2,$$

thereby obtaining a wanted data KL×KB2.

According to another example, every lens may be stored with various data, $K1=KL\times KB1$, $K2=KL\times KB2, \ldots$, and $Kn=KL\times KBn$ for the all the types of camera body. And when in use, the camera body connected to that lens may selectively pick one data corresponding to the camera body. This can be accomplished by sending all the data in the lens to the camera body so that the necessary data are selected in the camera body, or by sending data representing the type of camera to the lens, and transmitting only the necessary data from the lens to the camera body. If this arrangement is employed, it is not necessary to provide fixed data producing circuit 110 and multiplication circuit 111.

In the foregoing description, a camera system having an auto-focus system according to the present invention is described from the view point of hardwares, but according to a preferred embodiment, various functions of the circuits are accomplished by microcomputers as will be described below.

In the following description, a system is described in which only a standard type camera body with KB1 is available. And, in this case, a data KL×KB1 is stored in the lens and sent to the camera body, such data KL×KB1 being represented by simply KD hereinafter.

Figure 5:
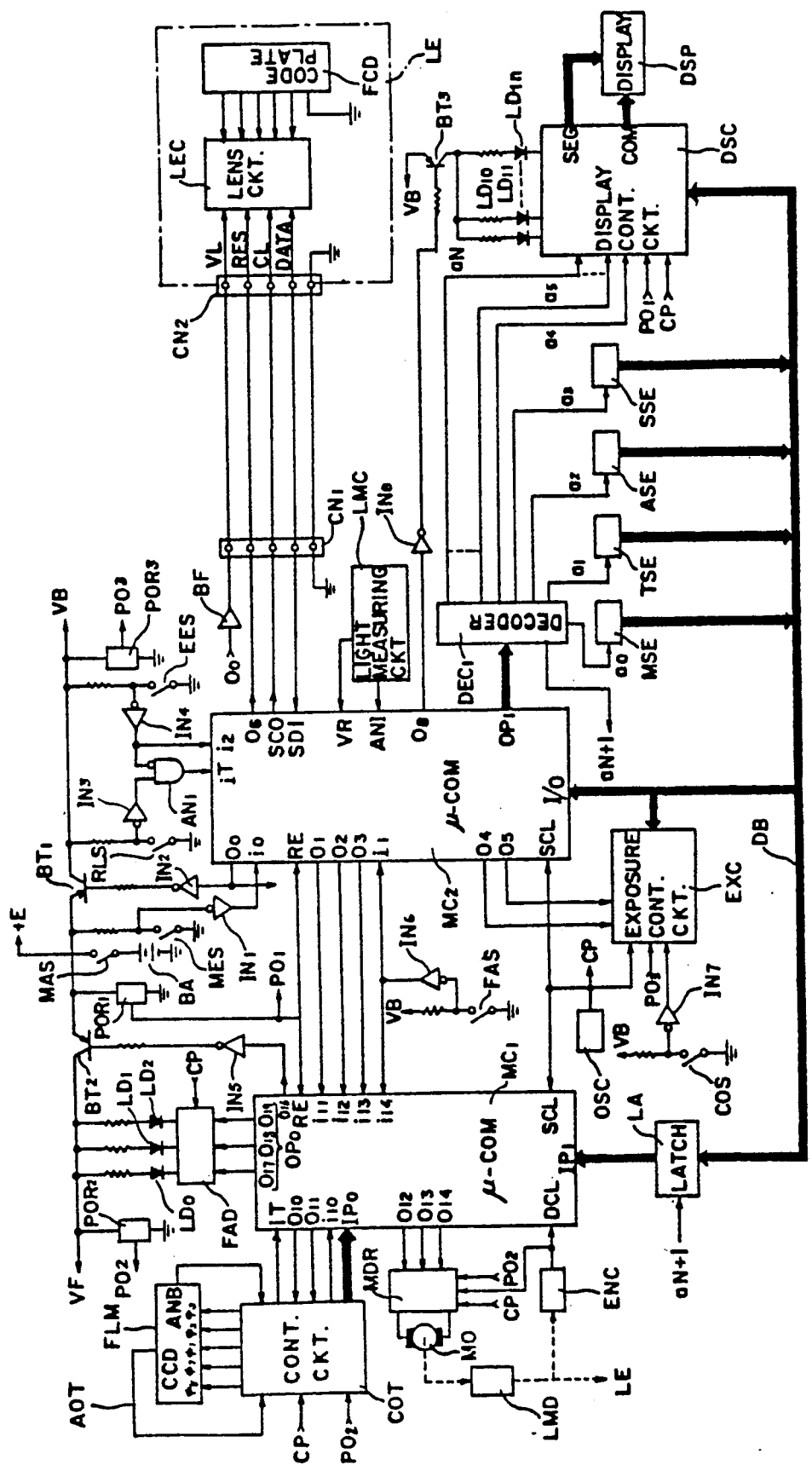
FIG. 5 is a circuit diagram of a camera system according to the present invention.
Figure 6A:
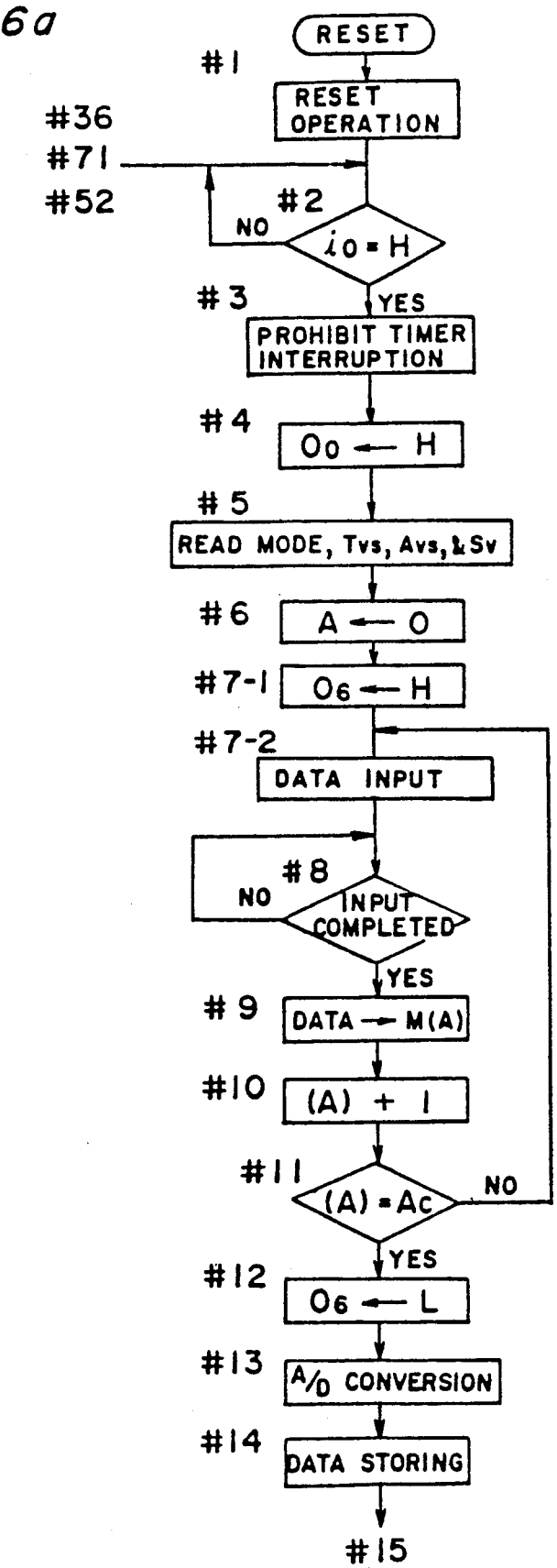
FIGS. 6a, 6b, 6c and 6d taken together show a flow chart of operations carried out by a microcomputer MC2 shown in FIG. 5.
Figure 6B:
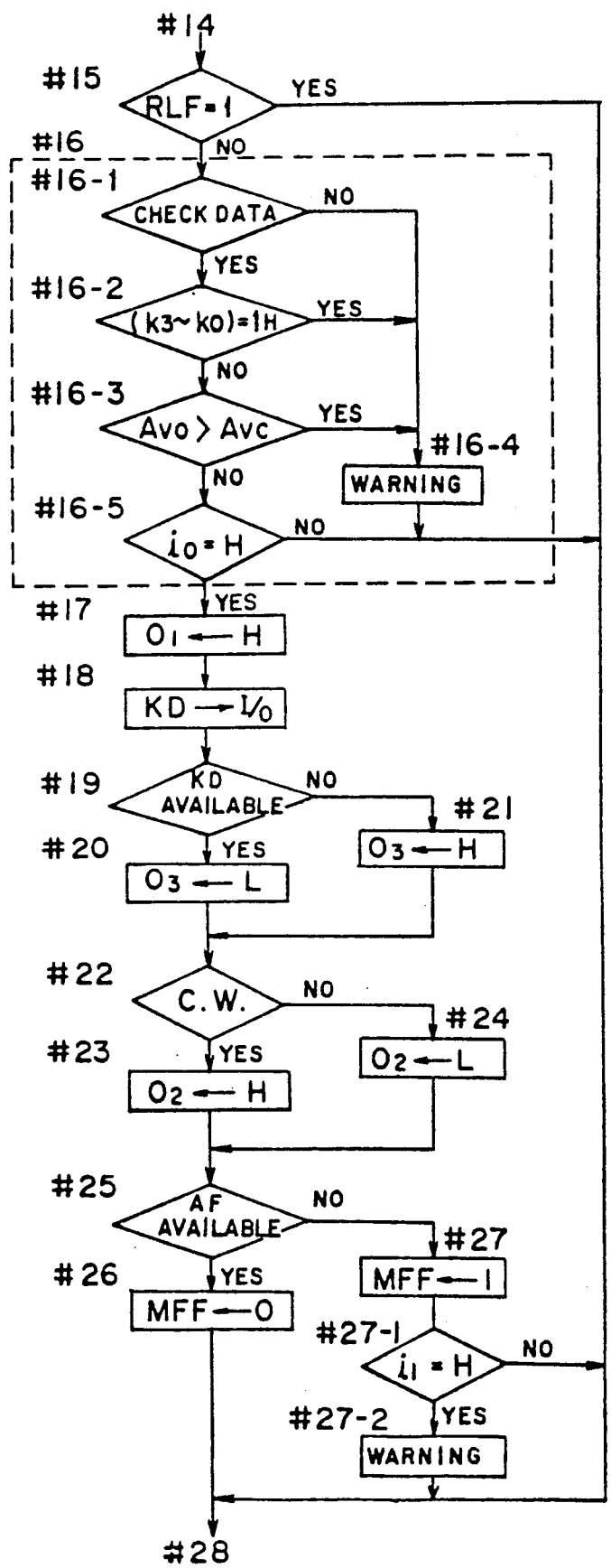
Figure 6C:
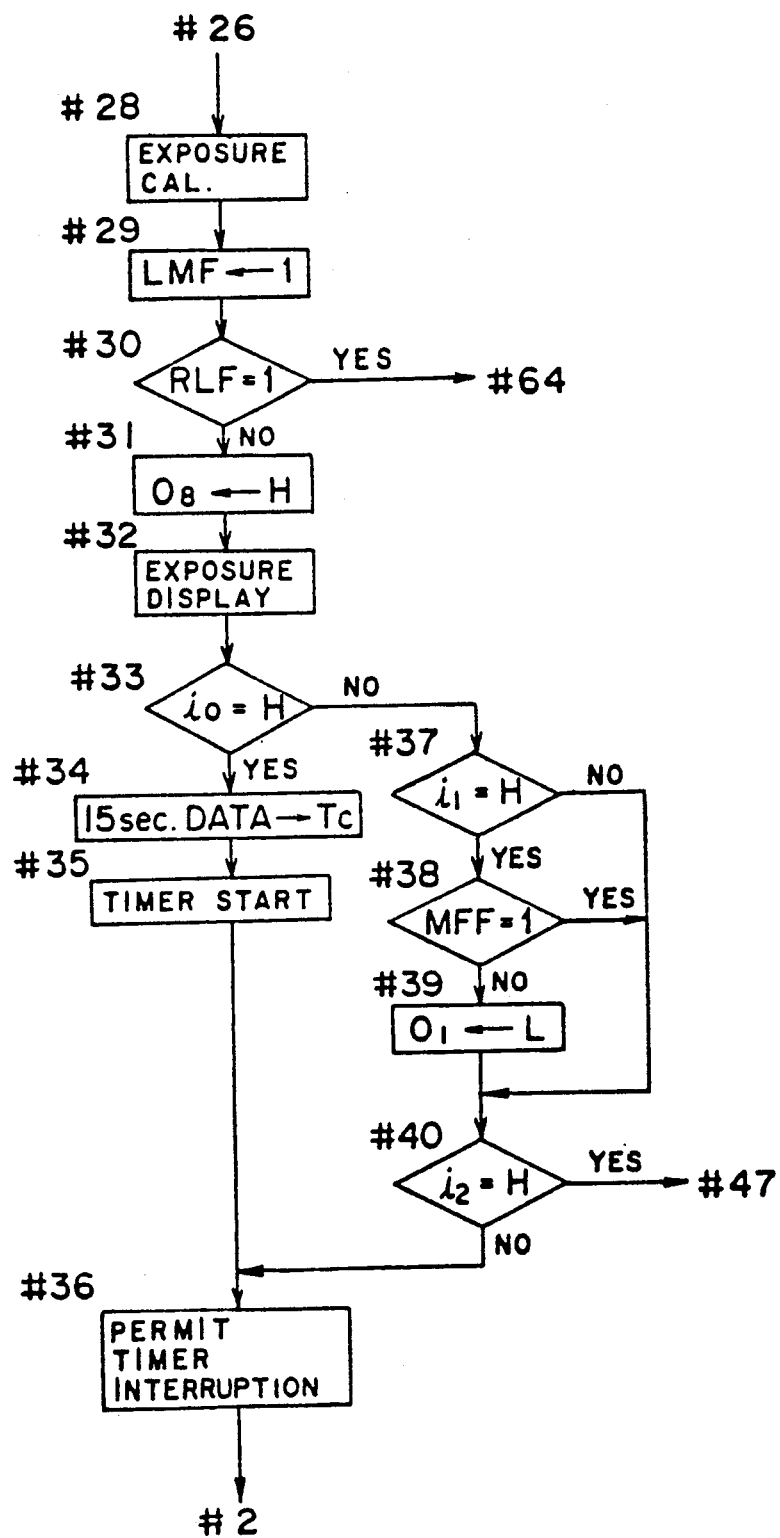
Figure 6D:
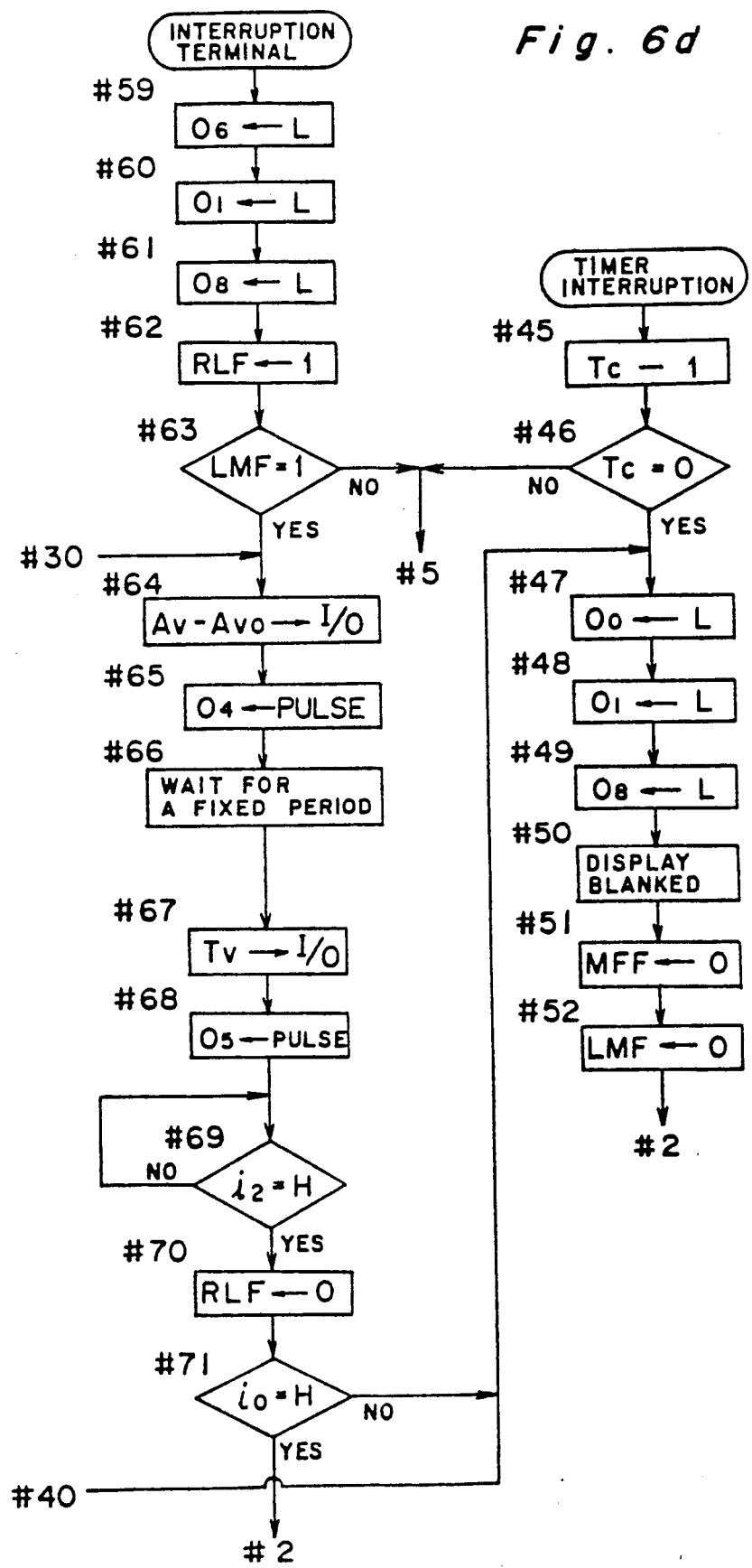

Referring to FIG. 5, a block diagram of a circuit provided in the camera body is shown, together with a block diagram of a circuit provided in the lens, which is enclosed in a chain line LE. The circuit in the camera body BD is connected to the circuit in the lens through terminal arrays CN1 and CN2 so as to send various data from lens LE to camera body BD. When a power switch MAS turns on, electric power is supplied through a power line +E to each of power-on reset circuit POR1, microcomputers MC1 and MC2, display control circuit DSC, oscillator OSC, inverters IN1 to IN8, and AND gate AN1. Upon power supply, power-on reset circuit POR1 produces a reset signal PO1, thereby resetting microcomputers MC1 and MC2 and display control circuit DSC.

Microcomputer MC2 is provided to govern the sequence of the overall operation of the camera system, and its operation will be described later in connection with a flow chart shown in FIG. 6. Microcomputer MC1 is provided to sequentially carry out the focus adjustment operation in response to the control signals from the microcomputer MC2, and its operation will be described later in connection with a flow chart shown in FIGS. 11 to 13.

Figure 7:
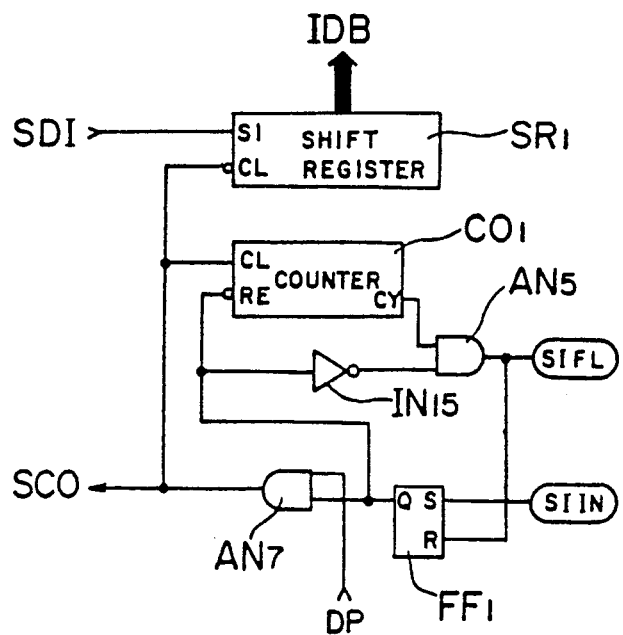
FIG. 7 is a circuit diagram of a serial data input portion SDI of microcomputer MC2 shown in FIG. 5.
Figure 8:
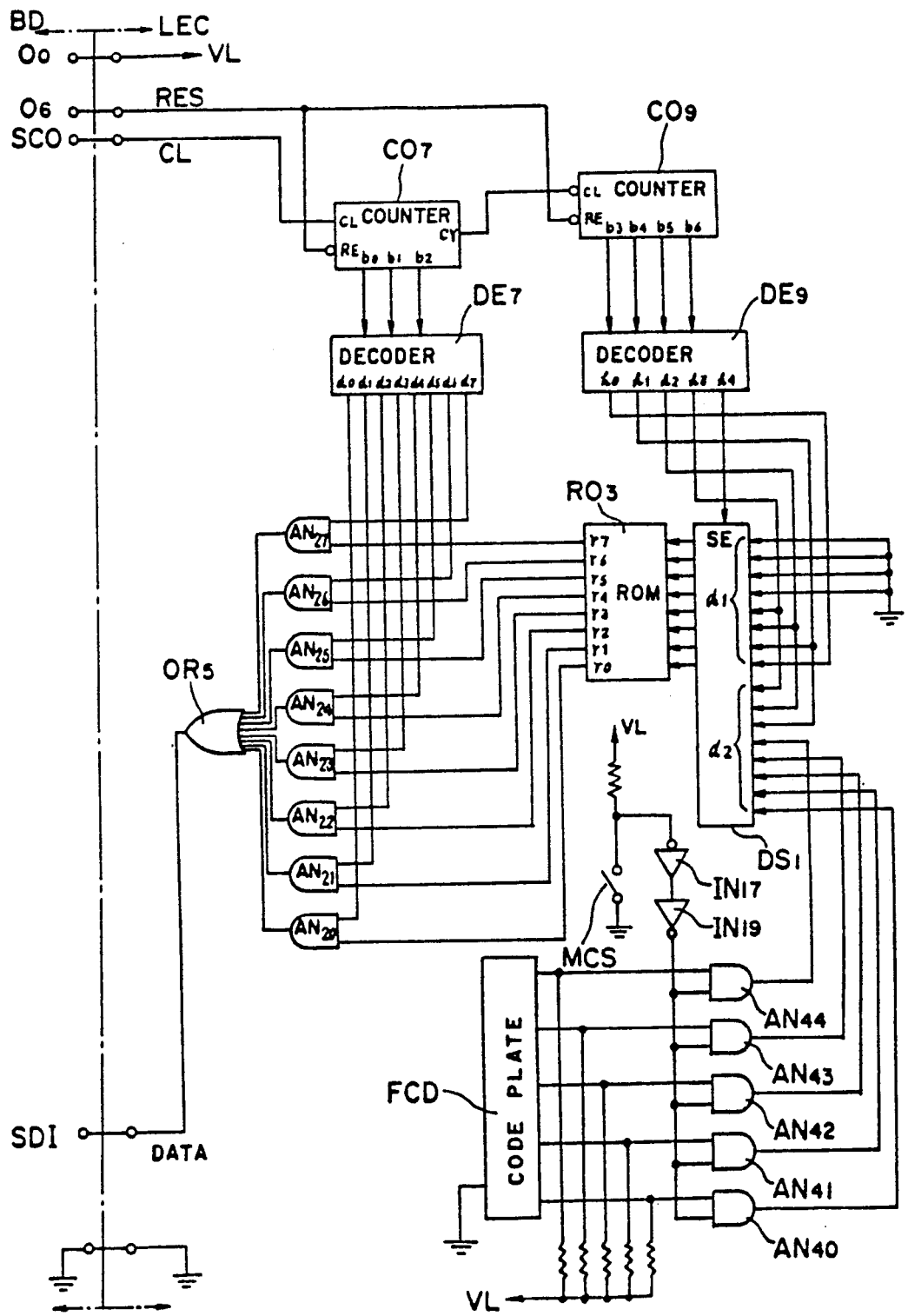
FIG. 8 is a circuit diagram of an interchangeable lens to be mounted on the camera body.

A light measuring switch MES turns on when a shutter release button (not shown) is depressed to its halfway. And when light measuring switch MES turns on, microcomputer MC2 receives HIGH to its input i0 through inverter IN1. In response to this, microcomputer MC2 produces HIGH from its output 00, and thus inverter IN2 produces LOW, thereby turning a transistor BT1 on. By the turn on of transistor BT1, electric power is supplied through a power line VB to each of power-on reset circuit POR3, light measuring circuit LMC, decoder DEC1, transistor BT3 for driving light emitting diodes, film sensitivity setting device SSE, aperture setting device ASE, exposure time setting device TSE, exposure control mode setting device MSE, exposure control device EXC, and latch circuit LA. Upon power supply through power line VB, power-on reset circuit POR3 produces a reset signal P03, thereby resetting exposure control device EXC. Furthermore, the HIGH from output 00 of microcomputer MC2 is applied through buffer BF and terminal arrays CN1 and CN2 to power line VL, thereby providing power to circuit LEC in the lens LE. Other than the terminals for the power supply, the terminal arrays CN1 and CN2 have other terminals, which are: signal transmission terminals connected to output 06 of microcomputer MC2 for releasing the reset condition of lens circuit LEC; clock transmission terminals for transmitting synchronizing clock pulses from clock output SCO of microcomputer MC2; data input terminals for inputting data from lens LE to serial data input SDI of microcomputer MC2; and common earth terminals. A circuit arrangement of serial data input of microcomputer MC2 is shown in FIG. 7, and circuit arrangement of circuit LEC of lens LE is shown in FIG. 8.

Still referring to FIG. 5, a light measuring circuit LMC provides measured-light signal in an analog form to analog input ANI of microcomputer MC2, and a reference voltage for the D-A conversion to a reference voltage input VR of microcomputer MC2. Accordingly, using the reference voltage from light measuring circuit LMC, microcomputer MC2 converts the measured-light signal applied to input ANI from analog form to digital form.

Display control circuit DSC receives various data through data bus DB and displays exposure control values through liquid crystal display portion DSP and, also displays light emitting diodes LD10 to LDln for the warning and other purposes. An output 08 of microcomputer MC2 continues to produce HIGH from the turn on of light measuring switch MES until the start of exposure control operation of the camera, and by an inverter IN8, transistor BT3 enables light emitting diodes LD10 to LDln to emit light only within this period.

A decoder DEC1 receives signals from output port OP1 of microcomputer MC2 and produces output signals from its outputs a0 to aN+1 for indicating which one of devices MSE, TSE, ASE and SSE, and circuits DSC and LA should carry out data transmission with microcomputer MC2 through data bus DB. For example, when microcomputer MC2 produces from output port OP1 a particular data for effecting exposure control mode setting device MSE, output a0 produces HIGH and other outputs a2 to aN+1 produce LOW, whereby microcomputer MC2 reads data of exposure control mode from exposure control mode setting device MSE through data bus DB and input/output port I/0. In a similar manner, when it is necessary to read data of set aperture value, output a2 produces HIGH. Furthermore, when sending display data to exposure control circuit DSC, one of outputs a4 to aN produces HIGH, depending on the type of data to be sent. Also, when sending a conversion coefficient data KD of a lens, which will be described in detail later, first input/output port I/0 produces conversion coefficient data through data bus DB for a period of time, and within this period of time, a particular data is produced from output port OP1 so that output aN+1 produces a pulse for effecting latch circuit LA to latch the conversion coefficient data.

Upon application of HIGH to interruption signal input iT of microcomputer MC2, exposure control device EXC starts an exposure control operation described below. For this purpose, release circuit, mirror drive circuit, aperture control circuit and exposure time control circuit are provided. When output 04 of microcomputer MC2 produces a pulse, exposure control device EXC receives and intakes F stop-down step data on data bus DB, and thereafter, actuating the release circuit to start the exposure control operation. After a certain period of time from the start of exposure control operation, microcomputer MC2 produces exposure time data through data bus DB, and also a pulse from its output 05. Accordingly, the exposure control device EXC intakes exposure time data, and the mirror drive circuit is so operated as to flip up the reflection mirror. Furthermore, the aperture control circuit is so operated as to reduce the aperture size in accordance with the F stop-down step data. When the reflection mirror flips up completely, a leading shutter starts to scan. At the same time, a count switch COS turns on to actuate exposure time control circuit, thereby start counting a time corresponding to exposure time data. When the time counting ends, a trailing curtain starts to scan and, thereafter, the aperture opens to its maximum available size. Then, the reflection mirror flips down to complete one exposure control operation.

A release switch RLS closes when the release button (not shown) is depressed all the way. When release switch RLS closes, inverter IN3 produces HIGH, which is applied to one input of AND gate AN1, thereby enabling AND gate AN1. A switch EES closes when the exposure control operation completes, and it opens when an exposure control mechanism (not shown) is charged to an operable condition. A signal representing on and off conditions of this switch is applied through inverter IN4 to input i2 of microcomputer MC2 and also to the other input of AND gate AN1. The output of AND gate AN1 is connected to interruption signal input iT of microcomputer MC2. Therefore, when the exposure control mechanism is not charged, AND gate AN1 is held in a disable condition, thereby producing LOW from AND gate AN1 even when release switch RLS closes. In this case, no interruption signal will be applied and, therefore, no exposure control operation will be started. On the contrary to this, when the exposure control mechanism is charged, AND gate AN1 is held in an enable condition, thereby producing HIGH from AND gate AN1 when release switch RLS turns on. Thus, the interruption signal is applied to interruption input iT of microcomputer MC2, whereby the microcomputer MC2 immediately starts the exposure control operation.

Outputs 01, 02 and 03 of microcomputer MC2 are connected, respectively, to inputs i11, i12 and i13 of microcomputer MC1. Output 01 produces HIGH, when it is necessary to carry out a focus detection by microcomputer MC1, and LOW when the focus detection is not needed. Output 02 produces HIGH, when the mounted lens is a type in which the focusing lens is shifted forward when the motor is driven clockwise, and LOW, when the mounted lens is a type in which the focusing lens is shifted forward when the motor is driven counterclockwise. Output 03 produces LOW when the mounted lens is a type in which the focus adjustment is carried out only by a system wherein the focusing lens is driven towards an in-focus position in accordance with signals representing degree and direction of out-of-focus (such a system is disclosed in U.S. Pat. No. 4,209,241 in detail and, hereinafter, referred to as a predictor system). And, output 03 produces HIGH when the mounted lens is a type in which the focus adjustment is carried out by the predictor system in combination with a system wherein the focusing lens is driven towards an in-focus position in accordance with a signal (front-focus condition, rear-focus condition, or in-focused condition) representing the direction of out-of-focus (such a system is disclosed in U.S. Pat. No. 4,303,321 and, hereinafter referred to as a trinomial indication system).

A switch FAS is a mode selecting switch operated manually. When it closes, AF mode is selected. Under AF mode, the focus adjustment is carried out automatically such that the focusing lens is shifted towards in-focus position in accordance with the result of focus detection. When switch FAS opens, FA mode is selected. Under FA mode, the focus adjustment is carried out manually in accordance with the display indicating the result of focus detection. A signal representing on and off conditions of switch FAS is applied through inverter IN6 to input i1 of microcomputer MC2 and also to input i14 of microcomputer MC1.

Output 016 of microcomputer MC1 is connected through inverter IN5 to the base of transistor BT2. Therefore, when output 016 produces HIGH, transistor BT2 conducts to supply power to each one of power-on-reset circuit P02, light receiving device FLM for the focus detection, light receiving device FLM control circuit COT, motor drive circuit MDR, encoder ENC, light emitting diode drive circuit FAD and power line VF. By this power supply, power-on-reset circuit P02 produces reset signal P02.

Figure 9:
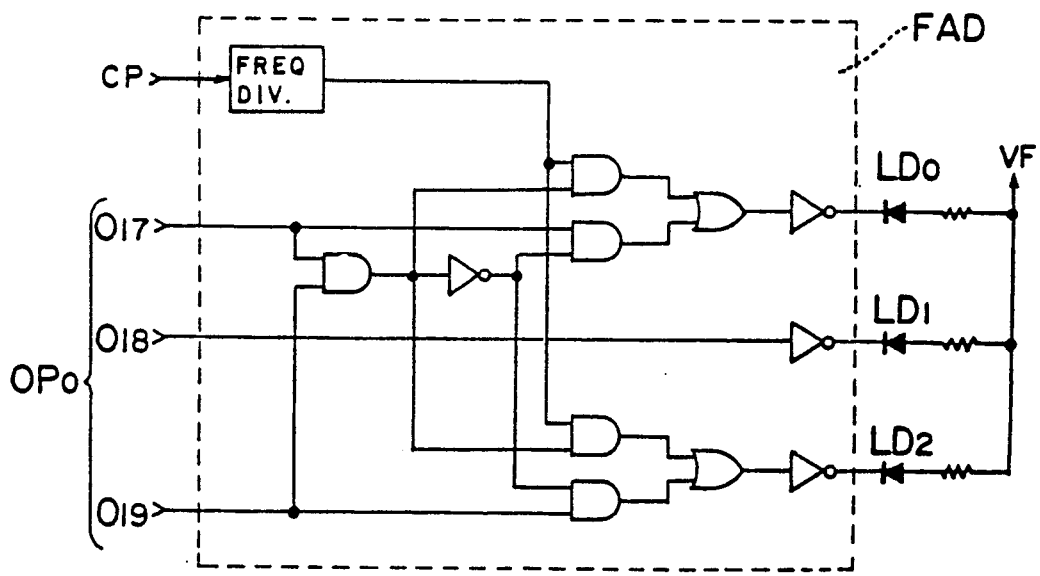
FIG. 9 is a circuit diagram of a light emitting diode driving circuit FAD controlled by microcomputer MC1.

Referring to FIG. 9, an example of light emitting diode drive circuit FAD is shown. Based on input signals from output port OP0 of microcomputer MC1, i.e., outputs 017, 018 and 019, circuit FAD drives light emitting diodes LD0, LD1 and LD2. More specifically, when either one of outputs 017, 018 and 019 produces HIGH, a corresponding one of light emitting diodes LD0, LD1 and LD2 is lit. When the light emitting diode LD0 is lit, it indicates the front-focus condition. When the light emitting diode LD1 is lit, it indicates the in-focused condition. And when the light emitting diode LD2 is lit, it indicates the rear-focus condition. Furthermore, when both outputs 017 and 018 produce HIGH at the same time, light emitting diodes LD0 and LD2 blink on and off repeatedly and simultaneously in accordance with clock pulses CP from oscillator OSC, thereby indicating that it is impossible to carry out the focus detection. Various operating conditions of light emitting diodes LD0, LD1 and LD2 will be shown in Table 1 below.

TABLE 1

| Focus detection | OP0 | LD0 | LD1 | LD2 | Display |
|---|---|---|---|---|---|
| Non-operating | 0 0 0 | OFF | OFF | OFF | |
| Front-focus | 1 0 0 | ON | OFF | OFF | |
| Rear-focus | 0 0 1 | OFF | OFF | ON | |
| In-focused | 0 1 0 | OFF | ON | OFF | ○ |
| Detection impossible | 1 0 1 | Blinking | OFF | Blinking | |

Light receiving device FLM is defined by a CCD (Charge Coupled Device) having a plurality of light receiving elements for the focus detection. Control circuit COT so operates as to drive the CCD in accordance with the signal from the microcomputer MC1, to carry out the A-D conversion of output signals from the CCD, and to transmit the converted output signals to microcomputer MC1.

To start the integration operation in CCD FLM, microcomputer MC1 produces a pulse from its output 010 to control circuit COT, and to forcibly stop the integration operation in the CCD, microcomputer MC1 produces a pulse from its output 011 to control circuit COT. When the integration operation is completed in CCD FLM, control circuit COT produces a pulse which is applied to interruption input iT of microcomputer MC1. When the A-D conversion for each light receiving element in CCD FLM is completed, control circuit COT produces a pulse which is applied to input i10 of microcomputer MC1. And, each A-D converted data is applied to input port IP0 of microcomputer MC1. Furthermore, from control circuit COT, the CCD receives a reset signal to its input $\phi R$, a transfer command signal to its input $\phi T$, transfer clock pulses to its inputs $\phi 1$, $\phi 2$ and $\phi 3$, and a reference voltage to its terminal ANB. And, control circuit COT receives from terminal ANB of the CCD a voltage signal representing a light amount received by a receiving element for monitoring, and from terminal AOT of the CCD charged voltage from each light receiving elements in the CCD. A detailed circuit arrangement of control circuit COT will be described later in connection with FIGS. 17 and 18.

Here, a brief description on operations of CCD FLM, control circuit COT and microcomputer MC1 is given. In accordance with the integration start signal from output 010 of microcomputer MC1, control circuit COT sends a reset signal $\phi_R$ to CCD FLM, thereby resetting the CCD, and at the same time, provides a reference voltage to CCD FLM through the terminal ANB. In each light receiving element of CCD FLM, the charge gradually increases in accordance with the received light rays and, accordingly, a voltage level at terminal ANB decreases gradually. When the voltage level at the terminal ANB is reduced to a predetermined level, control circuit COT produces a transfer command signal $\phi_T$ to CCD, so that the charge in each light receiving element in the CCD is transferred to a transfer gate provided in the CCD, and at the same time, control circuit COT provides an integration completion signal to interruption input iT of microcomputer MC1. Then, in a synchronized manner with clock pulses applied to inputs $\phi 1$, $\phi 2$ and $\phi 3$ of the CCD, control circuit COT receives charges at the transfer gate of the CCD, and converts it from analog form to digital form. When one A-D conversion for the charge in one light receiving element in CCD completes, the control circuit COT provides an A-D completion signal to input i10 of microcomputer MC1. In response to the A-D completion signal, microcomputer MC1 reads A-D converted data from control circuit COT through input port IP0. This reading operation is repeated for a number of times equal to the number of light receiving elements in the CCD, and when the final A-D converted data are read, microcomputer MC1 ends the transfer of data from CCD to control circuit COT.

It is to be noted that when microcomputer MC1 receives no interruption signal within a predetermined period of time after the start of integration, it produces from its output 011 a pulse which forcibly stops the integration in the CCD. In response to this pulse, control circuit COT provides the transfer command signal to input $\phi T$ of the CCD and, at the same time, provides an interruption signal to microcomputer MC1, thereby carrying out the above described A-D conversion and data transfer.

Motor drive circuit MDR is provided to drive motor MO in accordance with signals from outputs 012, 013 and 014 of microcomputer MC1. When output 012 produces HIGH, motor MO can rotate clockwise, when output 013 produces HIGH, motor MO can rotate counterclockwise, and when both outputs 012 and 013 produce LOW, motor MO stops. Furthermore, when output 014 produces HIGH, motor MO can be driven at a high speed and, when it produces LOW, motor MO can be driven at a low speed. Since the detail of motor drive circuit MDR is not necessary to understand the present invention, and it is known through Japanese Patent Application Laid-open No. 58-154015, assigned to the same assignee as the present application, its detailed description is omitted for the sake of brevity.

Encoder ENC is provided for monitoring the amount of drive effected by transmission mechanism LMD provided in the camera body to transmit the driving force of motor MO and is defined, e.g., by a photocoupler which produces a train of pulses which is in relation to the above-mentioned amount of drive. The pulses from encoder ENC are applied to clock input DCL of microcomputer MC1 in which the number of pulses are counted automatically. The counted value ECD will be used in the operation of microcomputer MC1 for the counter interruption, as well be described later with reference to the flow charts. Furthermore, the pulses are also applied to motor drive circuit MDR so as to control the speed of motor MO in accordance with the pulse width.

Referring to FIGS. 6a, 6b, 6c and 6d, a flow chart for the operation of microcomputer MC2 is shown. The operation of microcomputer MC2 can be roughly divided into three flows as described below.

The first flow, which is the main flow, starts from step #1 upon closure of power switch MAS. In the first flow, in response to the closure of light measuring switch MES (step #2), the procedures of: power supply (step #4) to the circuits other than the circuits for the focus adjustment; reading (step #5) exposure control information set in camera body BD; reading (steps #6-#12) data from lens LE; reading (steps #13 and #14) measured light amount; automatic setting (steps #16-#27) under AF or FA mode; calculation (step #28) for the exposure control values; and display (step #31 and #32) are repeated.

The second flow, which is a timer interruption flow, starts from step #45. In the second flow, in response to a timer signal produced periodically from a timer incorporated in microcomputer MC2, the above-mentioned main flow is carried out for a predetermined time (such as 15 seconds) after the opening of light measuring switch MES.

The third flow, which is a release interruption flow, starts from step #59. In the third flow, in response to the closure of release switch RLS, exposure control operations for the camera are carried out. The detail of these three flows will be given hereinbelow.

In response to the closure of power switch MAS, power-on reset POR1 produces a reset signal PO1. By this reset signal PO1, microcomputer MC2 carries out a reset operation at step #1 in the main flow. Then, when input i0 receives HIGH by the closure of light measuring switch MES, the program advances from step #2 to step #3 at which the timer interruption is prohibited, and thereafter, output 00 produces HIGH at step #4. Accordingly, transistor BT1 conducts to supply power to power supply line VB in the camera body and also through buffer BF to power supply line VL in interchangeable lens. Then, at step #5, data from each one of exposure control mode setting device MSE, exposure time setting device TSE, aperture setting device ASE, and film sensitivity setting device SSE, are sequentially applied through data bus DB to input and output port I/O.

During steps #6 to #12, "0" is set in register A (step #6), output 06 produces HIGH, and the reset condition of lens circuit LEC is released (step #9). Then, "1" is added to register A (step #10). And, it is decided whether the content of register A has reached a predetermined amount, Ac. If (A)≠Ac ((A) means the content of register A.), the program returns back to step #7-2 to read next data. After repeating the reading operation for a predetermined number of times, (A) becomes equal to Ac, which means that all the necessary data from lens LE have been read. Thus, output 06 produces LOW at step #12 to reset the lens circuit LEC.

Referring to FIGS. 7 and 8, the manner for carrying out the data reading from the lens LE is explained in detail. FIG. 7 shows an input structure of microcomputer MC2 for receiving serial data applied to its input SDI from the lens LED in a synchronized relation with clock pulses DP produced from output SCO. As an example, a manner in which the microcomputer MC2 receives 8-bit long data to its input SDI from lens LE is described. When microcomputer MC2 produces input command signal SIIN for start receiving serial data from lens LE, flip-flop FF1 is changed to set condition, thereby releasing the reset condition of 3-bit binary counter CO1 and, at the same time, enabling an AND gate AN7. Then, clock pulses DP from a frequency divider (not shown) provided in the microcomputer MC2 are transferred through AND gate AN7 and are sent out from output SCO to lens circuit LEC in the lens LE. The clock pulses DP are also applied to counter CO1 and shift register SR1 at respective clock terminals CL. In response to the negative edges of clock pulses DP, shift register SR1 stores 8-bit long data bit-by-bit from lens LE through input SDI, while counter CO1 counts up. When counter CO1 receives the eighth clock pulse, its carry terminal CY produces HIGH until it receives the ninth clock pulse. Before receiving the ninth clock pulse, shift register SR1 completes reading the 8-bit long data. The carry terminal CY of counter CO1 is connected to one input of an AND gate AN5, while the other input of AND gate AN5 is connected through an inverter IN15 to AND gate AN7. Thus, during a pulse interval between eighth and ninth pulses, AND gate AN5 produces HIGH, thereby setting a flag SIFL representing the completion of one data reading and, at the same time, resetting flip-flop FF1. Thus, counter CO1 is reset producing LOW from carry terminal CY, and AND gate AN7 is disabled. Now, it is ready for the next operation. By the flag SIFL, the data stored in shift register SR1 is transferred through a data bus IDB, provided inside microcomputer MC2, to a register M(A).

While the above operation is carried out in the microcomputer MC2, the following operation is carried out in lens circuit LEC. Referring to FIG. 8, when microcomputer MC2 produces HIGH from its output 06, counters CO7 and CO9 are released from their reset condition, thereby enabling these counters CO7 and CO9 to count clock pulses DP from output SCO of microcomputer MC2. The counter CO7, which is a 3-bit binary counter, counts the clock pulses DP in response to respective positive edges, and when it receives the eighth clock pulse, its carry terminal CY produces HIGH until it receives the positive edge of ninth clock pulse. The counter CO9, which is a 4-bit binary counter, is responsive to the negative edge of the pulse from the carry terminal CY of the counter CO7, thereby it counts pulses from the carry terminal CY of counter CO7. Therefore, counter CO9 count up by "1" in response to the positive edge of the first pulse of eight consecutive clock pulses DP.

The counter CO9 produces a 4-bit data representing the counted amount, and the 4-bit data is applied to a decoder DE9, which then changes the 4-bit data to 5-bit data. This 5-bit data is applied to a data selector DS1 which, by using the 5-bit data, produces an 8-bit data for addressing a ROM R03. A relationship among the 4-bit data from counter CO9, the 5-bit data from decoder DE9, 8-bit data from data selector DS1 and 8-bit data produced from ROM R03 is shown in Tables 2 and 3, in which Table 2 shows a relationship when the mounted lens is a focal length fixed type, and Table 3 shows a relationship when the mounted lens is a zoom lens.

TABLE 2

| CO9 outputs | DE9 outputs | DS1 outputs | RO3 outputs |
|---|---|---|---|
| 0000 | 00000 | 00000000 | Check data (01010101) |
| 0001 | 00001 | 00000001 | Avo |
| 0010 | 00010 | 00000010 | Avmax |
| 0011 | 00011 | 00000011 | Measurement difference* |
| 0100 | 00100 | 00000100 | Rotation direction, KD change |
| 0101 | 00101 | 00000101 | Focal length |
| 0110 | 00110 | 00000110 | ΔAv (00000000) |
| 0111 | 00111 | 00000111 | KD |
| 1000 | 01000 | 00001000 | ϕϕϕϕϕϕϕϕ** |
| 1001 | 01001 | 00001001 | ϕϕϕϕϕϕϕϕ |

Note *Measurement difference is fully open aperture light measurement error depending on individual objective lens, which is explained in detail in co-pending U.S. Pat. Application Ser. No. 529,969 assigned to the same assignee as the present invention.
Note **ϕ indicates either "1" or "0".

TABLE 3

| CO9 outputs | DE9 outputs | DS1 outputs | RO3 outputs |
|---|---|---|---|
| 0000 | 00000 | 00000000 | Check data (01010101) |
| 0001 | 00001 | 00000001 | Avo |
| 0010 | 00010 | 00000010 | Avmax |
| 0011 | 00011 | 00000011 | Measurement difference* |
| 0100 | 00100 | 00000100 | Rotation direction, KD change |

TABLE 3-continued

| CO9 outputs | DE9 outputs | DS1 outputs | RO3 outputs |
|---|---|---|---|
| 0101 | 1001φ | 00100000 00100001 ∫ 00111110 00111111 | Focal length |
| 0110 | 1010φ | 01000000 01000001 ∫ 01011110 01011111 | ΔAv |
| 0111 | 1011φ | 01100000 01100001 ∫ 01111110 01111111 | Macro change (φφφφ0100) } KD Macro (φφφφ0110) |
| 1000 | 01000 | 00001000 | φφφφφφφ** |
| 1001 | 01001 | 00001001 | φφφφφφφφ |

Note *Measurement difference is fully open aperture light measurement error.
Note **φ indicates either "1" or "0".

Still referring to FIG. 8, outputs b0, b1 and b2 of the counter CO7 are connected to decoder DE7. In accordance with 31-bit data from counter CO7, decoder DE7 produces 8-bit data, as shown in Table 4 below.

TABLE 4

| Counter CO7 | | | Decoder DE7 | | | | | | | |
|---|---|---|---|---|---|---|---|---|---|---|
| b0 | b1 | b2 | d0 | d1 | d2 | d3 | d4 | d5 | d6 | d7 |
| 0 | 0 | 0 | L | L | L | L | L | L | L | H |
| 0 | 0 | 1 | H | L | L | L | L | L | L | L |
| 0 | 1 | 0 | L | H | L | L | L | L | L | L |
| 0 | 1 | 1 | L | L | H | L | L | L | L | L |
| 1 | 0 | 0 | L | L | L | H | L | L | L | L |
| 1 | 0 | 1 | L | L | L | L | H | L | L | L |
| 1 | 1 | 0 | L | L | L | L | L | H | L | L |
| 1 | 1 | 1 | L | L | L | L | L | L | H | L |

Therefore, in response to the positive edge of clock pulses, the 8-bit data produced from ROM RO3 are transferred bit-by-bit from the least significant bit r0 through AND gates AN20-AN27 and also through OR gate OR5 to terminal SDI of the microcomputer MC2 in the camera body.

In the case where the interchangeable lens is a zoom lens, lens circuit LEC further includes a code plate FCD which produces a 5-bit data representing the focal length changed by a zooming ring ZR mounted on the zoom lens. The 5-bit data from code plate FCD are applied through AND gates AN40-AN44 to 5 least significant bits of 8-bit input array α2 of data selector DS1.

The data selector DS1 has a select terminal SE which is connected to output h4 of decoder DE9. When output h4 is producing LOW, data selector DS1 produces 8-bit data "0 0 0 0 h3 h2 h1 h0" from the input array α1, and when it is HIGH, data selector DS1 produces 8-bit data "h2 h1 h0 * * *" (* * * is a 5-bit data from code plate FCD) from the input array α2. The 8-bit data from the data selector DS1 is used for addressing ROM R03.

Next, the description is given to the operations when counter C09 changes from "0000" to "0111", as indicated in the above given Tables 2 and 3.

When counter C09 produces "0000", data selector DS1 produces an 8-bit data "00000000" (The 8-bit data "00000000" can be expressed by a hexadecimal numbering system as "00H", wherein the first "0" represents four zeros in the most four significant bits, the second "0" represents four zeros in the least four significant bits, and H indicates the hexadecimal numbering system.) as an address designating a location in ROM R03. And in the designated location, a check data, e.g., "01010101", is stored. This check data is common to all the types of interchangeable lenses. The check data is applied to the camera body and is read by microcomputer MC2 through input SDI.

When it is detected that an interchangeable lens is properly mounted on the camera body by the check data, the mode is set to full-aperture light measuring mode, and the aperture control is carried out by exposure control device EXC. On the contrary, when it is detected that the interchangeable lens is not properly mounted on the camera body by the check data, the mode is set to aperture stop-down light measuring mode, thereby carrying out no aperture control.

When counter C09 produces "0001", data selector DS1 produces an 8-bit address data "01H" for designating a location in ROM R03 so that ROM R03 produces a full-open aperture data Avo. In the case where the zoom lens has an optical system in which the aperture value changes with respect to the change of focal length, ROM R03 produces full-open aperture data Avo for the minimum focal length.

When counter C09 produces "0010", data selector DS1 produces an 8-bit address data "02H" for designating a location in ROM R03 so that ROM R03 produces a maximum stop-down aperture data Avmax (data of aperture size when it is reduced to minimum size).

When counter C09 produces "0011", data selector DS1 produces an 8-bit address data "03H" for designating a location in ROM R03 so that ROM R03 produces a data representing a measurement difference, which is the fully open aperture light measurement error.

When counter C09 produces "0100", data selector DS1 produces an 8-bit address data "04H" for designating a location in ROM R03 so that ROM R03 produces a data representing the direction of rotation of motor MO for shifting the focusing lens FL forward, and a data representing whether or not the mounted interchangeable lens is a type which changes its conversion coefficient data KD in accordance with the change of focusing distance. For example, if the mounted lens is such a type that its focusing lens FL shifts forward when the motor is driven clockwise, the least significant bit of the data from ROM R03 holds "1", but if the mounted lens is such a type that its focusing lens FL shifts forward when the motor is driven counterclockwise, the least significant bit of the data from ROM R03 holds "0". Furthermore, if the mounted lens is a type which changes its conversion coefficient data KD in accordance with the change of focusing distance, the most significant bit of the data from ROM R03 holds "1", and if the lens is not that type, it holds "0".

When counter C09 produces "0101", decoder DE9 produces "00101" when the lens is a fixed focal length type lens. In this case, data selector DS1 produces an 8-bit address data "05H" for designating a location in ROM R03 so that ROM R03 produces a data representing $\log_2 f$ wherein f is the fixed focal length of the lens. But, when the lens is a zoom lens, decoder DE9 produces "1001φ". In this case, data selector DS1 produces an 8-bit address data "001* * *" (* * * is a 5-bit data from code plate FCD.) capable of designating various locations in ROM R03 so that ROM R03 produces a data representing $\log_2 f$ wherein f is the focal length of the lens varied in accordance with the zooming operation.

When the counter C09 produces "0110", decoder DE9 produces "1010φ" when the lens is a zoom lens. In this case, the most significant bit (h4) of the data from decoder DE9 is "1". Therefore, the data selector DS1 produces data from its input array α2. Accordingly, data selector DS1 produces an 8-bit address data "010* * * " capable of designating various locations in ROM R03 so that ROM R03 produces a data ΔAv representing the difference in aperture value between that obtained when the zoom lens is shifted to the minimum focal length and that obtained when the zoom lens is zoomed to other setting position. But, when the lens is a fixed focal length type lens, data ΔAv=0, and therefore, data selector DS1 produces an 8-bit address data "06H" for designating a location in ROM R03 so that ROM R03 produces a data "0".

The data ΔAv is used for the calculation:

$$(Bv - Avo - \Delta Av) - Avo - \Delta Av$$

for eliminating terms related to the aperture from a full-aperture light measured data, and also for the calculation:

$$Av - Avo - \Delta Av$$

for controlling the effective aperture in compliance with set or calculated aperture.

When the counter C09 produces "0111", decoder DE9 produces "1011φ" when the lens is a zoom lens. In this case, data selector DS1 produces an 8-bit address data "011* * * " for designating various locations in ROM R03 so that ROM R03 produces a data representing conversion coefficient KD for the different set focal lengths. But, when the lens is a type having a fixed focal length, data selector DS1 produces an 8-bit address data "07H" for designating a location in ROM R03 so that ROM R03 produces a fixed data representing conversion coefficient KD for the set focal length of that lens.

The data of conversion coefficient KD is used for obtaining the amount of drive to be effected by motor drive mechanism LMD through a calculation:

$$|\Delta L| \times KD$$

wherein $|\Delta L|$ is a defocus amount produced from microcomputer MC1.

Furthermore, the data representing the conversion coefficient KD is, e.g., 8-bit long, which can be divided into upper four bits representing the digit place and lower four bits representing the digit number, as indicated in Table 5.

TABLE 5

| k7 | k6 | k5 | k4 | k3 | k2 | k1 | k0 |
|----|----|----|----|----|----|----|----|
| Digit place | | | | Digit Number | | | |

Using the data k7–k0, the conversion coefficient KD can be obtained through the following calculation:

$$KD = = (k3 \cdot 2^0 + k2 \cdot 2^{-1} + k1 \cdot 2^{-2} + k0 \cdot 2^{-3}) \cdot 2^n \cdot 2^m$$

wherein $$m = k4 \cdot 2^0 + k5 \cdot 2^1 + k6 \cdot 2^2 + k7 \cdot 2^3$$

and n = constant (for example −7)

Since k3 is the most significant bit of the digit number, it is always carrying "1". By the above calculation, the conversion coefficient KD having a large variation can be expressed with a small number of bits, and yet the calculation using the conversion coefficient KD in the microcomputer MC1 can be carried out easily.

Figure 10:
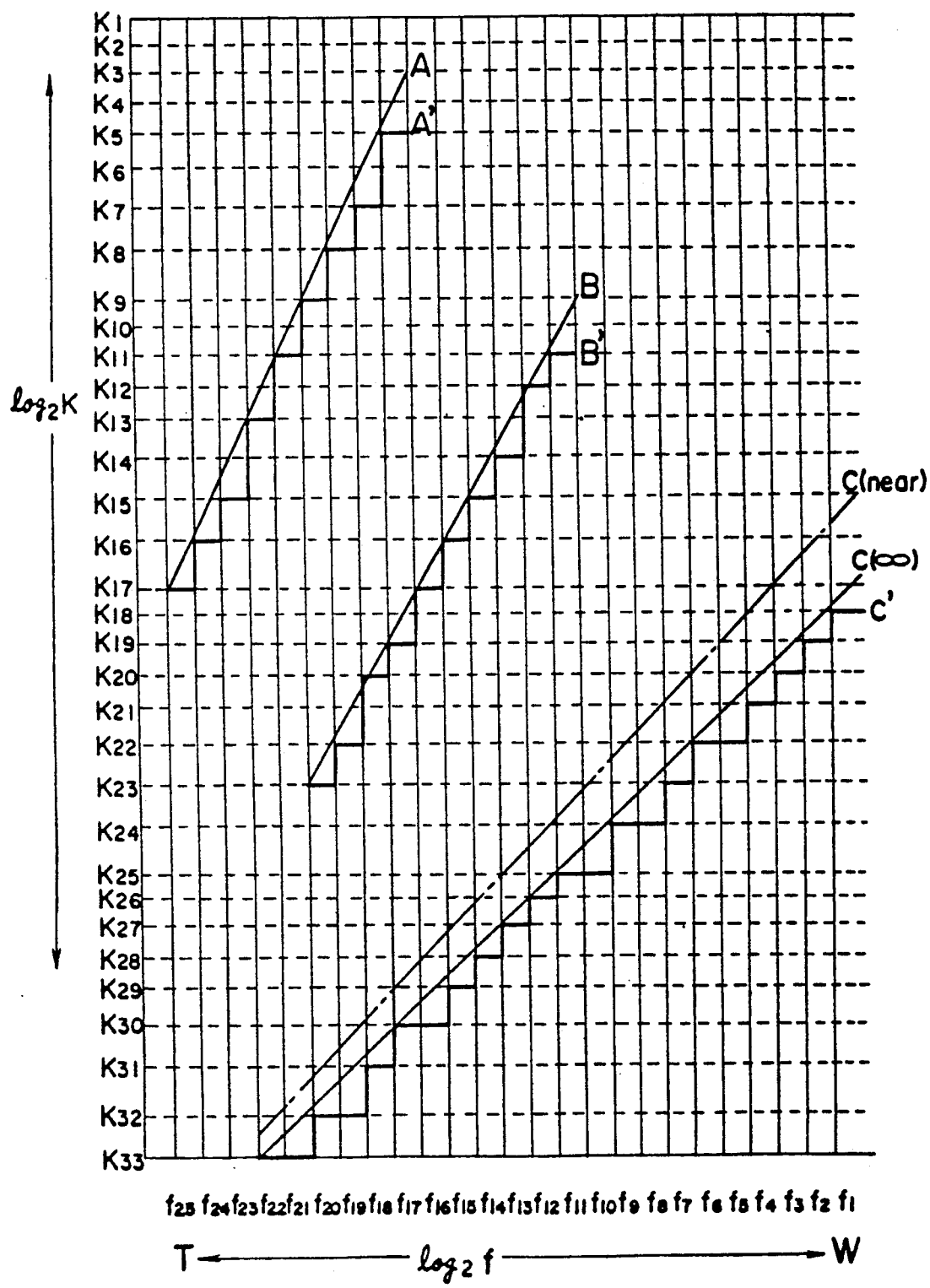
FIG. 10 is graph showing a relationship between focal length and conversion coefficient of a zoom lens having an optical arrangement wherein the conversion coefficient varies with respect to the change of focal length.

Referring to FIG. 10, a graph is given for showing a relationship between data of conversion coefficient KD produced from the zoom lens and the focal length of the zoom lens, and wherein abscissa and ordinate represent, $\log_2 f$ (f is a focal length) and conversion coefficient data KD, respectively.

The conversion coefficient KD changes linearly with respect to the change of $\log_2 f$, as shown by lines A, B and C. But, according to the present invention, the relationship between $\log_2 f$ and conversion coefficient data KD is given in tiers, as shown by lines A', B' and C'. In other words, ROM R03 holds the values of the conversion coefficient KD in steps from level K1 to K33. An example of these levels are given below:

When $K1 = 2^0$, KD = "01111000" (This is read such that when it is defined that $K1 = 2^0$, ROM R03 holds KD = "01111000" as the value for K1.);

When $K2 = 2^{-1} + 2^{-2} + 2^{-3} + 2^{-4}$, KD = "01101111";

When $K3 = 2^{-1} + 2^{-2} + 2^{-3}$, KD = "01101110";

When $K4 = 2^{-1} + 2^{-2} + 2^{-4}$, KD = "01101101";

When $K31 = 2^{-4} + 2^{-6}$, KD = "00101000";

When $K32 = 2^{-4} + 2^{-7}$, KD = "00111001"; and

When $K33 = 2^{-5}$, KD = "00101000".

Each zoom lens has its own zooming range in compliance with the available range of focal length. According to the preferred embodiment, the range of focal length is divided into a plurality of zones. And, code plate FCD provided in the zoom lens is so arranged as to produce a 5-bit signal corresponding to each zone. For example, a zoom lens, which has a focal length zone as depicted by a line A, has nine zones, f17-f25. For each zone, a level of the conversion coefficient is applied. A fundamental rule for choosing a level to each zone for the zoom lens of the above given example is such that a level which is closest to, and smaller than, the smallest point of line A within that zone should be chosen. For example, level K17 is chosen for zone f25, level K16 is chosen for zone f24, level K15 is chosen for zone f23, level K13 is chosen for zone f22, and so on.

As understood from the above rule, the level for the conversion coefficient is chosen to be smaller than the true conversion coefficient given by the straight line. Therefore, in operation, the pulse number $N = KD \times |\Delta L|$ obtained by the use of conversion coefficient KD is smaller than the number of pulses produced from encoder ENC for shifting the focusing lens exactly to the in-focus position. Usually, this operation is repeated for a number of times to shift the focusing lens in one direction asymptotically towards the in-focus position, without any overshoot.

In contradiction to the above rule, if a conversion coefficient is chosen to be greater than the true conversion coefficient, the pulse number $N = KD \times |\Delta L|$ obtained by the use of conversion coefficient KD becomes greater than the number of pulses produced from encoder ENC for shifting the focusing lens exactly to the in-focus position. Accordingly, the focusing lens overshoots the in-focus position. When this operation is repeated, the focusing lens overshoots in each operation, moving back and forth about the in-focus position. Thus, the focusing lens vibrates in a so-called hunting manner.

Furthermore, since the level of the conversion coefficient is chosen to be closest to the smallest point of line A within that zone, the focusing lens can be shifted towards the in-focus position in a short period of time.

As an exception to the above rule, the level of the conversion coefficient may be chosen to be greater than the smallest point of the line within that zone. For example, as depicted in zones f18 and f12 for the line B', the lines for the levels K20 and K12 are partly greater than the line B. This exception is applicable only when the level of the conversion coefficient is greater by a small amount than the smallest point of the line within that zone. By permitting this exception, the focusing lens may overshoot a small degree, and it can be shifted to the in-focus position in the next focusing operation without causing any hunting, resulting in a very short period of focus adjustment.

There is a zoom lens which changes its conversion coefficient along different lines depending on the set focusing distance such that, when the focusing distance is set to the infinite, its conversion coefficient changes along a real line $C(\infty)$ shown in the graph of FIG. 10, and when the focusing distance is set to the nearest point, its conversion coefficient changes along a chain line C(near) shown in FIG. 10. According to this type of zoom lens, referred to as a variant type zoom lens, the conversion coefficient KD changes, e.g., from $K17=2^{-2}$ to $K15=2^{-2}+2^{-4}$ when the focusing distance is changed from the infinite to the nearest, provided that the lens is zoomed to the zone f1.

In order to operate the camera system of the present invention even with this variant type zoom lens, ROM R03 is stored with conversion coefficients based on the infinite zoomed position (real line $C(\infty)$). The focusing operation is carried out in such steps that, before the focusing lens reaches a position close to the in-focus position, it is shifted in accordance with the direction signal of the defocus signal $\Delta L$. When the focusing lens is shifted to the position close to the in-focus position, the focusing lens is then shifted in accordance with the value N obtained using the data KD representing the conversion coefficient and data $|\Delta L|$ representing the degree of out-of-focus to seek the accurate in-focus position.

Instead of the above, it is possible to provide, in addition to the code plate FCD, a code plate for producing a signal representing the set focusing distance. The signal produced from this code plate may be used as an address data for ROM R03, thereby obtaining a precise data of the conversion coefficients for the variant type zoom lens. However, this alternative is not applicable from the practical point of view, because it result in the increase of parts, increase in bit number of address data, increase in the capacity of ROM R03.

There is another type of zoom lens, which is called a zoom-plus-macro lens or "macro zoom lens". This type of lens is capable of a focusing in macro-photography range in addition to the zooming. For example, such a "macro zoom lens" is constructed to carry out macro photography by means of rotating the zoom ring beyond the conventional shortest focal length position to change over the lens from the zoom mode to macro-focusing mode, so that the lens serves as a closeup lens. When the range is changed to macro range, code plate FCD produces "11111" so that data selector DS1 produces an 8-bit address data "01111111" for designating a location in ROM R03. When a photograph is taken with the macro range, it becomes difficult to carry out the focus adjustment under the AF mode because of various factors, such as the change in pupil position, reduction of the depth of focus, reduction in F-stop number, and change in the focus adjustment mechanism. Accordingly, ROM R03 produces "$\phi\phi\phi0110$", which indicates that the digit place k3 described above in connection with Table 5, i.e., the fourth digit place from the least significant bit, holds "0". Accordingly, by the detection of "0" at digit place k3, microcomputer MC2 decides that the range has changed to macro range, thereby automatically choosing the FA mode, notwithstanding that the mode manually selected by switch FAS is AF mode.

Within the zoom-plus-macro lenses, there is a type in which the change-over from the zooming mode to the macro photography mode is not possible unless the focusing is set to the closest photographic distance. For this type of lens, a switch MCS shown in FIG. 8 is provided. When switch MCS closes in response to a manual change-over operation, e.g. a depression of a button, from zoom mode to macro mode, inverter IN17 produces HIGH and inverter IN19 produces LOW. Thus, all of AND gates AN40 to AN44 produce LOW. Thus, data selector DS1 produces an address data "01100000" designating a location in ROM R03. Accordingly, ROM R03 produces "$\phi\phi\phi\phi0100$". By the detection of "0" at digit places k3 and k1 shown in Table 5, i.e., at the second and fourth digit places from the least significant bit in the produced data "$\phi\phi\phi\phi0100$", microcomputer MC1 decides that the range has changed to macro range, thereby automatically operating motor MO to shift focusing lens forward to bring the lens in nearest focused condition.

The light receiving portion for the focus detection is so arranged as to aim at a certain exit pupil of the photographing lens. By the diameter of the pupil and the position of the pupil in relation to the light receiving element (located at a position optically equivalent to the film surface), it is determined whether or not the light beams from the target object, which have passed through the photographing lens, impinges on the light receiving element. Accordingly, in some lenses, as is explained with respect to FIGS. 1, 2 and 3, a part of light receiving portion may not receive any light beams from the object. Since the focus detection can not be done with a reasonable accuracy with such a type of lenses, it is not preferable to carry out the AF mode or FA mode operation. Therefore, for this type of lenses, data selector DS1 produces address data "011 * * *" in the case of zoom lens and address data "00000111" in the case of fixed focal-length lens. And, in response to these address data, ROM R03 produces "$\phi\phi\phi\phi0001$" as the data KD. By this data "$\phi\phi\phi\phi0001$", microcomputer MC2 prevents the microcomputer MC1 from carrying out the focus detection operation under AF mode or FA mode in the steps #16-2 described later.

By the change of range from zoom range to macro range, or vice versa, AND gates AN40–AN44 produces "00000", or "11111", whereby data selector DS1 produces address data "00100000", or 00111111", in one sequence, and address data "01000000", or 01011111", in another sequence. In response to the address data "00100000", or 00111111", ROM R03 produces data corresponding to focal length f under the macro range, and in response to the address data "01000000", or 01011111", ROM R03 produces data corresponding to $\Delta Av$ for the macro range.

Furthermore, in the case where the interchangeable lens is a type which has no mechanism for transmitting driving force from the camera body to the focus adjustment member in the lens, ROM RO3 stores "φφφφ0110" as the data KD, in the same manner as the range change between the zoom range and macro range, thereby permitting only the FA mode.

Referring back to FIGS. 6a, 6b, 6c and 6d, when the data reading from the lens LE completes through the above described operations, A-D conversion of the output from light measuring circuit LMC is carried out (step #13), and the converted data representing the measured light amount is stored in a certain register (step #14).

At step #15, it is decided whether or not the release flag RLF is carrying "1". If the flag RLF is carrying "1", the program advances directly to step #28, but if it is carrying "0", the program advances to step #16-1. It is to be noted here that the release flag RLF carries "1" when release switch RLS is on for carrying out the interruption operation at step #59 et seq. During this interruption operation, if it is detected at step #63 that no exposure control values are calculated, the reading of the above data is carried out in step #5 et seq. Then, at step #15, if it is detected at step #15 that the flag RLF is carrying "1", the operation flow starting from step #16 for the focus detection under AF mode or FA mode is skipped. Therefore, in this case, the program follows tee step #28 to calculate the exposure values and through step #30, the exposure control is carried out in step #64 et seq.

At step #16, it is decided whether it is possible to carry out the focus detection operation under AF mode or FA mode. If it is determined that the focus detection is possible, the program advances to step #17, but if not, the program advances to step #28. During the step #16, various conditions are examined sequentially in sub-steps. More particularly, at sub-step #16-1, it is examined whether the lens is properly mounted, or not; at sub-step #16-2, it is examined whether the conditions determined by the diameter and position of the exit pupil are in conformity with the light receiving portion, or not; at sub-step #16-3, it is examined whether the light beams from the target object are impinging on all the light receiving portion of the focus detection, or not; and at sub-step #16-5, whether or not the light measuring switch is turned on.

Since the focus detection operation under AF or FA mode is impossible when no check data "01010101" is detected at step #16-1, when bits in digit places k3 to k0 are "0001", or when the diameter of the exit pupil of the lens is so small that the data Avo, or Avo+ΔAv representing the full open aperture is smaller than a predetermined value Avc (such as F5.6), a warning is displayed at step #16-4 through display control circuit DSC for the indication that the focus detection can not be carried out after each of the above examination steps #16-1 to #16-3. Thereafter, the program advances to step #28. Furthermore, when input i0 is receiving LOW in compliance with the opening of the light measuring switch MES, the program advances to step #28 for carrying out the focus detection under FA mode only for 15 seconds.

On the contrary to the above, when a check data "01010101" is detected at step #16-1, when bits in digit places k3 to k0 are not "0001", when the diameter of the exit pupil of the lens is such that the data Avo, or Avo+ΔAv representing the full open aperture is greater than a predetermined value Avc, and when input i0 is receiving HIGH, the program advance to step #17.

At step #17, output 01 produces HIGH which is applied to input i11 of microcomputer MC1. Accordingly, microcomputer MC1 starts to carry out the focus detection under AF or FA mode. At step #18, data KD representing the conversion coefficient, which has been transferred from lens circuit LEC to the microcomputer MC2, is produced from input/output port I/0 and applied through data bus DB to latch circuit LA. The data KD latched in latch circuit LA will be further transferred to microcomputer MC1 in the later stage at step No.93 described below.

At step #19, in accordance with the data transferred from lens circuit LEC to microcomputer MC2 when counter CO9 is producing "0100", it is detected whether or not the mounted lens is a variant type zoom lens, which changes the conversion coefficient data KD relatively to the change of focusing distance. If it is detected that the mounted lens is a variant type zoom lens, microcomputer MC2 produces HIGH from its output 03, which is applied to input i13 of microcomputer MC1. On the contrary, if the mounted lens is not a variant type zoom lens, microcomputer MC2 produces LOW from its output 03. Accordingly, microcomputer MC1 is so operated as to change the driving mode of motor MO under AF mode in accordance with a detection whether the image forming position is located within near-focusing zone or not, or a detection whether the integration time is longer than a predetermined period of time, as will be described in detail later in connection with steps No.192 to No.197.

At step #22, in accordance with the data transferred from lens circuit LEC to microcomputer MC2 when counter C09 is producing "0100", the direction of rotation of motor MO is determined for effecting the forward shift of the focusing lens. If it is determined that motor MO should rotate clockwise to effect the forward shift of the focusing lens, microcomputer MC2 produces HIGH from its output 02, which is applied to input i12 of microcomputer MC1. If it is determined as counterclockwise, output 02 produces LOW. Using the signal applied to input i12 and a signal representing the direction of defocus, microcomputer MC1 determines the direction of rotation of motor MO.

At step #25, by the detection of a number, whether it is "1" or "0", given at the fourth digit place k3 of the data KD representing the conversion coefficient, it is determined whether it is possible to carry out the AF mode operation with the mounted lens LE. If the digit place k3 is carrying "1", it is possible to carry out the focus detection under AF mode by the mounted lens LE. In this case, "0" is set in flag MFF and, thereafter, the program advances to step #28. Contrary, if the digit plate k3 is carrying "0", it is impossible to carry out the AF mode operation with the mounted lens LE. In this case, "1" is set in flag MFF and, thereafter, it is detected which one of the two modes, AF or FA modes, is selected by switch FAS. If AF mode is selected to provide HIGH to input i1, a warning is displayed by display control circuit DSC indicating that the mode is automatically changed to FA mode even when the mode selected by switch FAS is AF mode. Thereafter, the program advances to step #28. If FA mode is selected to provide LOW to input i1, there is no need to give out such an warning, and therefore, the program directly advances to step #28.

At step #28, an exposure calculation through known steps is carried out in accordance with data obtained in previous steps #4 to #14, such as set exposure control values, measured light amount, and data from the lens. When data representing exposure time and data representing aperture value are obtained, "1" is set for flag LMF.

At step #30, it is detected whether the release flag RLF is carrying "1" or not. If it is carrying "1", the program jumps to step #64 for carrying out the exposure control operation. Contrary, if it is carrying "0", the program advances to step #31. At step #31, output 08 of microcomputer MC2 produces HIHG, thereby producing LOW from inverter IN8. Thus, a transistor BT3 conducts to permit the warning indication through light emitting diodes LD10 to LDln And, in the following step #32, obtained exposure control values are sequentially output at I/0 port, which synchronously cause sequential changes into respective "High"'s at terminals a4 to an. In response to these, indication data are sequentially latched by display control part DSC, and display DSP carrys out the liquid crystal display according to the latched data.

At step #33, the on/off condition of light measuring switch MES is detected. If switch MES is on to provide HIGH to input i0, data for counting 15 seconds for the timer interruption is set in register Tc for the timer (step #34). Then, at step #35, timer starts to count 15 seconds, thereby allowing the timer interruption at step #36. Thereafter, the program returns to step #2. In this case, since input i0 is still receiving HIGH, i.e., light measuring switch MES is maintained on, the program advances to step #3, thereby prohibiting the timer interruption. Thereafter, the same procedure is repeated again.

On the contrary, if light measuring switch MES is turned off to apply LOW to input i0, it is detected at step #37 which one of the two modes, AF and FA modes, is selected by switch FAS. Then, at step #38, the mode determined at step #25 by the data from the lens is detected. Here, the program advances to step #40, when FA mode is selected to provide LOW to input il (step #37), or when AF mode is selected, but flag MFF is carrying "1" to permit only FA mode operation in the lens. When AF mode is selected and flag MFF is carrying "0", output 01 produces LOW (step #39) to stop the operation of microcomputer MC1 and, thereafter, the program advances to step #40. In the case where FA mode is detected at step #37 or #38, the program advances to step #40 with output 01 continuously producing HIGH. Accordingly, the operation in microcomputer MC1 continues.

At step #40, it is detected whether switch EES is on or off. When the exposure control mechanism is not in the charged condition, switch EES is on to provide HIGH to input i2. In this case, the program goes to step #47 to carry out the initialization in a manner described later. When the exposure control mechanism is in the charged condition to turn switch EES on to provide LOW to input i2, the program goes to step #36 and then returns to step #2, at which it is waited until light measuring switch MES turns on to provide HIGH to input i0 or until the timer interruption takes place.

When the timer interruption takes place, 1is subtracted from the content of register Tc (step #45). Then, at step #46, it is detected whether the content of register Tc is equal to "0" or not. If it is not equal to "0", the program advances to step #5 et seq. to carry out the data reading and exposure calculation in a manner described above. In this case, if the mode is FA mode, since output 01 is producing HIGH, microcomputer MC1 repeats the FA mode operation. Contrary, if the mode is AF mode, microcomputer MC1 is held in nonoperative, because output O1 is producing LOW as effected at step #39.

If Tc is equal to "0", outputs 00, 01 and 08 produce LOW (steps #47, #48 and #49), thereby cutting the power supply through transistor BT1 and buffer BF, stopping the operation of microcomputer MC1 under FA mode, and cutting the power supply through transistor BT3. Furthermore, liquid display portion DSP is blanked (step #50) and flags MFF and LMF are reset (steps #51 and #52). Then, the program returns back to step #2.

The above operation can be summarized as follows. During the closure of light measuring switch MES, data reading from the lens, operation by the microcomputer MC1, exposure calculation, and display are carried out repeatedly under both modes AF and FA. Then, when light measuring switch MES opens, the result is different between the modes AF and FA. Under AF mode, the operation by the microcomputer MC1 stops, and data reading from the lens, exposure calculation, and display are carried out repeatedly for 15 seconds. Under FA mode, data reading from the lens, the FA operation by the microcomputer MC1, exposure calculation, and display are carried out repeatedly for 15 seconds. Furthermore, when the charge in the exposure control mechanism is not completed, data reading from the lens, operation by the microcomputer MC1, exposure calculation, and display stops immediately in response to the opening of the light measuring switch MES.

It is to be noted that when a warning is displayed through step #16-4 or #27-2, a signal for cancelling the warning is applied to display control circuit DSC if no warning is necessary in the subsequent flow.

Next, an operation when release switch RLS closes while the exposure control mechanism is in the charged condition is explained. In this case, microcomputer MC2 immediately starts the release interruption from step #59 no matter what operation it is carrying out. It is assumed that the release interruption is now requested while the data are being read from the lens. When the release interruption is requested, output 06 produces LOW, thereby resetting lens circuit LEC (step #59). Then, output 01 produces LOW to stop the AF or FA mode operation in microcomputer MC1 (step #60). And, output 08 produces LOW to cut off the power supply to light emitting diodes LD10 to LDln to stop and indication (step #61). Then, flag RLF is set (step #62). At next step #63, it is detected whether flag LMF is set, i.e., carrying "1".

If flag LMF is carrying "1", which means that the exposure control values are calculated, the program advances to step #64. Contrary, if flag LMF is carrying "0", which means that the exposure control values are not ready yet, the program goes to step #5 to calculate the exposure control values, and thereafter, the program advances to step #64.

At step #64, calculated data representing the aperture stop down, such as:

$$A_v - A_{vo}; \quad A_v - (A_{vo} + \Delta A_v)$$

is produced on data bus DB. And, output 04 produces pulses for reading the data. Accordingly, exposure control device EXC reads data representing the aperture stop down to start the stop down of the aperture by the exposure control mechanism. This operation completes when the size of aperture is reduced to the required F-stop down.

When a predetermined period of time passes after the generation of pulses from output 04 (step #66), a calculated exposure time data Tv is produced on data bus DB (step #67). Then, output 05 produces pulses for reading data Tv (step #68). By these pulses, exposure control device EXC reads the data Tv and, at the same time, the mirror drive circuit (internally provided in the camera body) is actuated to start the mirror flip-up operation. When the mirror flips up completely, the leading curtain of the shutter mechanism starts to scan and, at the same time, count switch COS turns on to start count the time corresponding to the exposure time data Tv. When the counting of the time data Tv completes, the trailing curtain of the shutter mechanism starts to scan. When the trailing curtain completes its scan, the mirror flips down, and the aperture again opens to its full size. Then, switch EES closes.

When switch EES closes to provide HIGH to input i2 (step #69), release flag RLF resets (step #70). Then, it is detected whether light measuring switch MES is on or off, by the detection whether input i0 is receiving HIGH or LOW. If input i0 is receiving HIGH, which means that light measuring switch MES is on, the program returns back to step #2 to carry out data reading from the lens, operation by the microcomputer MC1, exposure calculation, and display repeatedly. Contrary, if input i0 is receiving LOW, which means that light measuring switch MES is off, the program advances to step #47 to initialize the microcomputer MC2 and, thereafter, the program returns back to step #2.

Referring to FIGS. 11a, 11b, 11c, 12a, 12b, 12c, 13a, 13b, 13c and 13d, a flow chart for the operation of microcomputer MC1 is shown. The flow can be roughly divided into three flows.

The first flow, starting from step No.1, is a main flow initiated by a focus-operation command. In the main flow, many operations are carried out such as: start operation of CCD FLM by control circuit COT (No.8); detection of motor drive (No.10 to No.13); counting the maximum integration time in CCD and operations after the count of the maximum integration time (No.14 to No.19); detection of termination of focusing lens to the end and counting of maximum integration time (No.35 to No.44); stopping the motor at the termination of focusing lens to the end and restart of rotation when the contrast is low (No.43 to No.48, and No.51 to No.67); initial setting of microcomputer MC1 at a pause of operation (No.25 to No.33); conversion of CCD data when the light intensity is low (No.78 to No.80); calculation of defocus amount and the direction of defocus (No.81 to No.91); detection whether or not the mounted lens is applicable for the AF mode operation (No.92 to No.96); detection of the contrast (No.100); motor drive, under the AF mode operation, for shifting the focusing lens to an infocus zone, and focus detection (No.125 to No.196) (FIGS. 12a, 12b and 12c); focus detection under FA mode operation (No.240 to No.261) (FIGS. 13a, 13b, 13c and 13d); and motor drive for shift the zoom lens when the mounted lens is a type which can change the range between zoom range and macro range at near focusing position (No.220 to No.232).

The second flow, covering steps No.70 to No.76, is a terminal interruption flow effected to read data from CCD in accordance with a signal indicating the completion of CCD integration applied from control circuit COT to input terminal iT.

The third flow, covering steps No.200 to No.204, is a counter interruption flow, in which the interruption is carried out when the count number of counter ECC, which is located in microcomputer MC1 and responsive to pulses from encoder ENC, reaches a predetermined number.

Once the terminal interruption is requested, the counter interruption requested thereafter will not be prosecuted before the end of the operation by the terminal interruption. In this manner, there is a priority in the prosecution of two interruption flows. Now, the description is given to the operations under AF and FA modes.

When a main switch MAS turns on, power-on reset circuit POR1 produces a reset signal PO1. By reset signal PO1, microcomputer MC1 carries out a reset operation from a certain address (step No.1). At step No.2, it is detected whether or not switch FAS is on to provide HIGH to input i14. If input i14 is receiving HIGH, flag MOF is reset to "0" indicating that the selected mode is AF mode. If input i14 is receiving LOW, flag MOF is set to "1" indicating that the selected mode is FA mode.

At step No.5, it is detected whether or not input i11 is receiving HIGH from output 01 of microcomputer MC2. If input i11 is receiving LOW, the program returns back to step No.2 to repeat the above operation. Contrary, if input i11 is receiving HIGH, output 016 produces HIGH (step No.6), thereby producing LOW from inverter IN5 and causing transistor BT2 to conduct. Thus, power is supplied through power supply line VF. Then, a fixed data C1 corresponding to the maximum integration time is stored in a register ITR (step No.7) for counting the integration time in CCD FLM. Then, output 010 produces a HIGH pulse (step No.8), thereby starting the integration operation in CCD FLM by control circuit COT. Then, it is permitted to accept the interruption signal from the iT terminal (step 9). Thereafter, the program advances to step No.10.

At steps No.10 to No.13, the operations related to motor MO are detected sequentially. At step No.10, it is detected whether or not the first focus detection operation is being carried out by the detection of flag FPF. At step No. 11, it is detected whether or not focusing lens FL is terminated at the end for the infinite focusing or at the other end for the nearest focusing, by the detection of flag ENF. At step No.12, it is detected whether or not the shifted position is located within infocus zone, by the detection of flag IFF. And, at step No.13, it is detected which one of the two modes, AF and FA modes, is selected by switch FAS, by the detection of flag MOF.

If it is assumed that the present situation is either such that the first focus detection operation is being carried out, that the focusing lens is terminated to its end, that the focusing lens is shifted to infocus zone, or that FA mode is selected, motor MO is not rotating. Accordingly, in this case, the program advances to step No.14.

If it is assumed that the present situation is either such that the second focus detection operation is not carried out, that the focusing lens is not terminated to its end, that the focusing lens is not shifted to infocus zone, or that AF mode is selected, motor MO is rotating Accordingly, in this case, the program advances to step No.35.

It is to be noted that flag FPF is set to carry "1" while the first focus detection operation is being carried out, and it is reset to carry "0" while the focus detection operations of the second et seq. are carried out. The end flag ENF carries "1" when focusing lens FL is shifted all the way to the infinite focusing end or nearest focusing end so that no pulse is produced from encoder ENC even when the motor is further driven. And the focus flag IFF produces "1" when the lens is shifted to an infocus zone, and "0" when it is shifted out of the infocus zone.

At step No.14, "1" is subtracted from the content of register ITR for counting the integration time. Then, it is detected at step No.15 whether the register ITR is producing a borrow signal BRW or not. If it is not producing a borrow signal BRW, low brightness flag LLF is reset to "0" (step No.18). Then, at step No.19, it is detected whether or not input ill of microcomputer MC1 is receiving HIGH from microcomputer MC2 so as to cause microcomputer MC1 to start its operation. If input ill is receiving HIGH, the program returns back to step No.14 to repeat the same operation. Contrary, if input ill is receiving LOW, the program advances to step No.25 to carry out the initialization and, thereafter, advances to step No.2 and waits for HIGH to be applied to input ill. On the contrary, when a borrow signal BRW is detected at step No.15, which means that the maximum integration time has passed, output 011 produces a pulse (step No.16) to forcibly stop the integration operation in CCD FLM and, also to set the low brightness flag LLF with "1". Then, it is waited for the interruption signal to be applied to interruption terminal iT from control circuit COT.

At step No.35, data C2 representing a predetermined period of time is set in a register TWR for counting time. At step No.36, "n" (for example "3") is subtracted from the content of register ITR and, then, it is detected at step No.37 whether or not a borrow signal BRW is caused by the subtraction at step No.36. If a borrow signal BRW is appearing, which means that the maximum integration time has passed, the program goes to step No.16 to follow the sames steps described above, so that the integration operation in CCD FLM is forcibly stopped and, also the low brightness flag LLF is set with "1". Then, it is waited for the interruption signal to be applied to interruption terminal iT from control circuit COT.

If a borrow signal BRW is not appearing, low brightness flag LLF is reset to "0", and "1" is subtracted from the content of the register TWR. Thereafter, it is again detected whether a borrow signal BRW is caused or not by the subtraction at step No.39 (step No.40). Then, if there is still not appearing a borrow signal BRW, it is detected at step No.41 whether input ill is receiving HIGH or not. If input ill is receiving HIGH, the program returns back to step No.36, and if input ill is receiving LOW, it goes to step No.25. It is to be noted that the above-mentioned C2 is smaller than $$\frac{C1}{n}$$

so that before the borrow signal BRW is detected at step No.37, the borrow signal BRW is produced a number of times at the detection of step No.40.

At step No.40, in response to borrow signal BRW, data ECD of the internal counter ECC representing the counted number of pulses from encoder ENC is shifted from the counter ECC to register ECR1 (step No.42). At step No.43, the shifted data ECD is compared with data set in a register ECR2. It is to be noted that register ECR2 is stored with a counted data obtained in the previous operation. If the content of register ECR1 does not coincide with that of register ECR2, it is understood that the focusing lens is now shifting. In this case, the content of register ECR1 is transferred to register ECR2 (step No. 44) and, thereafter, the program goes to step No. 35.

Figure 13A:
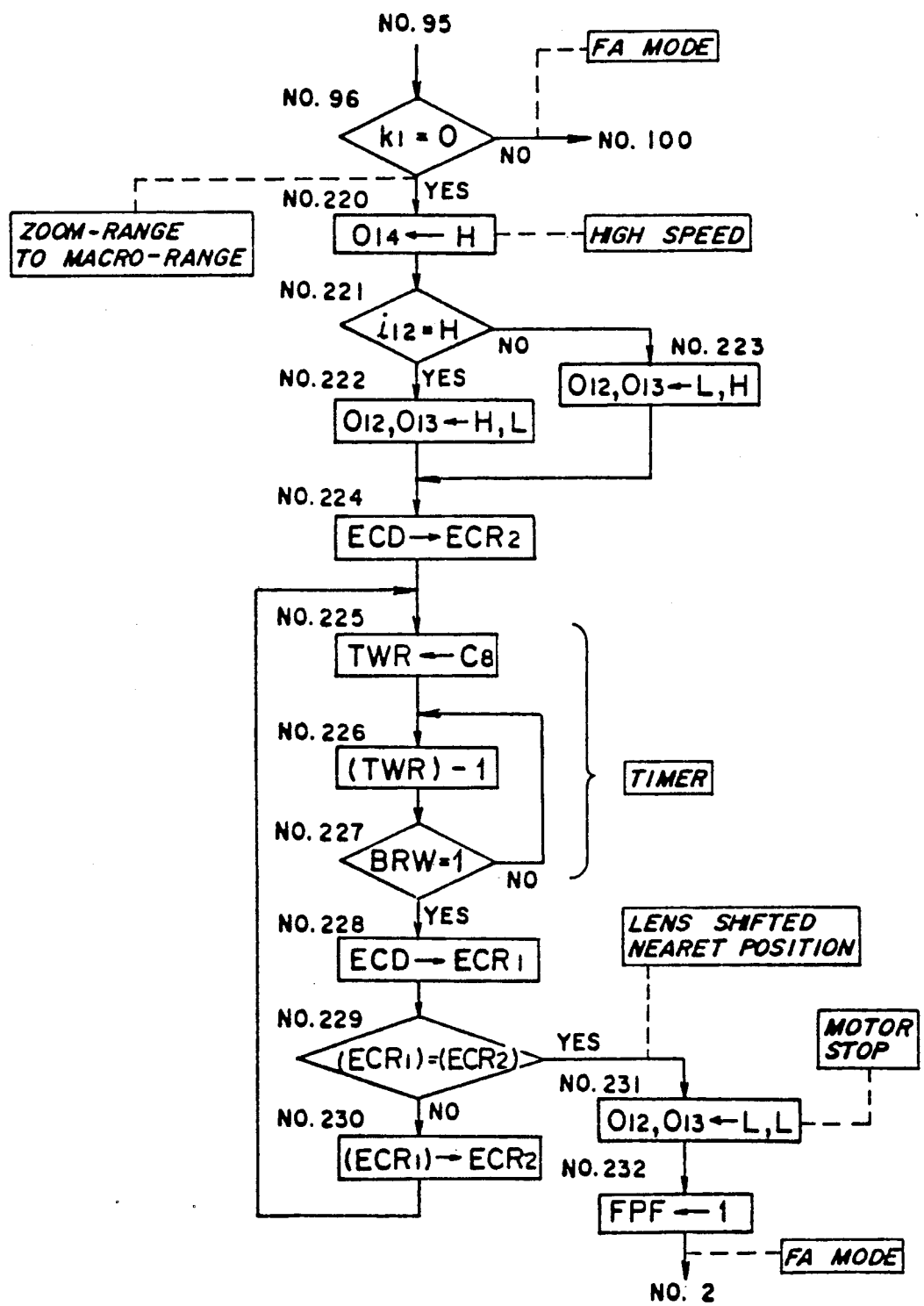
Figure 13B:
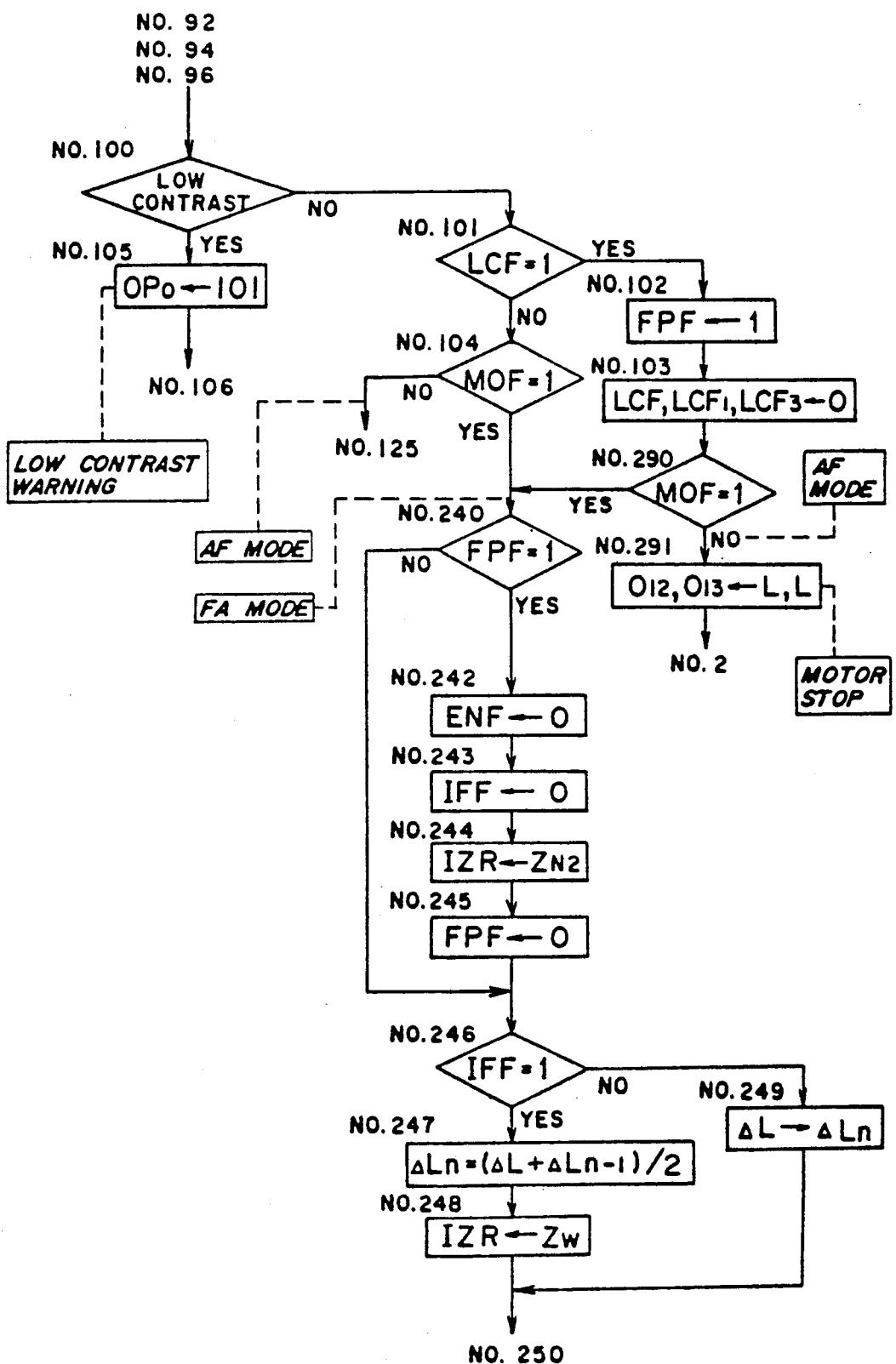
Figure 13C:
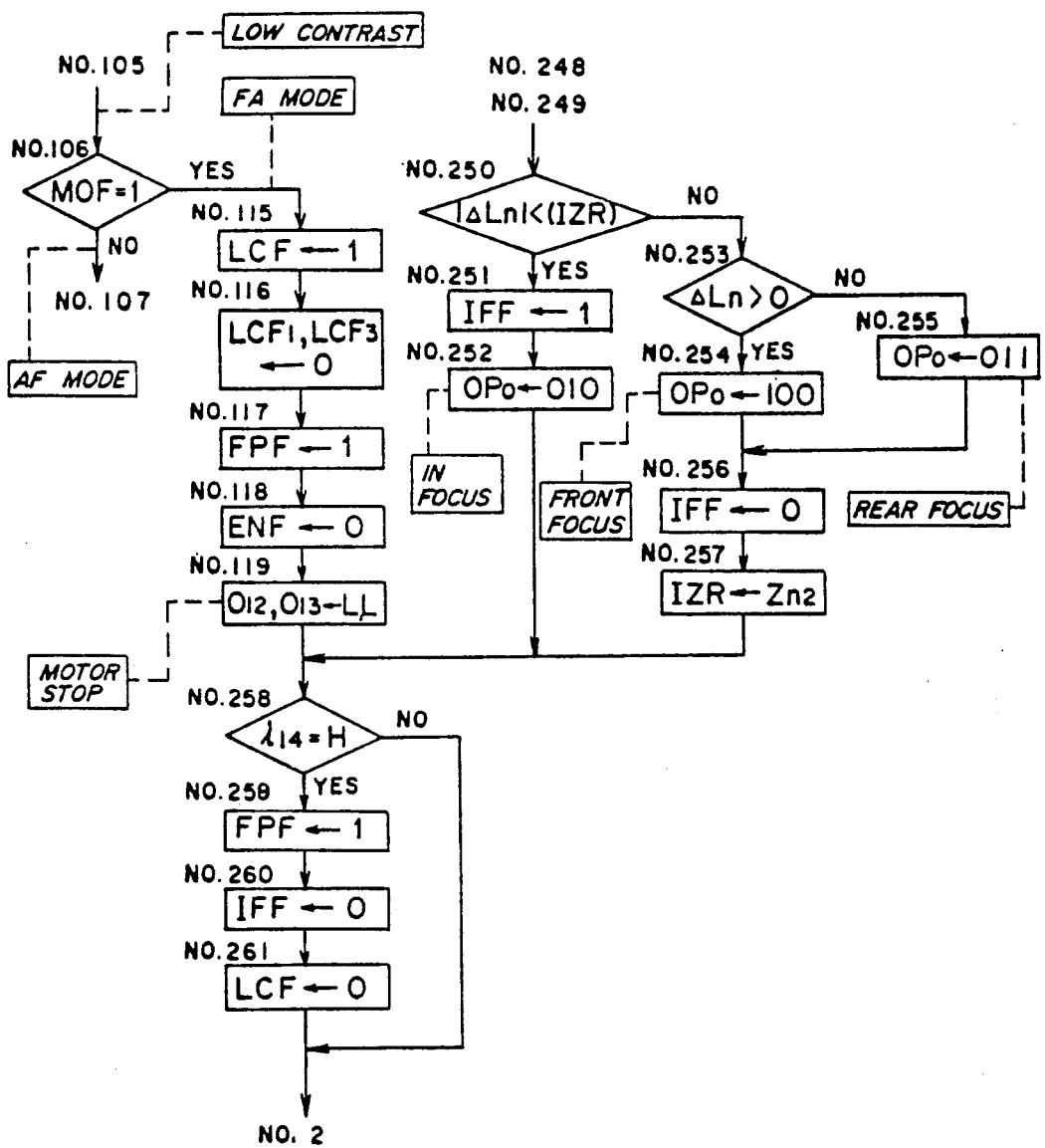
Figure 13D:
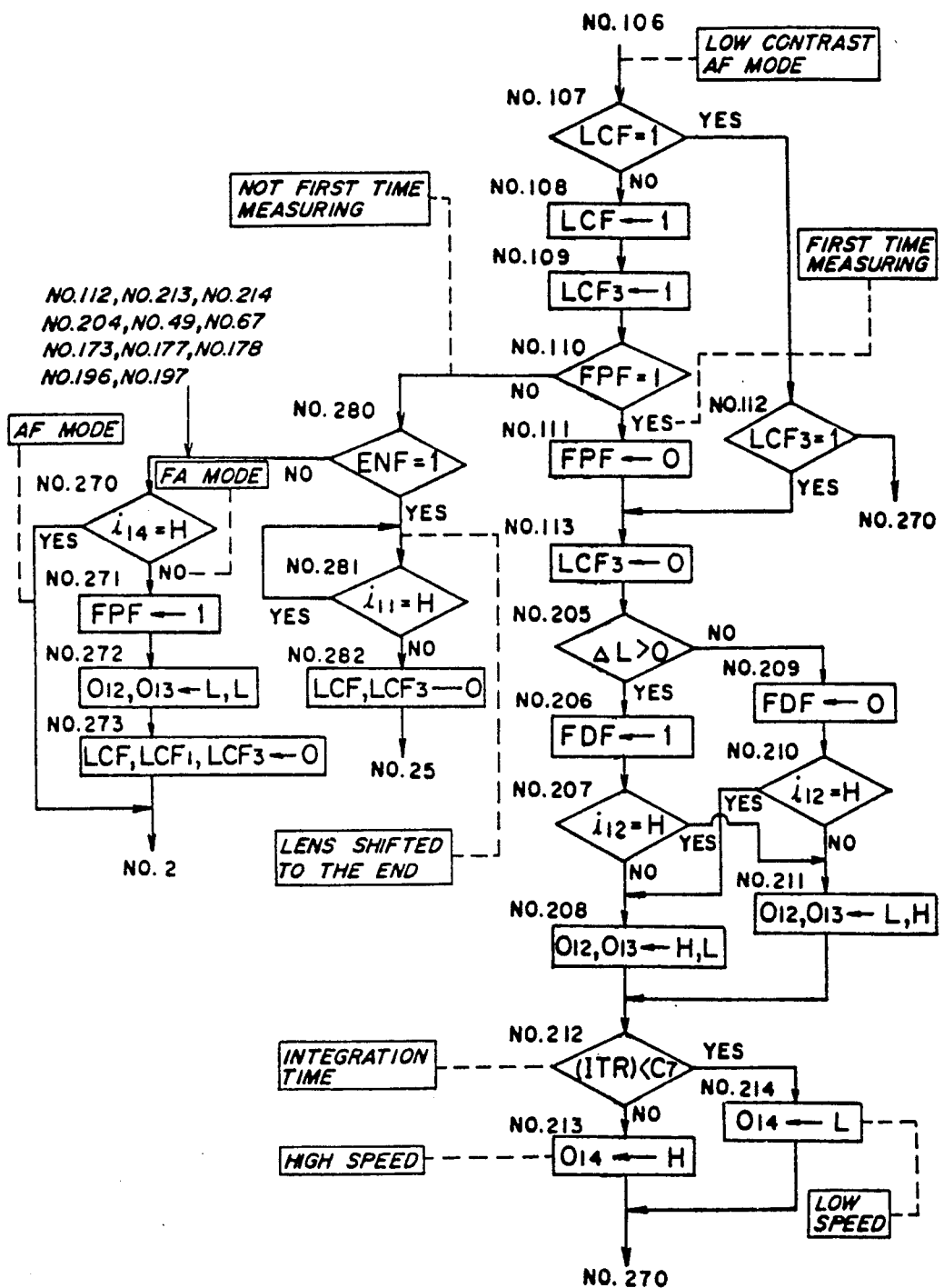

If the content of register ECR1 coincides with that of register ECR2 at step No.43, it is understood that there is no change in the counted data, indicating that encoder ENC is producing no more pulses. Thus, it is understood that the focusing lens is now held still, shifted all the way to the infinite focusing end or nearest focusing end. Therefore, after this step, a condition is caused in which any interruption signal at input terminal iT is not accepted any more (step No.45), and output 011 produces a pulse (step No.46) to forcibly stop the integration operation in CCD FLM. Furthermore, outputs 012 and 013 produce LOW to stop the rotation of motor MO. Thereafter, it is detected whether or not low contrast flag LCF is carrying "1" (step No.48). It is to be noted that when this flag LCF carries "1", it means that the object to be photographed has such a low contrast that the defocus amount ΔL calculated in accordance with the output from CCD FLM lacks the reliability. If it is so detected at step No.48 that flag LCF is carrying "0", end flag ENF carries "1" at step No.49, and thereafter, the program advances to step No 270 (FIG. 13d). At step No.270, it is detected whether input i14 is still producing HIGH or not. If i14 is still producing HIGH, which means that the AF mode is still selected, the program advances to step #2. On the contrary, if i14 is producing LOW, which means that the mode is changed to FA mode, flag FPF is set to "1", and outputs 012 and 013 produce LOW to stop the motor MO. And, flags LCF, LCF1 and LCF3 are reset to "0" and, thereafter, the program returns back to step No.2.

The above operation can be summarized as follows. By the focus detection command from microcomputer MC2, the integration in the CCD is started and, at the same time, it is permitted to accept interruption operations, the counter is started to count the maximum integration period. At this time, if the motor MO is not rotating, it is waited to receive an interruption signal during the counting of the maximum integration period. If no interruption signal is applied during the counting of the maximum integration period, the integration in the CCD is forcibly stopped, and it is still waited to receive an interruption signal.

Contrary, if the motor MO is rotating at the start of the integration in the CCD, it is frequently detected whether or not the lens has reached the infinite focusing end or the nearest focusing end, and at the same time, it is waited to receive an interruption signal. If no interruption signal is applied during the counting of the maximum integration period, and if the lens is not shifted all the way to one of the ends, the integration in the CCD is forcibly stopped, and it is still waited to receive an interruption signal. If the lens is shifted all the way to one of the ends, the integration in the CCD is forcibly stopped, and the reception of the interruption signal at terminal iT is inhibited. Furthermore, in this case, motor MO is stopped, and the integration in the CCD is started again. Then, as will be described in detail later, it is detected whether the image is in focus or not by the use of ΔL. And thereafter, microcomputer MC1 will not carry out the focus detection and focus adjustment operations even if HIGH is applied to input i11 of microcomputer MC1 from microcomputer MC2 with the closure of light measuring switch MES maintained. When this signal at input i11 once becomes LOW by opening light measuring switch MES and again becomes HIGH by closing light measuring switch MES again, the program returns back to step No.2.

When it is detected at step No.48 that flag LCF is carrying "1", next it is detected at next step No.51 whether flag LCF1 is carrying "1" or not. Here, if flag LCF1 is carrying "0", flag LCF1 is set to "1" (step No.52) and, thereafter, at step No.60, it is detected whether or not infocus direction flag FDF is carrying "1". The flag LCF1 is provided for scanning the lens to a position at which the contrast is higher than a predetermined level for the detection whether or not the image is extremely out of focus. The flag FDF carries "1" when it is necessary to shift the lens inwardly under the condition ΔL>0, and "0" when it is necessary to shift lens outwardly under the condition ΔL<0. In this case, if flag FDF is carrying "1", flag FDF is reset to carry "0", and vice versa. Then, it is detected in both cases (step Nos.63 and 64) whether input i12 is receiving HIGH. In this way, the direction for rotating the motor to shift the lens outwardly is detected. At step No.63, if input i12 is receiving HIGH, the program advances to step No.66 to produce HIGH from output 012 and LOW from output 013 so that the motor rotates clockwise to shift the lens outwardly. Contrary, if input i12 is receiving LOW, the program advances to step No.65 to produce LOW from output 012 and HIGH from output 013 so that the motor rotates counterclockwise to shift the lens outwardly. Furthermore, at step No.64, if input i12 is receiving HIGH, the program advances to step No.65 to rotate motor MO counterclockwise to shift the lens inwardly. And, if input i12 is receiving LOW, the program advances to step No.66 to rotate motor MO clockwise to shift the lens inwardly. Then, at step No.67, output 014 produces HIGH to rotate motor MO at a high speed. Thereafter, the program advances to step No.270.

At step No.51, if it is detected that flag LCF1 is carrying "1", that means that the image always has a low contrast while the lens is shifted to infinite focusing end or nearest focusing end, motor MO is stopped at step No.53. Then, it is waited until input i11 receives LOW (step No.55) and, thereafter, flags LCF, LCF1 and LCF3 are all reset to "0", and returning back to step No.25.

Next, a series of operations under low contrast will now be described. When an object having a low contrast under AF mode is aimed, output port OP0 produces "101" for the warning display (step No.105). Then, it is detected whether the flag LCF is carrying "1" or not (step No.107 in FIG. 13d). If the flag LCF is not carrying "1", and if the low contrast object is aimed for the first time, flags LCF and LCF3 are set to "1" (steps No.108 and No.109). And, at step No.110, it is detected whether the operation is for the first time (FPF=1) or not. If flag FPF is carrying "0", which means that the operations so far done are not under low contrast, there may be an error in the present measuring operation. Therefore, the program advances to step No.280, and through step No.270, it returns back to step No.2 to restart the measuring operation. In this case, the motor runs in a direction based on the calculated result obtained in the previous operation. If end flag ENF is carrying "1", which means that the motor is not running, and when the program advances through step No.110 to step No.280, it is waited until input i11 receives LOW (step No.281). Then, flags LCF and LCF3 are reset to carry "0" (step No.282) and, thereafter, initializations (step No.25 et seq.) are carried out to stop the operation of microcomputer MC1.

Also, at step No.110, if it is detected that the flag FPF is carrying "1", indicating that the operation is carried out for the first time, flags FPF and LCF3 are reset to carry "0" (steps No.111 and 113), and at step No.205, it is detected whether the defocus amount ΔL is positive or negative. If ΔL>0, which means that the image is focused in front of the ideal focal plane this is referred to as front focused), flag FDF is set to carry "1" (step No.206). If ΔL<0, which means that the image is focused behind the ideal focal plane (this is referred to as rear focused), flag FDF is reset to carry "0" (step No.209). Thereafter, in a manner described above for the steps No.63 to No.66, motor MO is driven to rotate counterclockwise or clockwise in accordance with the type of lens to shift the lens outwardly. Then, at step No.212, it is detected whether the time consumed for the integration (which is stored in register ITR) is shorter than a predetermined length C7 or not. If the integration time is less than the predetermined time C7 ((ITR)≧C7), output 014 produces HIGH to run the motor MO at a high speed (step No.214). Thereafter, the program goes through step No.270 to step No.2 so as to restart the measuring operation. In this manner, unless the measured amount is changed to an amount which is not representing the low contrast, the lens is continuously shifted in a direction initially determined.

If the lens is shifted all the way to one end with the contrast being detected as low all the time, flag LCF1 is set to carry "1" at step No. 52 to change the direction of lens shift. Then, the measuring is further carried out while shifting the lens in the opposite direction. If the lens is shifted all the way to the other end with the contrast being detected as low all the time, it means that the lens is shifted from one end to the other end without catching a high contrast point. In this case, the object can be considered as an object having no contrast, such as a plain wall or white cloud. Thus, the program advances to step No.55 to stop the operation. In this operation, if it is found that the contrast determined in accordance with the measurement has a level above the low contrast, the program advances to step No.101 (FIG. 13b) to carry out the lens control in accordance with the defocus amount described later. If the detected image shows low contrast suddenly after one or more measuring operations, the determined contrast in the first operation is disregarded of and the measuring operation is carried out again. In such a measurement, if the determined contrast still continues to show the low contrast, the flow advances from step No.107 to step No.112. Since flag LCF3 is set to carry "1" at step No.109, the flow advances from step No.112 to step No.113 to reset flag LCF3 to carry "0" and thereafter, the program advances to step No.205. In accordance with the measurement at this moment, the direction for shifting the lens is determined. Then, a point where the contrast level exceeds above a predetermined level is detected. During the shifting of the lens under the low contrast condition, flag LCF3 is set to carry "0", which causes a repetition of a flow advancing from steps Nos.107 and 112 to step No.270 and then returning again to the step of next measurement. This operation is continued until it is detected, at step No.43 or step No.87 or step No.113, that the lens reaches to one end of its shiftable range.

When an object having a low contrast under FA mode (MOF=1) is aimed, the program advances from step No.106 to No.115 to set flag LCF to carry "1", to reset flags LCF1 and LCF3 to carry "0", to set flag FPF to carry "1" and to reset end flag ENF to carry "0". Thus, outputs 012 and 013 produce LOW. Then, the program advances to step No.258 to carry out the operation described later. Then, the light measuring is carried out again.

When the integration operation in CCD FLM completes and control circuit COT provides HIGH to interruption terminal iT during microcomputer MC1 is carrying out a looped operation of step Nos.14, 15, 18 and 19, step Nos.35 to 40, step Nos.42 to 44, or step Nos.36 to 41, the program immediately jumps to step No.70 to start the interruption procedure, as described below.

In the interruption procedure, first register ECR3 is stored with an amount ECD representing the counted number of pulses from encoder ENC (step No.70). Then, the number of light receiving elements aligned in the CCD, i.e., the number (C3) of pieces of data to be applied to input port IP0 of microcomputer MC1 is stored in register DNR (step No.71). Then, at step No.72, it is waited until input i10 receives HIGH. When input i10 receives HIGH upon completion of analog-to-digital conversion of the CCD output, a piece of CCD output data CD, which has been applied to input port IP0, is stored in register M(DNR) at step No.73. Then, one is subtracted from the content of register DNR (step No.74), and these steps (step Nos.72 to 75) are repeated until a borrow signal BRW appears at step No.74. In this manner, CCD output data CDs are set in register M(DNR) piece by piece. When all the CCD data CDs are taken, return address is set up. And, in response to that address, a return operation is carried out. Then, the program continues from step No.77 of the main flow.

As step No.77, it is detected whether flag LLF is carrying "1" or not. If flag LLF is carrying "1", data CDs from CCD are scanned for searching the maximum data MACD (step No.78). If the searched maximum data MACD carries "0" at its most significant bit, all the CCD data CDs (ALCD) are doubled (step No.80). If the searched maximum data MACD carries "1" at its most significant bit, all the CCD data CDs remain as they are, and the program directly goes to step No.81. Since if they are doubled, some data CDs may result in overflow. Contrary, if flag LLF is carrying "0", the program directly jumps to step No.81.

Amount of shift of two images on an image forming plain, which is equivalent to the film surface, is calculated at step No.81 and step No.90. More specifically, at step No.81, an integer portion of such an amount is calculated, and at step No.90, a fraction portion of such an amount is calculated. The detail of this calculation itself is known as disclosed in, e.g., U.S. Pat. No, 4,333,007 and, therefore, its description is omitted for the sake of brevity. In steps No.82 to No.85, it is detected whether motor MO is driven or not, in a manner similar to that described above in connection with steps No.10 to No.13. If the motor MO is driven, counted data ECD representing the number of pulses from encoder ENC is stored in register ECR1 (step No.86). Then, the data just now stored is compared with the data previously stored in register ECR2. If (ECR1)=(ECR2), which means that the lens is shifted all the way to the end, the program continues from step No.47 described above. If (ECR1)≠(ECR2), which means that the lens is still shifting, the content of register ECR1 is shifted to register ECR2, and then, the program advance to step No.89. Contrary, if motor MO is not driven, the program immediately advances to step No.89.

At step No.89, it is detected whether input i11 is receiving HIGH or not. If it is receiving LOW, the program advances to step No.25 to stop the focus detection operation and to carry out the initialization. If input i11 is receiving HIGH, the program advances to step No.90 to calculate the fraction portion of the shift amount, and at step No.91, defocus amount ΔL is calculated using the shift amount calculated in steps No.81 and No.90.

At step No.92, it is detected by the flag MOF whether the mode is AF mode or FA mode. If the present mode is AF mode, the program advances to step No.93, and if it is FA mode, the program advances to step No.100. In the case of AF mode, the conversion coefficient KD stored in latch LA from microcomputer MC2 is transferred to microcomputer MC1 through input port IP1 (step No.93). Then, it is detected at step No.94 whether the fourth digit place k3 of the data KD representing the conversion coefficient is carrying "0"or not, and whether the third digit place k2 of the data KD is carrying "1" or not. If the detected result is such that k3=0 and k2=1, it is understood from the above description that the mounted interchangeable lens can not operate under AF mode. Therefore, in this case, mode flag MOF is set to carry "1" (representing FA mode) and, thereafter, the program advances to step No.96. Contrary, if the detected result is such that k3=1 or k2=0, it is understood that the mounted interchangeable lens is a type which can operate under AF mode. Thus, in this case, the program advances to step No.100. Furthermore, at step No.96, it is detected whether or not kl=0. If kl=1, the program advances to step No.100. If kl=0, it is understood that the mounted interchangeable lens is a type wherein the lens must be shifted outwardly to nearest focusing position to change the range from zoom-range to macro-range, and that lens is about to change the range to macro-range. In this case, the program advances to step No.220 (FIG. 13a) to produce HIGH from output 014 to drive the motor at a high speed. Then, at step No.221, it is detected whether or not input i12 is receiving HIGH. If input i12 is receiving HIGH, which means that the mounted lens is a type which shifts the lens outward upon clockwise rotation, output 012 produces HIGH. If input i12 is receiving LOW, which means that the mounted lens is a type which shifts the lens outward upon counter-clockwise rotation, output 013 produces HIGH. Thereafter, counted data ECD representing the number of pulses from encoder is stored in register ECR2 (step No.224).

Next, register TWR is stored with a constant data C8 (step No.225) representing a predetermined period of time. Then, "1" is subtracted from the content of the register TWR and then, it is detected whether or not a borrow signal BRW is produced. This operations are repeated, and when a borrow signal is produced after a predetermined period of time, counted data ECD representing the number of pulses from encoder is transferred to shift register ECR1 (step No.228). Then, the content of register ECR1 is compared with that of register ECR2 (step No.229). If (ECR1)≠(ECR2), the content of register ECR1 is transferred to register ECR2 (step No.230) and, thereafter, a routine of steps No.225 to No.230 is repeated. Contrary, if (ECR1)=(ECR2), which means that the lens is shifted all the way to nearest focusing position, outputs 012 and 013 produce LOW, thereby stopping motor MO (step No.231). Then, flag FPF is set to carry "1" (step No.232), and thereafter, the program returns back to step No.2. Thereafter, the program is carried out under FA mode operation.

At step No.100, it is detected whether or not the data from CCD is indicating low contrast. The detail of this step will be described later in connection with FIG. 20. If the data indicates low contrast, the program proceeds from step No.105 described above. Contrary, if the data does not indicate low contrast, it is detected whether or not flag LCF is carrying "1" at step No.101 (FIG. 13b). If flag LCF is carrying "1", flag FPF is set to carry "1"because the measured amount in the previous operation showed low contrast, and flags LCF, LCF1 and LCF3 are reset to carry "0". Then, the program goes to step No.290 to detect the condition of flag MOF. If MOF=0, that is, selected mode is AF mode, outputs 012 and 013 produce LOW to stop the motor. Thereafter, the program returns back to step No.2 to start the measuring operation again. Contrary, if MOF=1, that is, selected mode is FA mode, the program goes to step No.240 to carry out the operation for the FA mode, which will be described in detail later.

In the case where flag LCF is carrying "0" at step No.101 and when the measured amount in the previous operation did not show low contrast, the program goes to step No.104 to detect the condition of mode flag MOF. In this case, if MOF=1, indicating FA mode, the program advances to step No.240. Contrary, if MOF=0, indicating AF mode, the program advances to step No.125.

During the procedure of steps No.125 to No.130, it is detected whether or not the defocus amount ΔL is within infocus zone ZN1. First, in the case where flag ENF is carrying "0" (step No.125) indicating that the lens is not shifted to the end and when infocus flag IFF is carrying "1"(No.126) indicating that the lens has once reached the infocus zone, the measured amount |ΔL| obtained in the present measuring operation is compared at step No.127 with infocus zone ZN1. If, |ΔL|<ZN1, infocus display is effected (step No.128). Then, it is waited until output ill produces LOW (step No.129). Thereafter, the program goes to step No.25 and stops the operation.

On the contrary, if |ΔL|≧ZN1, flag FPF is set to carry "1" and flag IFF is reset to carry "0" and, thereafter, the program goes to step No.135 so as to carry out the lens control operation in accordance with the defocus amount based on the measured amount just obtained.

In the case where the flag ENF is carrying "1" indicating that the lens is shifted to the end, infocus display is effected at step No.128, under the condition that |ΔL|<ZN1 at step No.127. But if |ΔL|≧ZN1, the program goes to step No.129 with the indication of defocus direction being remained the same as before. Then, in the same manner described above, the operation stops when input ill receives LOW. Here, when |ΔL|≧ZN1, the program goes to step No.129 with the indication of defocus direction being remained the same as before. In this case, the lens will not terminate to an infocus position even if it is shifted to its end position. Therefore, it is no use of shift the lens by the motor MO. Thus, the operation of microcomputer MC1 is forcibly stopped.

If it is detected at steps No.125 and No.126 that the lens is not yet reached its end position or an infocus zone, it is detected at step No.131 whether first-pass flag FPF is carrying "1" or not. If the flag FPF is carrying "0", it is detected whether the lens has shifted to its end position or not at steps No.132 to No.134, in a manner similar to steps No.86 to No.88. Thereafter, the program goes to step No.135. Contrary, if the flag FPF is carrying "1", the program goes directly to step No.135. At step No.135, the focus detection command signal from microcomputer MC2 is detected. If input ill is receiving LOW, the program goes to step No.25 and then the operation stops. If input ill is receiving HIGH, the program goes to step No.136.

Figure 12A:
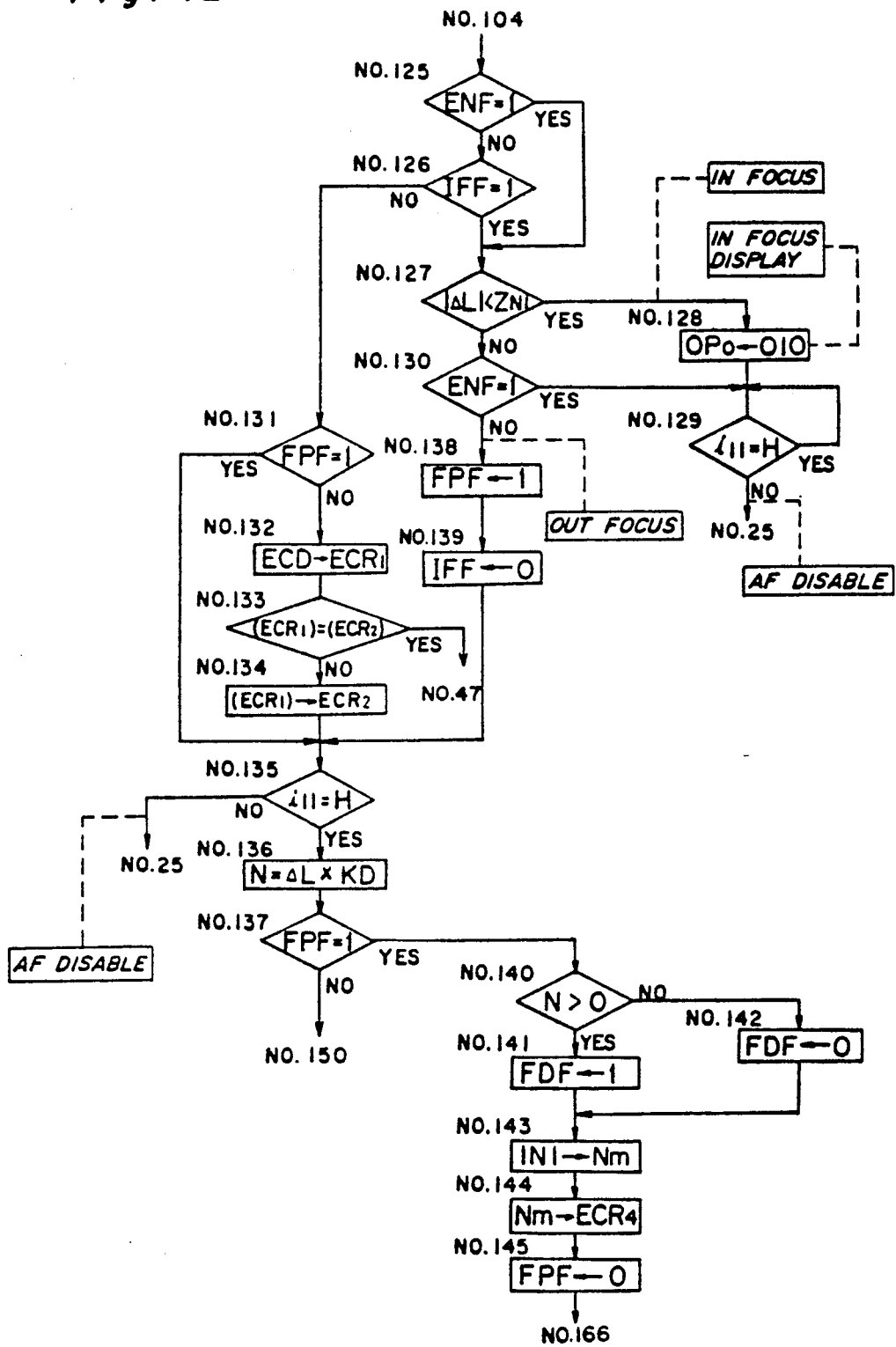
Figure 12C:
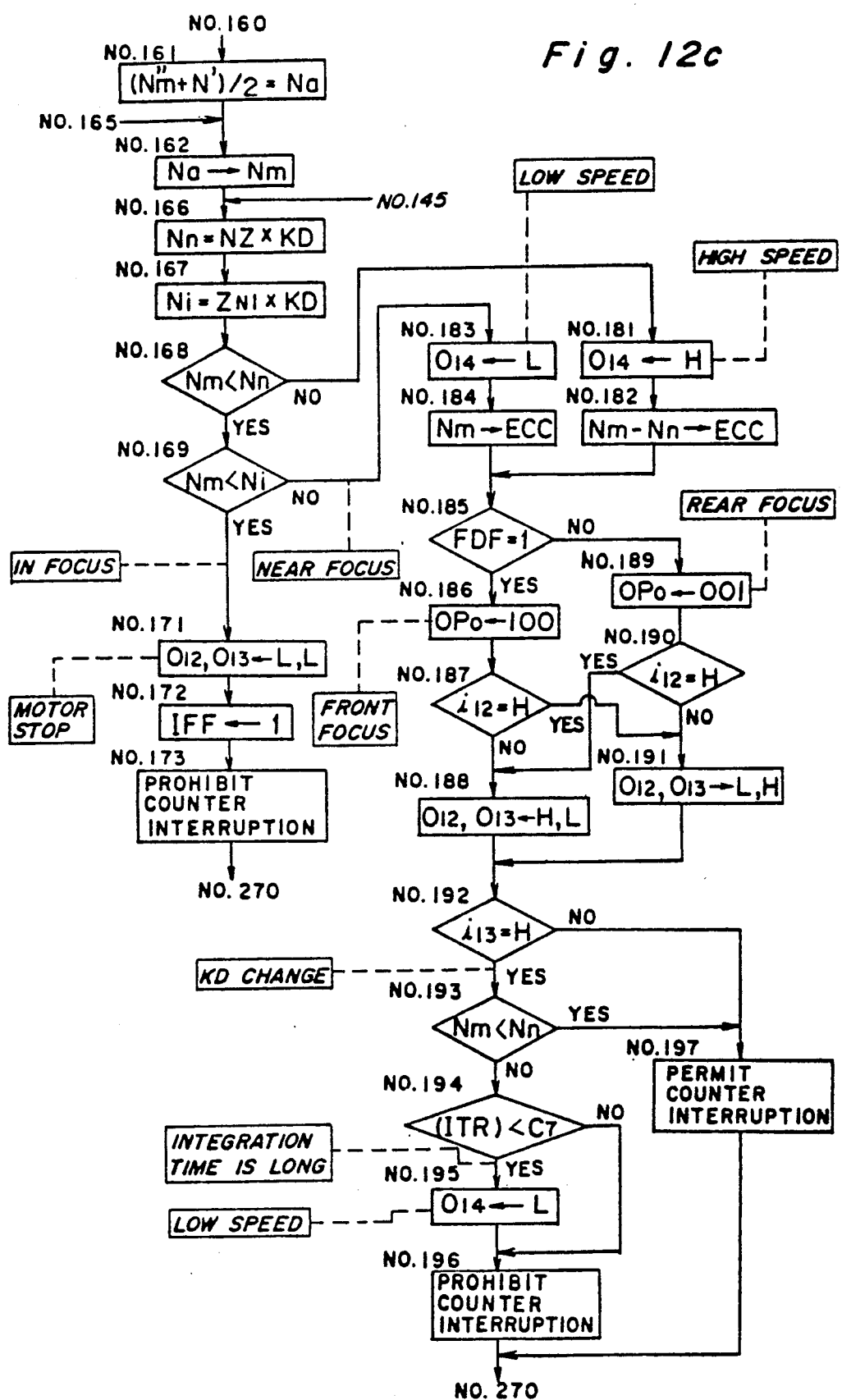

At step No.136, the calculated defocus amount ΔL is multiplied by read conversion coefficient data KD to obtain data N representing the amount of drive of lens drive mechanism LDR. At step No.136, in more detail, a real conversion coefficient is obtained by means of shifting the lower four bits of read conversion coefficient data KD in accordance with the upper four bits of the data KD. And thus obtained real conversion coefficient is multiplied by defocus amount ΔL to calculate data N, which is the number of pulses expected from the encoder. Then, it is detected at step No. 137 whether flag FPF is carrying "1" or not. If flag FPF is carrying "1", it is detected whether data N is positive or negative (step No.140). If data N is positive, focus direction flag FDF is set to carry "1", and if negative, it is reset to carry "0". Thereafter, an absolute of drive amount N, indicated as Nm, is stored in register ECR4 (step No.144). Then, flag FPF is reset to carry "0"and, thereafter, the program goes to step No.166 (FIG. 12c).

On the contrary, at step No.137, if flag FPF is carrying "0", the content of register ECR4, storing the data representing the amount of drive effected in the previous operation, is shifted to register ECR5 (step No.150 in FIG. 12b) and, then, register ECR4 is stored with a new data ECD representing the counted number of pulses from encoder ENC (step No.151). Accordingly, at this moment, register ECR3 is stored with count data Tc1 at the end of integration of CCD, and register ECR4 is stored with count data Tc2. Then, calculations are carried out to obtain lens-shift amount τ:

$$\tau = Tc0 - Tc1$$

representing the amount of lens shift effected during the integration of CCD, and lens-shift amount t0:

$$t0 = Tc1 - Tc2$$

representing the amount of lens shift effected during the calculation to obtain data N. If it is assumed that data N is obtained at the middle of the integration of CCD, at this moment the lends is shifted by an amount τ/2+t0 from the moment when data N is obtained. Furthermore, a calculation is carried out to obtain corrected data N"m:

$$N"m = N"m - (\tau + t0)$$

wherein N'm is the data obtained in the previous flow, and $(\tau+t0)$ is the amount of lens shift effected after the previous flow. It is to be noted that the corrected data N''m always takes a positive value.

At steps No.155 to No.157, it is detected whether or not the lens-shift direction towards infocus zone has been changed, by the use of defocus amount data N and flag FDF. More specifically, at step No.155, it is detected whether defocus amount data N calculated in the present cycle of operation is positive or negative. If data N is positive, it is detected at step No.156 whether flag FDF is carrying 0 or not. If flag FDF is carrying 0, this means that the direction has been changed, the program goes to step No.158. If flag FDF is carrying 1, this means that the direction is not changed, the program goes to step No.159.

On the contrary to the above, if data N is negative, it is detected at step No.157 whether flag FDF is carrying "1" or "0". If flag FDF is carrying "1", this means that the direction has been changed, the program goes to step No. 158. If flag FDF is carrying "0", this means that the direction is not changed, the program goes to step No. 159.

When it is detected that the direction is not changed, i.e., when the program goes to step No.159, it is understood that the lens is shifted towards infocus position by the rotation of the motor. Thus, in this case, it is assumed that data N is obtained at the middle of the integration period, thereby carrying out a calculation:

$$|N| - \tau/2 - t0 = N'$$

to correct the shifted amount by the rotation of the motor. Then, it is detected whether the corrected data N' is negative or not (step No.160). If corrected data N' is negative, it is understood that the lens has moved passed the infocus position. Therefore, it is made such that $|N'| = N'$ at step No.163 and, thereafter, the program goes to step No.164. Contrary to the above, if corrected data N' is positive, an average between data N''m obtained in the previous cycle of operation and the corrected data N' is taken to obtain a new data Na (step No.161 in FIG. 12c):

$$Na = (N''m + N')/2.$$

The new data Na is adapted as the data Nm (step No.162), and thereafter, the program goes to step No.166.

When it is detected that the direction has been changed, i.e., when the program goes to step No.158, it is understood that the lens is over shifted beyond the infocus position by an amount $\tau/2 + t0$ in the defocus direction from the moment when the present data is obtained. Thus, in this case, a correction calculation:

$$|N| + \tau/2 + t0 = N'$$

is carried out and, thereafter, the program advances to step No.164. At step No.164, an average is taken between N''m and N' to obtain a new data Na:

$$Na = (N''m - N')/2.$$

Then, it is detected whether the new data Na is negative or not (step No.165).

If data Na is positive, the program goes to step No.162 (FIG. 12c) described above, and if it is negative, outputs 012 and 013 produce LOW to stop the motor (step No.174). Then, at step No.175, infocus zone data ZN1 is multiplied by conversion coefficient data KD, which has been changed into the real value at step No.136, to obtain data Ni representing the amount of rotation of motor in the infocus zone. Then, it is detected whether $|Na| < Ni$, or not. If $|Na| < Ni$, it is understood that the lens is shifted to the infocus zone. Therefore, in this case, infocus flag IFF is set to carry "1" and then, program follows step No.270 and returns back to step No.2. Contrary, if $|Na| > Ni$, it is understood that the lens has moved passed the infocus zone. Therefore, flag FPF is set to carry "1" and then, program follows step No.270 and returns back to step No.2, again carrying out the measuring operation.

At step No.166, data NZ representing a near-infocus zone is multiplied by data KD to obtain a data indicating an amount of lens shift from the near-infocus zone to infocus zone. Then, at step No.167, using data ZN1 for the near-infocus zone and data KD, a multiplication:

$$Ni = ZN1 \times KD$$

is carried out to obtain data Ni representing an amount of lens shift within the infocus zone (step No.167). Then, at step No. 168, data Nm is compared with data Nn. When, $Nm \geq Nn$, i.e., when the lens is outside the near-infocus zone, the program goes to step No.181, thereby producing HIGH from output 014 to run motor MO at a high speed and, at the same time, counter ECC is stored with Nm-Nn to count down in response to the pulses from encoder ENC (step No.182). Thereafter, the program advances to step No.185.

Contrary to the above, when $Nm < Nn$, i.e., when the lens is inside the near-infocus zone, it is detected at step No.169 whether $Nm < Ni$, or not. If $Nm \geq Ni$, that means that the lens is within near-infocus zone, but not within infocus zone. Therefore, in this case, output 014 produces LOW to run the motor MO at low speed (step No.183), and data Nm is stored in counter ECC (step No.184). Thereafter, the program advances to step No.185. In the case when the mounted lens is a type in which the conversion coefficient data KD changes with respect to the change of focusing distance, the lens shift is controlled only in accordance with a signal representing the direction of defocus. For the other types of lens, defocus amount is calculated and, for this purpose, the amount of lens shift is corrected in the procedure starting from step No.150. Therefore, for this correction, data Nm−Nn is stored in counter ECC at step No.182. Furthermore, when $Nm < Ni$, outputs 012 and 013 produces LOW to stop motor MO (step No.171), and then, infocus flag IFF is set to carry "1" (step No.172). Then, the counter interruption procedure is prohibited (step No.173), and thereafter, the program returns to step No.270 to carry out the measurement operation for the proof.

At step No.185, it is detected whether flag FDF is carrying "1" or not. If flag FDF is carrying "1", which means that the image is front focused, output port OP0 produces "100" to lit light emitting diode LD0 for the indication of near focus (step No.186). If flag FDF is carrying "0", which means that the image is rear focused, output port OP0 produces "001" to lit light emitting diode LD2 for the indication of far focus (step No.189). Then, by the content of flag FDF and signal applied to input i12 for the indication of direction of rotation of interchangeable lens, motor MO is driven in clockwise or counterclockwise direction (step No.188 and No.191). Thereafter, the program advances to step No.192 to detect whether input i13 is receiving HIGH or not. If the mounted lens is a type which changes the conversion coefficient data KD in accordance with the change of focusing distance, and if input i13 is receiving HIGH, it is detected at step No.193 whether Nm<Nn, or not. In this case, if the lens is located out the near-infocus zone so that the detected result is Nm≧Nn, motor MO is controlled, irrespectively of the calculated data Nm, only by the signal representing the direction of rotation. Then, it is detected whether or not the integration period is longer than predetermined period of time corresponding to data C7 (step No.194). If it is longer, there may be a possibility that the lens moves past the infocus position. Therefore, output 014 produces LOW to run motor MO at a low speed (step No.195), and the counter interruption is prohibited (step No.195). Thereafter, the program advances to step No.270 and returns back to step No.2. Contrary to the above, if it is detected that Nm<Nn, indicating that the lens is inside the near-infocus zone, it is permitted to carry out the counter interruption procedure (step No.197) and, thereafter, the program returns to step No.270. Furthermore, when input i13 is receiving LOW, it is permitted to carry out the counter interruption procedure and, thereafter, the program returns to step No.270.

When counter ECC for down counting the pulses from encoder ENC is counted down to zero during the rotation of motor MO, a counter interruption procedure (FIG. 11b) starts. At step No. 200, it is detected whether Nm<Nn, or not. If Nm<Nn, it is understood that motor MO has been rotated while the lens is in the near-infocus zone and, therefore, it can be assumed that the lens is now shifted to infocus zone. Thus, outputs 012 and 013 produce LOW to stop motor MO (step No.203). Then, infocus flag IFF is set to carry "1" and, thereafter, the program returns to step No.270. Contrary, at step No.200, if it is detected that Nm≧Nn, it is understood that motor MO is now shifted to near-infocus zone. Thus, output 014 produces LOW to run motor MO at a low speed (step No.201), and then, data Nn is stored in counter ECC (step No.202). Then, it returns to an address with an interruption.

Next, when flag MOF is detected as carrying "1" at step No.104 or step No.290 (FIG. 13b), an operation under FA mode is carried out in a procedure starting from step No.240. At step No.240, it is detected whether or not flag FPF is carrying "1". If flag FPF is carrying "1", it is understood that the operation under FA mode is carried out for the first time. In case when the mode is changed from AF mode, end flag ENF is reset to carry "0", and infocus flag IFF is reset to carry "0". Furthermore, register IZR for the detection of infocus zone is stored with data ZN2 for indication the infocus zone. It is to be noted that the data ZN2 is greater than data ZN1 for the AF mode. This difference is provided because under the AF mode, the lens can be precisely adjusted by the motor drive, but under the FA mode, the lens is shifted manually and, therefore, it is difficult to adjust the lens with a preciseness as high as the motor drive. Then, at step No.245, first-pass flag FPF is reset to carry "0" and, thereafter, the program advances to step No.246. Contrary, if flag FPF is carrying "0", the program immediately advances to step No.246.

At step No.246, it is detected whether infocus flag IFF is carrying "1" or not. If infocus flag IFF is carrying "1", it is understood that the calculated value obtained through the calculation up to the previous cycle indicates that the lens is shifted to infocus zone. Thus, an average is taken between the calculated value $\Delta L_{n-1}$ in the previous cycle and the calculated value $\Delta L$ to obtain:

$$\Delta L_n = (\Delta L + \Delta L_{n-1})/2$$

at step No.247. Then, register IZR is stored with data Zw (>ZN2) representing the infocus zone (step No.248), followed by step No.250. In consideration of variation in the defocus amount determined in accordance with the measurement, the above operation is to widen the infocus zone once the lens is shifted into the infocus zone, so as to prevent the unstable display of infocus, particularly when the lens is shifted to a position adjacent to the border of the infocus zone at the inside thereof. Contrary, at step No.246, if infocus flag IFF is carrying "0", the measured amount $\Delta L$ in the present cycle is rendered as $\Delta L_n$ (step No.249), followed by step No.250 (FIG. 13c). At step No.250, it is detected whether or not $|\Delta L_n| < (IZR)$, that is whether the calculated value is within infocus zone or not. If it is within the infocus zone, infocus flag IFF is set to carry "1" (step No.251), and the infocus display is carried out by light emitting diode LD1 (step No.252). Then, the program advances to step No.258. If contrary it is outside the infocus zone, it is detected whether $\Delta L_n > 0$, or not (step No.253). If $\Delta L_n > 0$, light emitting diode LD0 is lit for the indication of the front focus. If $\Delta L_n < 0$, light emitting diode LD2 is lit for the indication of the rear focus. Then, infocus flag IFF is reset to carry "0", and data ZN2 is stored in register IZR. Then, the program goes to step No.258. At step No.258, it is detected whether input i14 is receiving HIGH. If it is receiving HIGH, indicating that the mode is changed to AF mode, flag FPF is set to carry "1", flag IFF is reset to carry "0", and flag LCF is reset to carry "0". Then, the program returns to step No.2. If it is receiving LOW indicating that the mode is still FA mode, the program immediately returns to step No.2, thereby starting the next measuring operation.

Figure 11A:
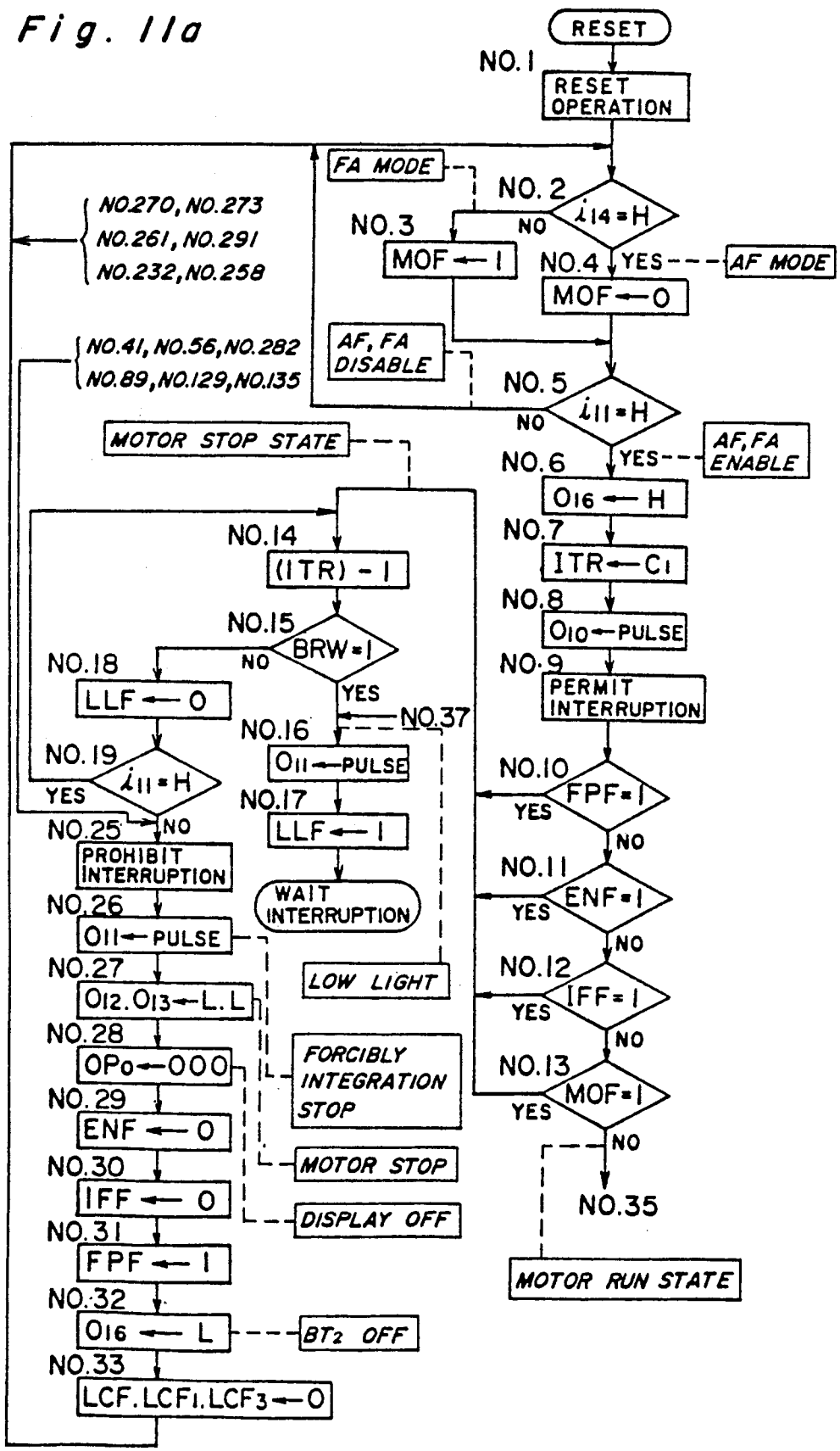
Figure 11B:
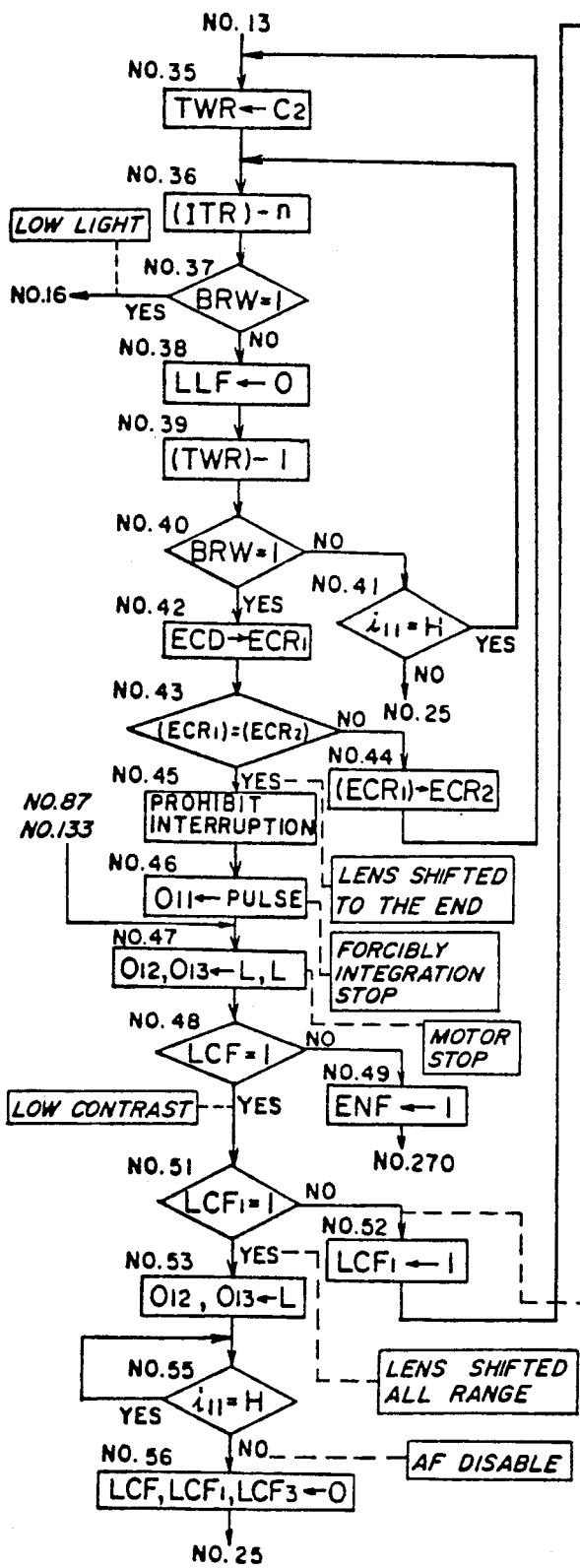
Figure 11B:
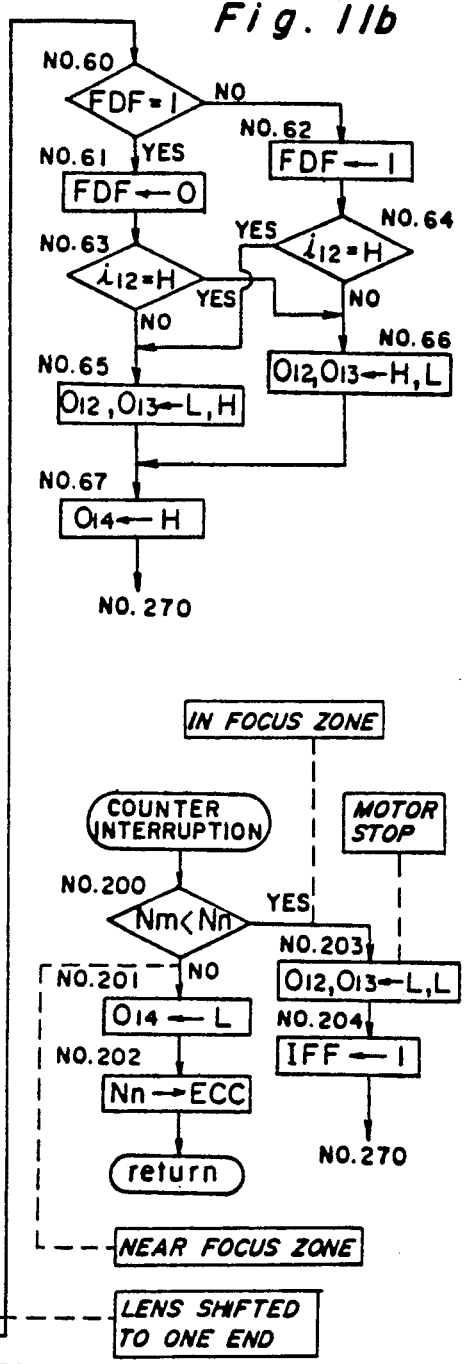

In the procedure through step No.25 to step No.33 in FIG. 11a, the operations for stopping the focus detection and setting initial condition are carried out. At step No.25, the interruptions are prohibited, and at step No.26, output 011 produces to forcibly stop the integration of CCD. 1 Then, outputs 012 and 013 produce LOW to stop motor MO (step No.27), and output port OP0 produces "000" to disable the light emitting diodes LD0, LD1 and LD2 (step No.28). Then, output 016 produces LOW to cut off power to power supply line VF (step No.32). And, flags ENF, IFF and LCF3 are all reset to carry "0", and flag FPF is set to carry "1" (step No.29 to step No.31, and step No.33). After the initial condition is set, the program returns to step No.2.

Figure 14:
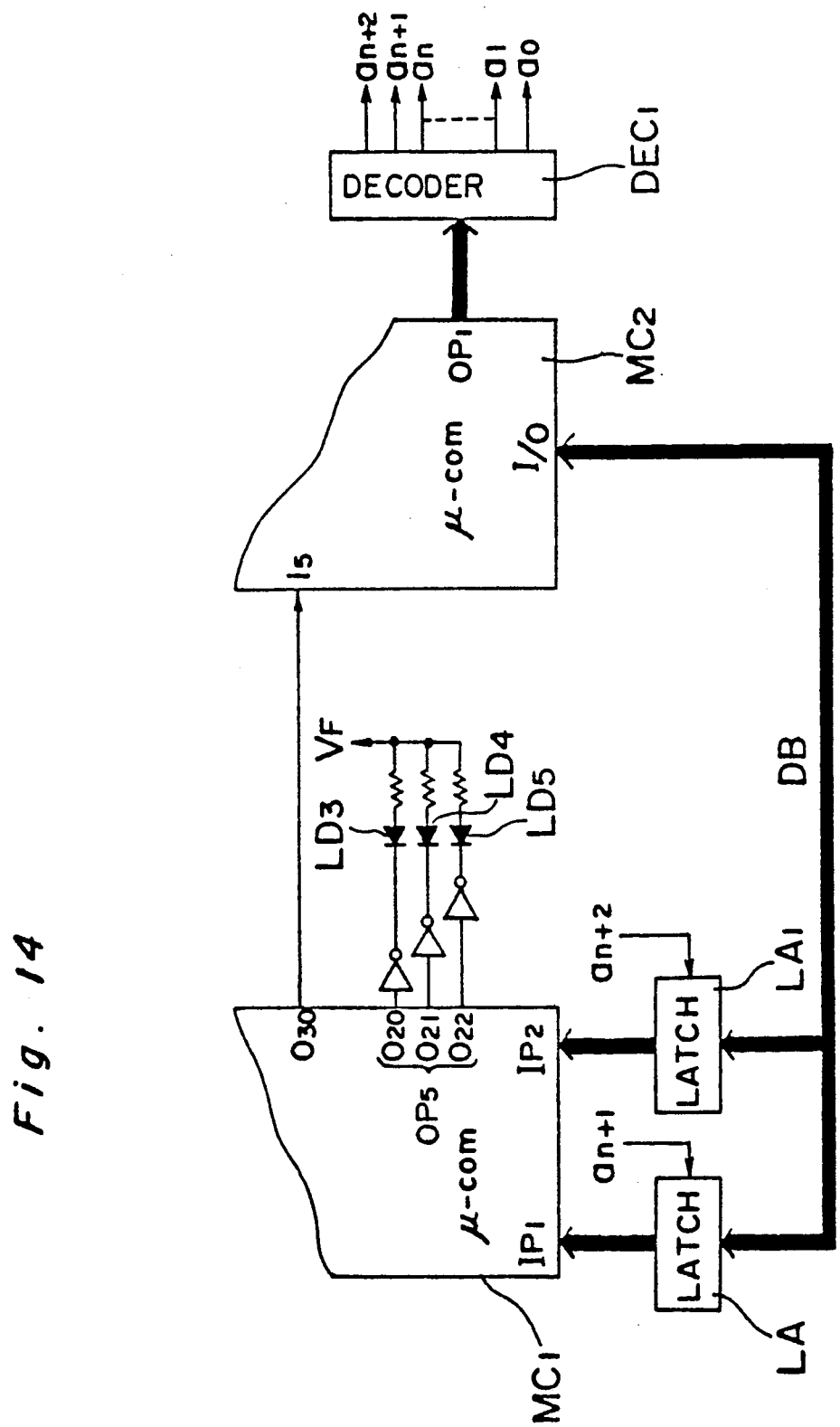
FIG. 14 is a fragmentary view of a circuit of FIG. 5, particularly showing a modification thereof.
Figure 15:
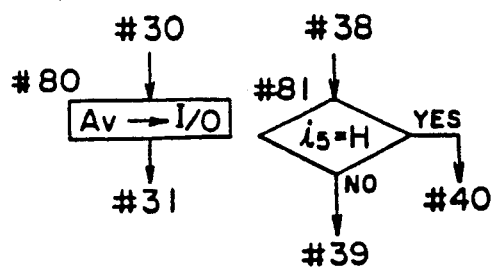
FIGS. 15 and 16 show flow charts to be effected in microcomputers MC2 and MC1, respectively, for the modification of FIG. 14.
Figure 16:
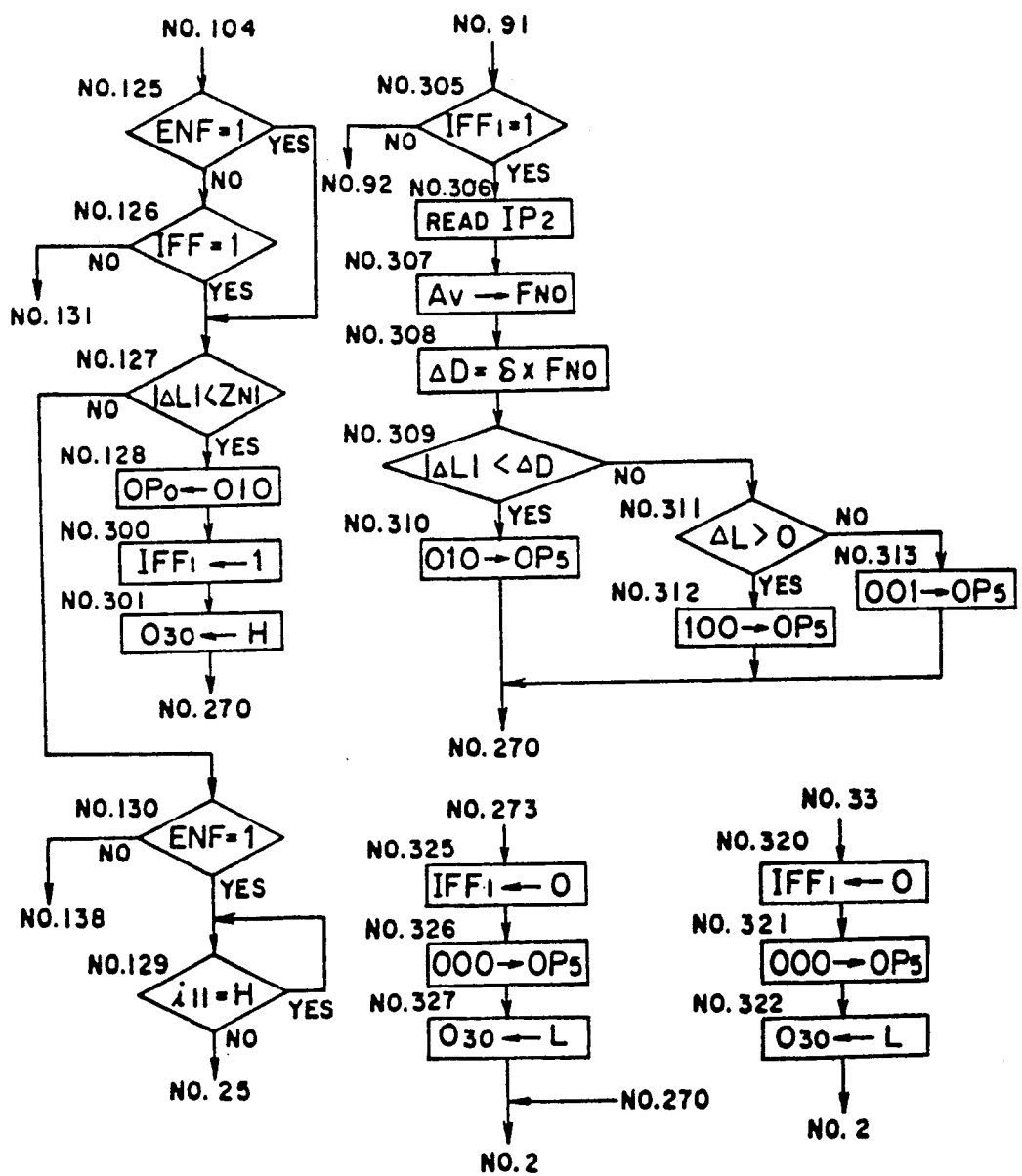

Next, a modification of the above described embodiment is given in connection with FIGS. 14, 15 and 16. According to this modification, when the main object is properly focused to be located within the infocus zone through a focus adjustment operation under AF mode, it is possible to detect whether a secondary object is also located with the depth of focus, or not. FIG. 14 is a fragmentary view of a circuit diagram showing only a portion which differs from the circuit diagram of FIG.

5. FIG. 15 is a flow chart showing only the steps which differ from the steps shown in FIG. 6c. And, FIG. 16 is a flow chart showing only the steps which differ from the steps shown in FIGS. 11a, 11c, 12a and 13d.

When it is detected at step No.127 that the lens is located within the infocus zone, a display indicating the infocus condition is effected at step No.128, flag IFF is set to carry "1" at step No.300, and output 030 of microcomputer MC1 produces HIGH at step No.301. The output 030 is connected to input i5 of microcomputer MC2. Thus, by the HIGH applied to input i5, the microcomputer MC2 detects that the lens is located within the infocus zone.

Then, the program for the microcomputer MC1 goes to step No.270, and if the mode is not changed to FA mode, the program returns back to step No.2 to again carry out the measuring. In this case, since flag IFF is carrying "1", the same procedure as in the case of focus proof is carried out and, thereafter, the program advances to step No.91. According to this modification, step No.91 is followed by detection step No.305 for detecting whether flag IFF1 is "1"or not. If not, the program goes to step No.92, but if flag IFF1 is carrying "1", the program goes to step No.306, at which data applied to input port IP2 are read in. As shown in FIG. 15, step #80 for producing an aperture value Av for the exposure control is provided between steps #30 and #31. This aperture value Av is latched in latch circuit LA1 in response to a pulse from output $a_{n+2}$ of decoder DEC. Therefore, input port IP2 receives data of aperture value for the exposure control.

The read-in data Av is converted from APEX numbering system to F-stop number (step No.307), and a calculation:

$$\Delta D = \delta \times (\text{F-stop number})$$

is carried out at step No.308. Here, $\delta$ is a data representing the permissible circle of confusion, and $\Delta D$ is a data representing the depth of focus. Next, the data $\Delta D$ and the defocus amount $|\Delta L|$ obtained at step No.91 of the present cycle of operation are compared with each other at step No.309, and then, the focus condition is displayed in a manner described below, and thereafter, the program goes to step No.270.

When $|\Delta L| \leq \Delta D$, which means that the measured portion of the object is located within the depth of focus, output port OP5 produces "010", thereby lighting light emitting diode LD4 for the indication of infocus. Contrary, if $|\Delta L| > \Delta D$, output port OP5 produces "100" to light light emitting diode LD3 for the indication of near focus, or output port OP5 produces "001" to light light emitting diode LD5 for the indication of far focus, depending on whether the data $\Delta L$ is positive or negative.

By the above operation, after adjusting the lens to infocus position under AF mode, it is possible to detect whether an object other than the object aimed at for the focus adjustment is located within depth of focus or is front or rear focused.

In the above described modification, the depth of focus is calculated with a high accuracy at step No.308. However, since it is difficult to exactly aim a desired spot for the light measuring, particularly when the camera is held by hands, and since the calculated amount $\Delta L$ varies during a number of cycle of operations, it is possible to widen the infocus zone in a manner similar to the operation under FA mode, or to widen the infocus zone once the lens is shifted to infocus zone, or to take an average after carrying out a number of cycle of operations. For example, in order to widen the infocus zone, a calculation:

$$\Delta D = I \times \delta \times FNo \ (I = 2 \sim 3)$$

is carried out.

Furthermore, according to the modification, further steps are added between steps No.33 and No.2 and between steps No.273 and No.2 so as to carry out the initial setting when the operation of microcomputer MC1 is to be stopped or when the mode is changed to FA mode. More specifically, after step No. 33 or No.273, flag IFF1 is reset to carry "0" (step No.320 or No.325), then output port OP5 produce "000" to disable light emitting diodes LD3, LD4, and LD5 (step No.321 or No.326), and thereafter, output 030 produces LOW (step No.322 or No.327).

Also, according to the modification, step #81 shown in FIG. 15 is provided to produce data representing Av from input and output port I/0, and in order to continue the display of focusing condition for a predetermined period of time even after the turn off of light measuring switch MES, step #81 for detecting whether input i5 is receiving HIGH or not is inserted between steps #38 and #39. More specifically, when light measuring switch MES is turned off and when it is detected that the present mode is AF mode, output 01 continues to produce HIGH, so long as input i5 is receiving HIGH to continue the operation of microcomputer MC1 for detecting whether it is within the depth of focus mentioned above.

Figure 17:
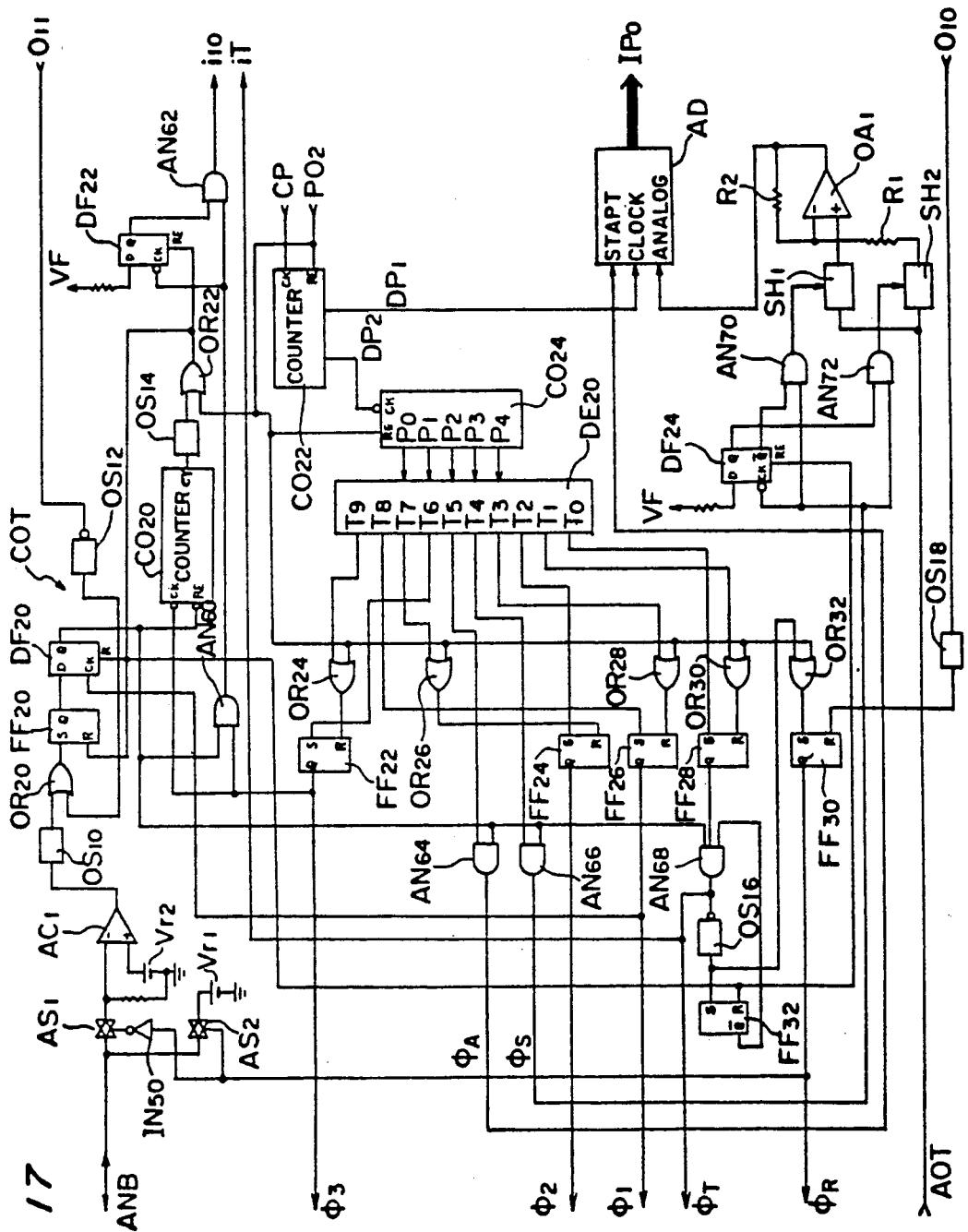
FIG. 17 shows a circuit diagram of control circuit COT controlled by microcomputer MC1.

Referring to FIG. 17, a detailed circuit diagram of control circuit COT for controlling CCD FLM is shown. Counter CO24 counts negative edges of pulses DP2, which are clock pulses CP frequency divided by counter CO22. In response to the signals produced from outputs p0 to p4 of counter CO24, decoder DE20 produces ten bit long binary signal from its output T0 to T9. The signals produced from counter CO24 and outputs from decoder DE20, flip-flops FF22, FF24, FF26 and FF28 are given in Table 6 below.

TABLE 6

| Counter CO24 | | | | | Decoder DE20 | | | | | | | | | | Flip-Flops | | | | | | | | | | |
|---|---|---|---|---|---|---|---|---|---|---|---|---|---|---|---|---|---|---|---|---|---|---|---|---|---|
| P0 | P1 | P2 | P3 | P4 | T0 | T1 | T2 | T3 | T4 | T5 | T6 | T7 | T8 | T9 | FF28 | FF26 | FF24 | FF22 | $\phi_1$ | $\phi_2$ | $\phi_3$ | $\phi_5$ | $\phi_4$ | $\phi_T$ |

TABLE 6-continued

| | | | | | | | | | | | | | | | | | |
|---|---|---|---|---|---|---|---|---|---|---|---|---|---|---|---|---|---|
| 0 | 0 | 0 | 0 | 0 | H | L | L | L | L | L | L | L | L | L | H | H | L | L |
| 0 | 0 | 0 | 0 | 1 | L | L | L | L | L | L | L | L | L | L | H | H | L | L |
| 0 | 0 | 0 | 1 | 0 | L | L | L | L | L | L | L | L | L | L | H | H | L | L |
| 0 | 0 | 0 | 1 | 1 | L | H | L | L | L | L | L | L | L | L | L | H | L | L |
| 0 | 0 | 1 | 0 | 0 | L | L | H | L | L | L | L | L | L | L | L | H | H | L |
| 0 | 0 | 1 | 0 | 1 | L | L | L | L | L | L | L | L | L | L | L | H | H | L |
| 0 | 0 | 1 | 1 | 0 | L | L | L | H | L | L | L | L | L | L | L | L | H | L |
| 0 | 0 | 1 | 1 | 1 | L | L | L | L | L | L | L | L | L | L | L | L | H | L |
| 0 | 1 | 0 | 0 | 0 | L | L | L | L | H | L | L | L | L | L | L | L | H | L |
| 0 | 1 | 0 | 0 | 1 | L | L | L | L | H | L | L | L | L | L | L | L | H | L |
| 0 | 1 | 0 | 1 | 0 | L | L | L | L | H | L | L | L | L | L | L | L | H | L |
| 0 | 1 | 0 | 1 | 1 | L | L | L | L | H | L | L | L | L | L | L | L | H | L |
| 0 | 1 | 1 | 0 | 0 | L | L | L | L | L | H | L | L | L | L | L | L | H | L |
| 0 | 1 | 1 | 0 | 1 | L | L | L | L | L | L | L | L | L | L | L | L | H | L |
| 0 | 1 | 1 | 1 | 0 | L | L | L | L | L | L | L | L | L | L | L | L | H | L |
| 0 | 1 | 1 | 1 | 1 | L | L | L | L | L | L | L | L | L | L | L | L | H | L |
| 1 | 0 | 0 | 0 | 0 | L | L | L | L | L | L | L | L | L | L | L | L | H | L |
| 1 | 0 | 0 | 0 | 1 | L | L | L | L | L | L | L | L | L | L | L | L | H | L |
| 1 | 0 | 0 | 1 | 0 | L | L | L | L | L | L | L | L | L | L | L | L | H | L |
| 1 | 0 | 0 | 1 | 1 | L | L | L | L | L | L | L | L | L | L | L | L | H | L |
| 1 | 0 | 1 | 0 | 0 | L | L | L | L | L | L | L | L | L | L | L | L | H | L |
| 1 | 0 | 1 | 0 | 1 | L | L | L | L | L | L | L | L | L | L | L | L | H | L |
| 1 | 0 | 1 | 1 | 0 | L | L | L | L | L | L | H | L | L | L | L | L | H | H |
| 1 | 0 | 1 | 1 | 1 | L | L | L | L | L | L | L | L | L | L | L | L | H | H |
| 1 | 1 | 0 | 0 | 0 | L | L | L | L | L | L | L | H | L | L | L | L | L | H |
| 1 | 1 | 0 | 0 | 1 | L | L | L | L | L | L | L | L | L | L | L | L | L | H |
| 1 | 1 | 0 | 1 | 0 | L | L | L | L | L | L | L | L | L | L | L | L | L | H |
| 1 | 1 | 0 | 1 | 1 | L | L | L | L | L | L | L | L | L | L | L | L | L | H |
| 1 | 1 | 1 | 0 | 0 | L | L | L | L | L | L | L | L | L | L | L | L | L | H |
| 1 | 1 | 1 | 0 | 1 | L | L | L | L | L | L | L | H | L | L | H | L | L | H |
| 1 | 1 | 1 | 1 | 0 | L | L | L | L | L | L | L | L | L | L | H | L | L | H |
| 1 | 1 | 1 | 1 | 1 | L | L | L | L | L | L | L | L | H | L | H | L | L | L |

As apparent from Table 6, Q output $\phi 1$ of flip-flop FF26 produces HIGH while counter 24 is producing "11101" to "00101", Q output $\phi 2$ of flip-flop FF24 produces HIGH while counter 24 is producing "00100" to "10111", and Q output $\phi 3$ of flip-flop FF22 produces HIGH while counter 24 is producing "10110" to "11110". The signals from these outputs $\phi 1$, $\phi 2$ and $\phi 3$ are applied to CCD FLM while power supply line VF is supplying power, so that the transmission of analog signal is continuously effected in the transmission gate. By this operation, the accumulated charge remaining in the transmission gate is discharged.

By the reset signal P02 from power-on reset circuit POR2 produced in response to the power supply, flip-flops FF20 to FF28, FF32, D flip-flops DF20, DF22 and DF24, and counters C020, C022 and C024 are reset. Furthermore, flip-flop FF30 is set to produce HIGH from its Q output $\phi R$. By the HIGH from Q output $\phi R$, analog switch AS2 turns on to supply output voltage from constant voltage source Vrl through lead line ANB to CCD FLM. The charge accumulation portion of CCD FLM is set to this voltage.

When microcomputer MC1 produces HIGH from its output 010 to start the integration operation, one-shot circuit OS18 produces a pulse which resets flip-flop FF30. Accordingly, Q output $\phi R$ produces LOW. Thus, CCD FLM starts to accumulate charge corresponding to the amount of light received by each light receiving element. Also, through inverter IN50, analog switch AS1 conducts to transmit monitor output of CCD FLM from terminal ANB to the inverting input of comparator AC1. In accordance with the accumulated charge, CCD monitor output from terminal ANB drops from constant voltage Vrl, and when it reaches a constant voltage from constant voltage source Vr2, comparator AC1 produces HIGH. In response to this, it is detected that the charge in CCD FLM has completed. By the HIGH from comparator AC1, one-shot circuit OS10 produces HIGH, which is applied through OR gate OR20 to flip-flop FF20. Thus, flip-flop FF20 is set, thereby producing HIGH from its Q output. This HIGH is taken into D flip-flop DF20 in response to the positive edge of HIGH produced from the Q output (output $\phi 1$) of flip-flop FF26, thereby producing HIGH from the Q output of D flip-flop DF20. By this HIGH, the reset condition of counter C020 is released and, AND gates AN60, AN64, AN66 and AN68 are enabled.

When output T0 produced HIGH after the output $\phi 1$ produces HIGH, flip-flop FF28 is set by the HIGH from output T0, and is reset by the HIGH from output T1. The Q output of flip-flop FF28 is connected through AND gate AN68 to output $\phi T$, thereby producing a HIGH pulse to CCD FLM. By this HIGH pulse, the accumulated charge is transmitted to the transfer gate. Furthermore, the signal appearing at the output $\phi T$ is applied to interruption terminal iT, whereby the microcomputer MC1 carries out the data reading of data from CCD FLM in a manner described above.

When the signal from output $\phi T$ steps down to LOW, one shot circuit OS16 produces HIGH, thereby setting flip-flop FF32. Thus, flip-flop FF32 produces LOW from its Q terminal. Thus, AND gate AN68 is disabled to cut off any further HIGH signal from Q output of flip-flop FF28. Furthermore, through one-shot circuit OS16 and OR gate OR32, flip-flop FF30 is set, thereby again producing HIGH from output $\phi R$.

By the transfer signals from outputs φ1, φ2 and φ3, the accumulated charges from CCD FLM are sequentially produced from output AOT. The accumulated charges are produced while output φ2 is producing HIGH. When D flip-flop DF20 produces HIGH from its Q output and while output φ2 is producing HIGH, AND gate AN66 produces output signal φS for the sample/hold in response to HIGH from terminal T4 and AND gate AN64 produces output signal φA for the A-D conversion start in response to HIGH from terminal T5.

The first signal of accumulated charge which is transferred from terminal AOT of CCD FLM is used for off-set adjustment, wherein a charge corresponding to the leakage of light receiving portion is charged. This charge is approximately equal to the voltage Vrl. In this instance, since Q output of D flip-flop DF24 is producing HIGH, sample/hold signal φS is applied through AND gate AN70 to sample/hold circuit SH1, thereby storing the voltage for off-set adjustment from CCD FLM, through terminal AOT, in sample/hold circuit SH1. In response to the negative edge of the first sample/hold signal φS, Q output of D flip-flop DF24 produces HIGH. The subsequent sample/hold signals φS are applied through AND gate AN72 to sample/hold circuit SH2, thereby sequentially memorizing in the sample/hold circuit SH2 the voltages corresponding to the amount of light received by light receiving elements thereafter.

When the Q output of D flip-flop DF20 produces HIGH, the signal φ3 is applied through AND gate AN60 to one input of AND gate AN62. In response to the first negative edge of the signal φ3, D flip-flop DF22 produces HIGH from its Q output. Accordingly, the pulse signals φ3 occurring after the first one are applied to input i10 of microcomputer MC1 through AND gate AN62, thereby commanding the microcomputer MC1 to read in the data through input port IP0. At this moment, the reason for producing HIGH from Q output of D flip-flop DF20 to prevent the first pulse signal φ3 from being produced from AND gate AN60 through AND gate AN62 is because that the first data from CCD FLM is for the off-set adjustment, as mentioned above. The pulse signal φ3 is also applied to a clock input terminal of counter C020. Accordingly, after the release of reset condition by the HIGH from Q output of D flip-flop DF20, counter C020 counts in response to the negative edges of pulse signals φ3. When counter C020 counts the pulse signals φ3 for the number corresponding to the number of light receiving elements in CCD FLM, it produces HIGH from its carry terminal CY.

After the first pulse signal φ3, output data from CCD FLM are sampled in response to pulse signals φ3. Then, by a subtraction circuit defined by registers R1 and R2 and operational amplifier OA1, a difference between outputs from sample/hold circuits SH1 and SH2 is calculated. The calculated difference is applied to an analog input of A-D converter AD. The A-D converter AD starts its operation in response to the signal φA, and in accordance with clock pulses DP1 from counter C022, it carries out the A-D conversion of the input data. When it is assumed that the voltage from constant voltage source Vrl is Vrl, the voltage drop caused by the leakage is Vd, and voltage drop by the received light amount is Vl, the output from sample/hold circuit SH1 can be given as:

$$Vrl - Vd,$$

and the output from sample/hold circuit SH2 can be given as:

$$Vrl - Vl - Vd.$$

Accordingly, the signal produced from the subtraction circuit has only the term Vl representing the received light amount. Preferably, A-D converter AD is capable of carrying out the A-D conversion at a high speed, such as a successive approximation A-D converter.

When all the data from CCD FLM are converted to digital form by A-D converter AD, counter C020 produces HIGH from its carry terminal CY. Accordingly, the HIGH is transmitted through one-shot circuit OS14 and OR gate OR22, flip-flops FF20 and FF32 and D flip-flops DF20, DF22 and DF24 are reset. Thus, D flip-flop DF20 produces LOW from its Q output, thereby holding counter C020 in reset condition. Thus, a condition, which is the same as that before producing HIGH from output 010, is established.

Also, when it is detected that a timer in microcomputer MC1 counts a predetermined integration time, output 011 produces a HIGH pulse. In response to the negative edge of this HIGH pulse applied through one-shot circuit OS12 and OR gate OR20, flip-flop FF20 is reset. Accordingly, an operation, which is the same as the case when comparator AC1 produces HIGH, is carried out to A-D convert the output data from CCD FLM, and the converted data are sequentially applied to input port IP0 of microcomputer MC1.

Figure 18:
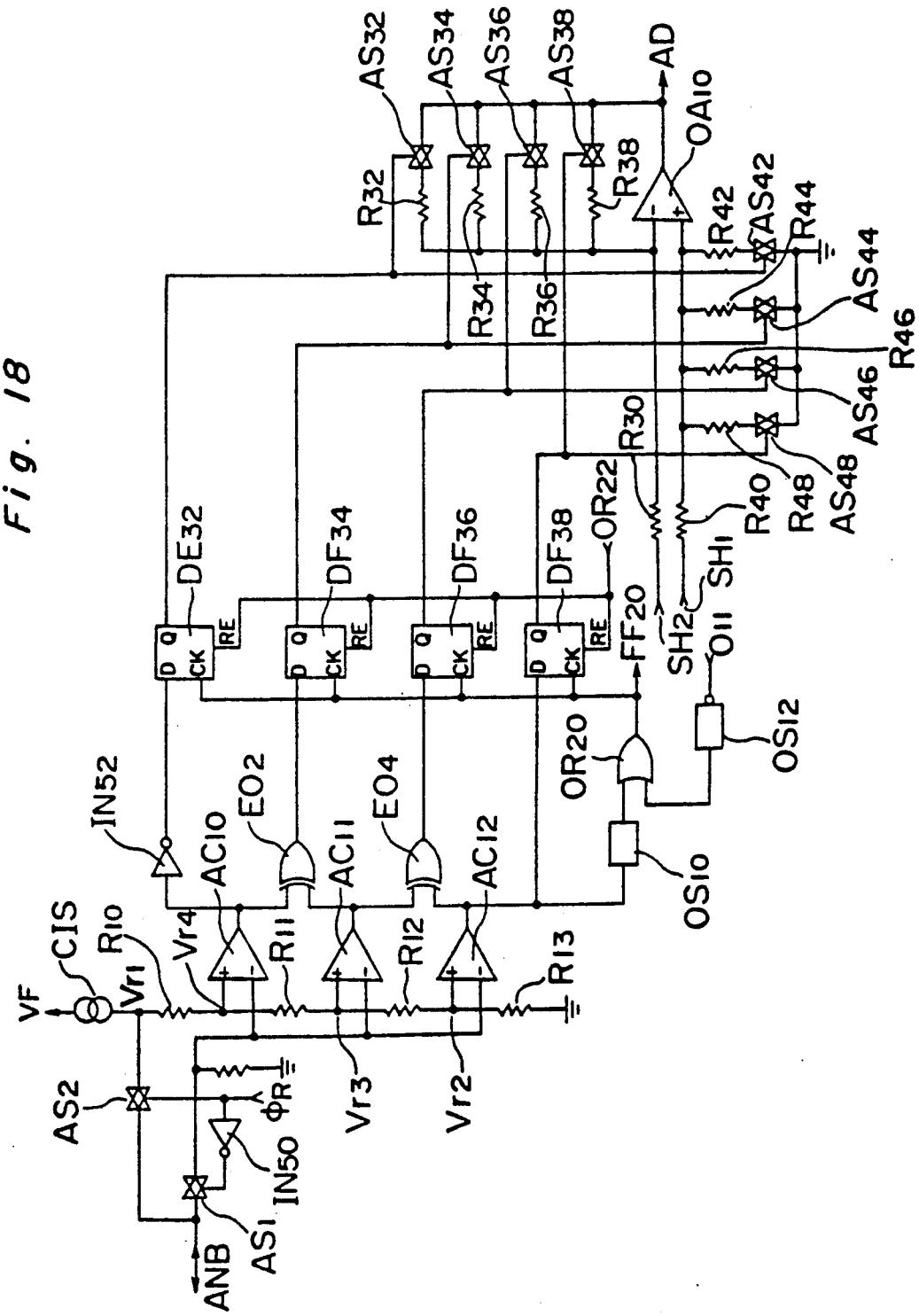
FIG. 18 is a fragmentary view of a circuit of FIG. 17, particularly showing a modification thereof.

Referring to FIG. 18, a modification of control circuit COT of FIG. 17 is shown. According to the previous embodiment, in the case where output data from CCD is small, it is doubled after it is read in microcomputer MC1 in terms of software (FIG. 11c, steps No.78 to No.82) in microcomputer MC1. But, according to this modification, it is doubled in terms of hardware before it is A-D converted.

While output φR is producing HIGH, a voltage Vrl determined by constant current source CIS and resistors R10 to R13 is applied to CCD FLM, and while it is producing LOW, monitor output of CCD FLM is applied to inverting inputs of comparators AC10 to AC12. Then, when integration proceeds to cause the monitor output reach voltage Vr2, comparator AC12 produces HIGH, thereby producing a HIGH pulse from one-shot circuit OS10. By this HIGH pulse applied through OR gate OR20, flip-flop FF20 is reset and, thereafter, the same operation as described above is carried out.

Furthermore, this pulse is also applied to the clock terminals of D flip-flops DF32 to DF38. In this case, since comparator AC12 is producing HIGH, Q output of D flip-flop DF38 produces HIGH, thereby turning analog switches AS48 and AS38 on. The resistances of resistors R30 to R40 are as follows:

$$R30 = R40 = R38 = R48 = \frac{R36}{1.5} = \frac{R46}{1.5} = \frac{R34}{2} = \frac{R44}{2} = \frac{R32}{2.5} = \frac{R42}{2.5}.$$

By the turn on of analog switches AS38 and AS48 and since resistors R30, R40, R38 and R48 have the same resistance, operational amplifier OA10 produces a signal Vl without any change.

Contrary, when the object is so dark that comparator AC12 produces no HIGH signal during the maximum integration time, microcomputer MC1 produces HIGH from output 011, which is applied to one-shot circuit OS12 and further to OR gate OR20. In this case, depending on which one of the ranges Vr2-Vr3, Vr3-Vr4 and Vr4-Vrl does the monitor output falls, one of EXCLUSIVE OR gates E02 and E04 and inverter IN52 produces HIGH, thereby producing HIGH from Q output of one of D flip-flops DF32, DF34 and DF36. Accordingly, one pair of analog switch pairs: AS36 and AS46; AS34 and AS44; and AS32 and AS42, is turned on. Thus, the integration operation is forcibly stopped and in accordance with the monitor output level at that moment, operational amplifier OA10 produces either one of 1.5V1, 2V1 or 2.5V1.

Figure 19:
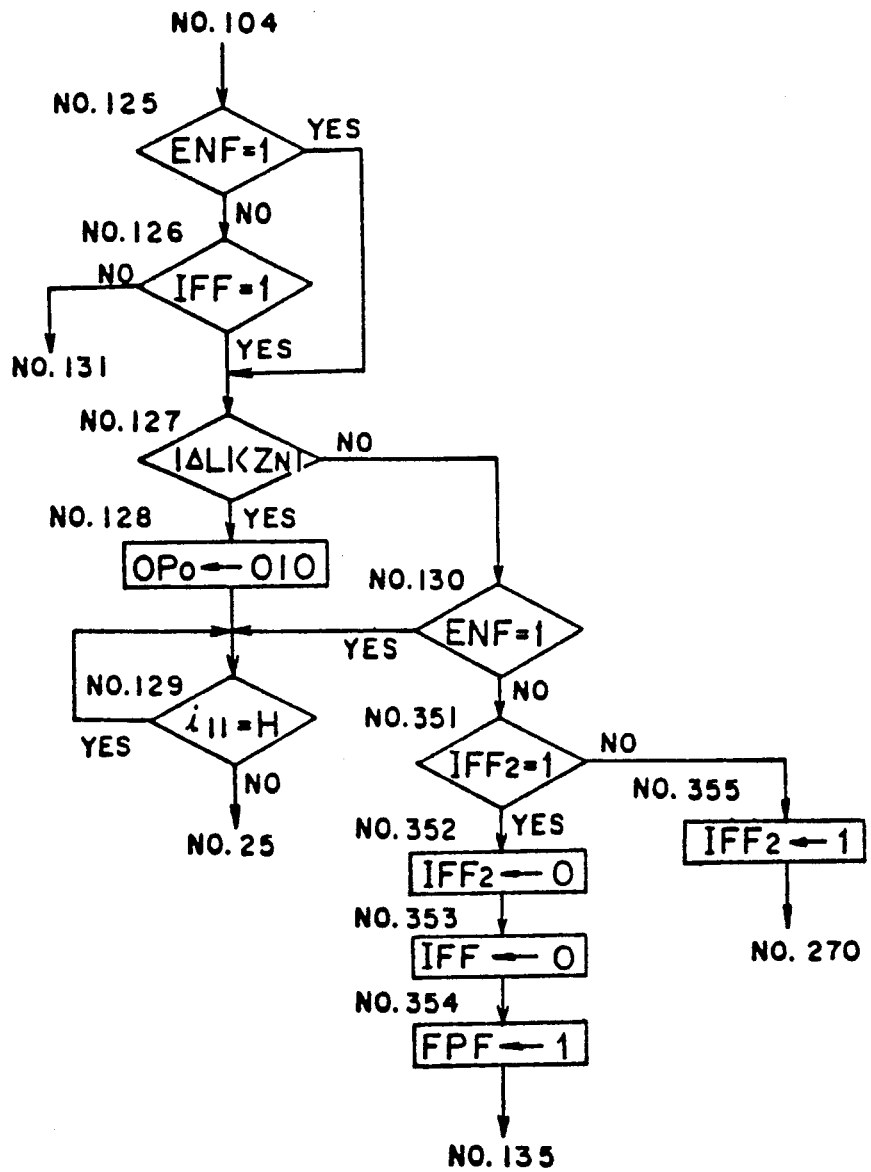
FIG. 19 show a part of flow chart carried out by a microcomputer MC1 according to a modification.
Figure 19:
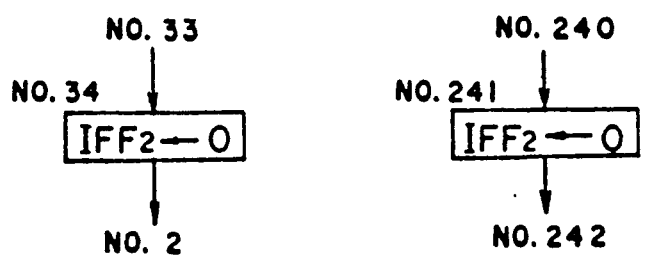

Next, a variation of operation flow of microcomputer MC1 described above in connection with FIGS. 11a to 13d is described. Referring to FIG. 19, only parts of the flow which are different from the above described flow are shown. This variation is directed to a case in which a number of out-of-focus detections are repeated consecutively after a detection of in focus. Between steps No.130 and No.138 (FIG. 12a), steps related to flag IFF are inserted. More specifically, when lens is so adjusted as to be shifted to infocus zone, and end flag ENF is carrying "0" (step No.130), it is detected at step No. flag IFF2 is carrying "1" or not. If it is detected that flag IFF2 is carrying "0", this flag IFF2 is set to carry "1" and, thereafter, the program advances to step No.270 to carry out the measuring operation again for the proof. Contrary, if flag IFF2 is carrying "1", which means that the measuring operation for the proof resulted out-of-focus ($|\Delta L| \geq ZN1$) for two consecutive times, flags IFF and IFF2 are reset to carry "0", and flag FPF is set to carry "1" and, thereafter, the program advances to step No.135, thereby carrying out the focus adjustment operation again. Between steps No.33 and No.2, and between steps No.240 and No.242, a step (step No.34 or No.241) is provided to reset flag IFF2 to initialize it.

Figure 11C:
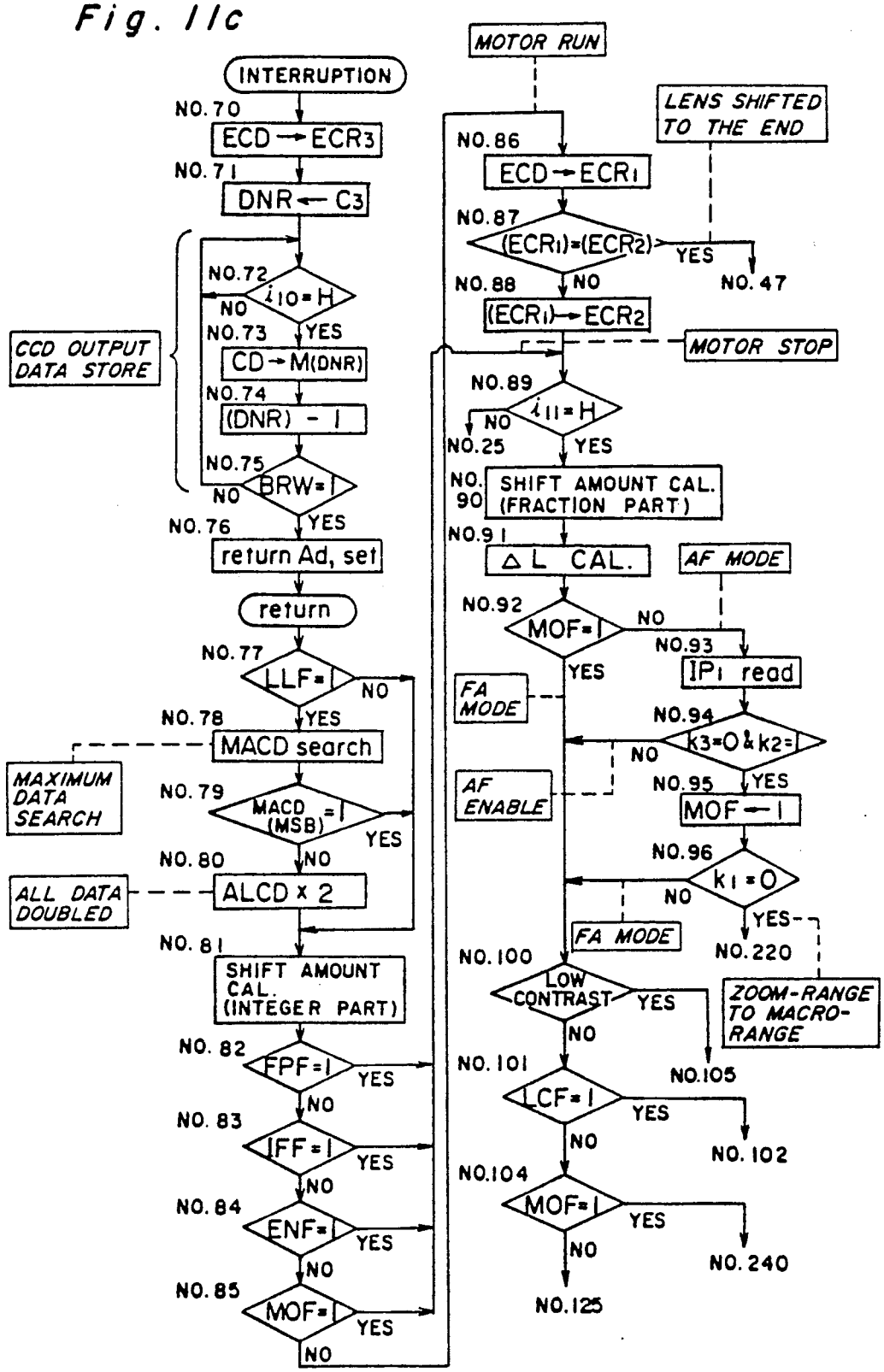
Figure 20:
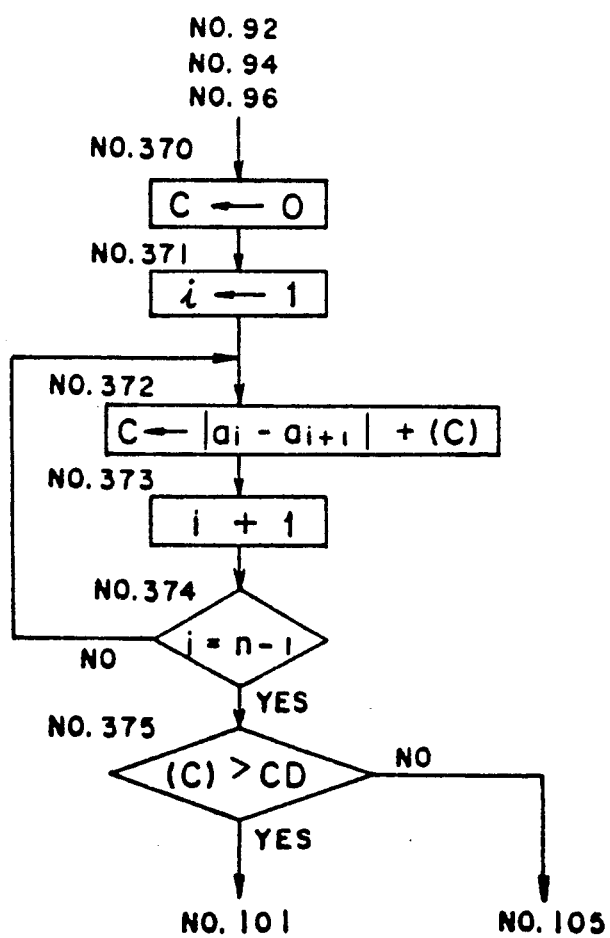
FIG. 20 is a flow chart showing a detail of step No.100 of microcomputer MC1 shown in FIG. 11c.

Referring to FIG. 20, a detail of step No.100 shown in FIG. 11c, which is for detecting whether the aimed object has a low contrast or not, is shown. At step No.370, the content of register C is made "0". Then, "1" is set in register i (step No.371). Thereafter, an absolute of a difference between output $a_i$ from ith light receiving element and output $a_{i+1}$ from i+1th light receiving element, i.e., $|a_i - a_{i+1}|$ is added to the contents of register C, and the added result is stored in register C (step No.372). Then, "1" is added to the contents of register i (step No.373), and at next step No.374, the contents of register i is compared with n (n is equal to the total number of light receiving elements.). If $i < n-1$, the program goes to step No.372 so as to add up the absolute differences one after another. Then, when it becomes $i = n-1$, the program goes to step No.375. At step No.375, the contents of register C is equal to:

$$|a_1-a_2|+|a_2-a_3|+|a_3-a_4|+\ldots+|a_{n-2}-a_{n-1}|+|a_{n-1}-a_n|$$

which indicates the contrast of the object, as understood to those skilled in the art. At step No.375, it is detected whether the contents of register C is greater than a predetermined value CD or not. If (C)>CD, which means that the contrast is above a predetermined level, the program goes to step No.101. Contrary, if (C)≦CD, which means that the contrast is below the predetermined level, the program goes to step No.105.

In the case where the focus detection is carried out by the use of light receiving elements arranged in two arrays, the detection of contrast can be done with output signals only from one of the two arrays. Also, in the case where the data representing the contrast is obtained in the process for calculating the defocus amount and the direction of defocus, the contrast data is stored during the calculation. The contrast level is detected by a detection whether or not the stored data is within a predetermined level.

The conversion coefficient data KD produced from an interchangeable lens is read in microcomputer MC1 through microcomputer MC2 at step No.93 and, for example, it is used for the calculation of data N for driving the motor at step No.136. The data KD can be divided into two parts, in a manner described above in connection with Table 5, first part representing the floating point coefficient and the second part representing the significant digit. The above calculation is carried out by shifting the floating point of the significant digit in the second part in accordance with the floating point coefficient in the first part.

Figure 1:
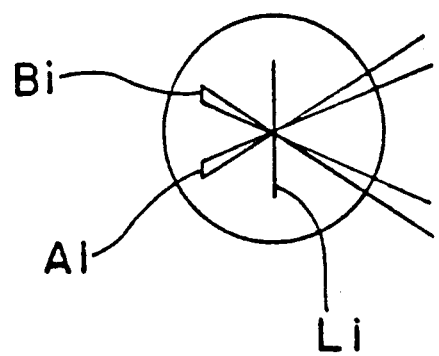
FIG. 1 is a diagrammatic view of an optical arrangement of a focus detecting device according to the prior art.
Figure 3:
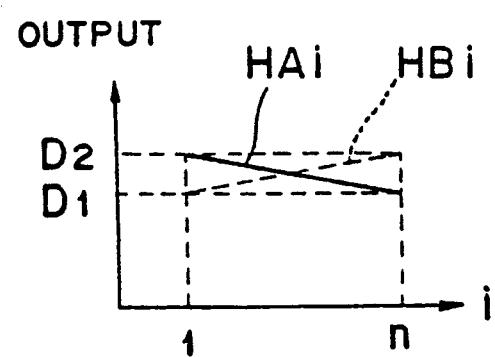
FIG. 3 is a graph showing a relationship between outputs from two light receiving arrays Ai and Bi shown in FIG. 1.
Figure 2:
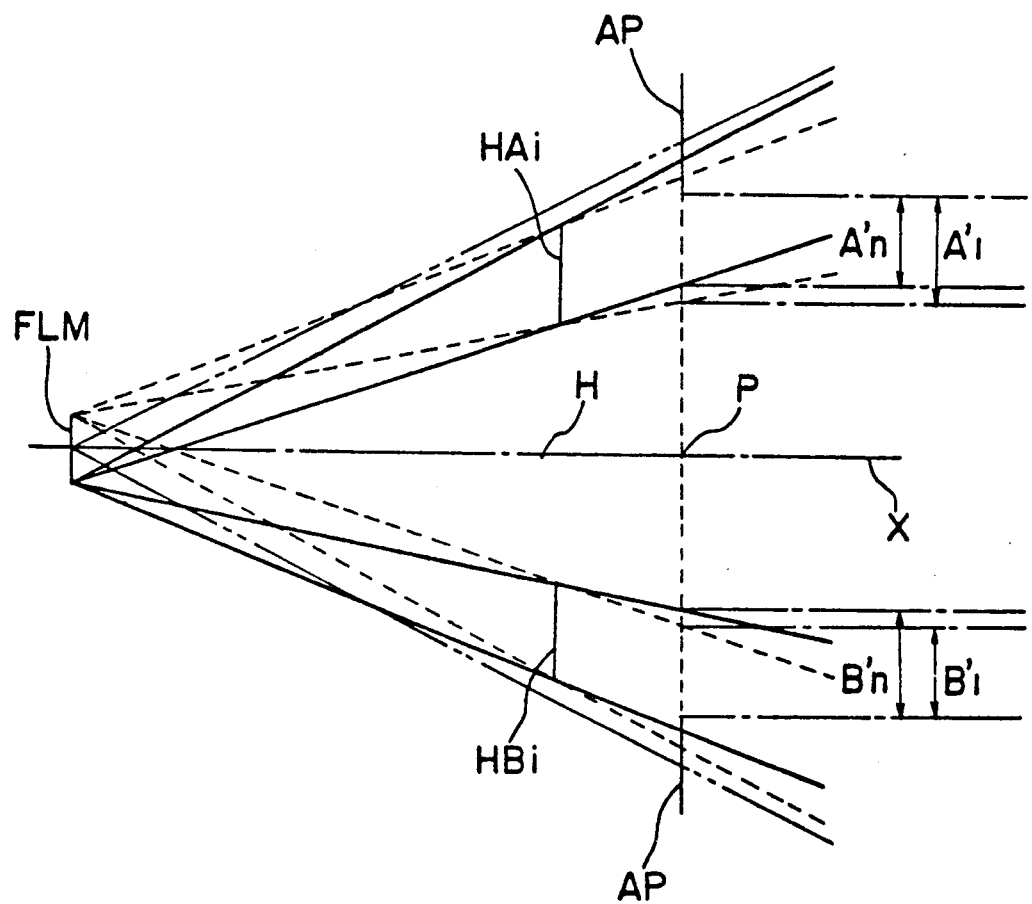
FIG. 2 is a diagrammatic view of an optical relationship between the focus detecting device of FIG. 1 and an interchangeable lens mounted on the camera.

FIGS. 1, 2 and 3 give a detailed explanation of a prior art optical system for the focus detection. Such an optical system, as it is, is incorporated in the embodiment of the present invention as a part thereof. Therefore, the following description should be considered as an explanation of a part of the embodiment of the present invention, and as an explanation of a problem which the optical system involves by itself.

An optical system for the focus detection employed in the prior art focus detection device includes a focus detection light receptor FLM comprising an array of n-number of light receiving elements, each of said light receiving elements being constituted, as shown in FIG. 1, by a unitary structure of miniature lens Li and two light receiving elements Ai and Bi positioned rearwardly of the miniature lens Li. (It is to be noted that the character "i" affixed to each alphabetic reference character represents the number 1 to n.) FIG. 2 illustrates the relationship between the focus detecting optical system of the light receptor FLM and the photo-taking optical system of an interchangeable lens assembly. In FIG. 2, the point H depicted on the optical axis X represents the position at which images of the respective light receiving elements are formed by the respective miniature lens Li, and the solid lines HAi and HBi represent respective images corresponding to the images of the light receiving elements Ai and Bi. The position and the size of each of the images HAi and HBi are exclusively determined by the structure of the light receptor FLM. On the other hand, the broken line P represents an exit pupil corresponding to the image of an aperture AP at the smallest f-stop number in the interchangeable lens assembly, and the position and the diameter of the pupil change with the type of interchangeable lens assembly (e.g., a wide-angle, standard or telephoto lens assembly) and/or change in focal length of the lens assembly if the latter is a zoom lens assembly. Accordingly, depending on the type of the lens assembly mounted on the body of a photographic camera, it will happen that the incident beam of light rays falling on any one of the light receiving elements A1 to An will not be uniform with that falling on the associated light receiving elements B1 to Bn because of the vignetting of the lens assembly, as will be described later, and therefore the reliability of the result of the focus detection will be reduced. By way of example, as shown in FIG. 2, if the point H is located closer to the light receptor FLM than to the position of the pupil and respective portions of the images formed by projecting the images HA and HB on the plane of the exit pupil protrude outwards from the exit pupil (Hereinafter, an aperture corresponding to the outer perimeter of these projected images will be referred to as "critical aperture".), a beam of light rays from a region Al' and a beam of light rays from a region An' fall respectively on the light receiving element Al and the light receiving element An and, as is clear from FIG. 2, Al'>An'. On the other hand, the light receiving elements Bl and Bn receive a beam of light rays from a region Bl' and that from a region Bn' and Bl'<Bn'. If, for the purpose of simplification, the brightness of a target object to which the distance is desired to be measured is uniform, outputs from the light receiving elements Ai and Bi vary in a manner as shown in FIG. 3, and therefore it is not possible to determine the accurate correlation in phase difference between these outputs from the light receiving elements. In other words, where the full aperture is smaller than the critical aperture, even if data concerning the amount of deviation of the position, where the image of the target object is formed, relative to the position of an expected focus are obtained from these outputs, the result would be an erroneous detection of the focused condition. A similar description may equally apply even where the point H and the exit pupil are reversed in position with respect to each other.

As has been explained above, the optical system is of a nature that a required focus detection may not be correctly carried out when the fully open aperture size of an attached interchangeable objective lens is smaller than a predetermined size. According to the above explanation, it is believed that the reason why the improvement made by the present invention in adopting the optical system in the embodiment is needed is fully understood.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. In a camera system capable of focus detecting, an interchangeable lens unit attachable to a camera body, comprising:
    a focus adjustable optical system through which the focus detection is effected to detect a focusing degree of the optical system;
    means for adjusting the focus of the optical system, including a movable member connectable with the camera body to receive a driving power for the focus adjustment from the camera body, and
    means for producing a digital data indicative of a converting information for converting the defocusing degree of said optical system into a degree of movement of the movable member, the converting information being intrinsic to the interchangeable lens unit.

2. In a camera system capable of focus detection, an interchangeable lens unit attachable to a camera body, comprising:
    a focus adjustable optical system through which the focus detection is carried out;
    means for adjusting the focus of the optical system including a movable member under a control of the camera body, and
    means for providing converting information necessary for the camera body to control the movable member in accordance with a result of the focus detection, wherein the converting information is intrinsic to the interchangeable lens unit and formed as digital data composed of m-bit of significant digits part and n-bit of exponent digits part.

3. A camera system comprising:
    a camera body;
    an interchangeable lens unit attachable to the camera body and having an optical system for forming an image of an object and a movable member for focus adjustment of the optical system;
    light receiving means for receiving light from the object through the optical system to produce an electrical signal representative of the image of the object;
    processing means for processing the electrical signal to produce defocusing data indicative of the defocusing degree and defocusing direction of the image of the object with respect to a predetermined focal plane;
    drive means for moving the movable member;
    means for converting the defocusing degree into an amount of drive of said driving means necessary for the movable member to bring the optical system into an in-focus condition, and
    means for providing converting information necessary for the conversion as digital data composed of m-bit significant digits part and n-bit of exponent digits part.

4. A camera system comprising:
    a camera body;
    an interchangeable lens unit attachable to the camera body and having an optical system for forming an image of an object and a movable member movable for focus adjustment of the optical system;
    means, located in the interchangeable lens unit, for producing a first converting data necessary for causing the image of the object to move relative to a predetermined focal plane by a unit amount in response to a unit amount movement of the movable member;
    light receiving means for receiving light from the object through the optical system to produce an electrical signal representative of the image of the object;
    processing means for processing the electrical signal to produce defocusing data indicative of defocusing degree and defocusing direction of the image of the object with respect to the predetermined focal plane;
    drive means located in the camera body and drivable for moving the movable member;
    transmission means, located in the camera body, for transmitting the driving power of the driving means to the movable member;
    means, located in the camera body, for producing a second converting data necessary for causing the movable member to move by the unit amount in response to a unit amount drive of the driving means, and
    means, located in the camera body, for calculating the amount of drive of the drive means in accordance with the defocusing degree and the first and second converting data.

* * * * *

UNITED STATES PATENT AND TRADEMARK OFFICE
CERTIFICATE OF CORRECTION

PATENT NO. : 5,142,318

DATED : August 25, 1992

INVENTOR(S) : Nobuyuki Taniguchi et al.

It is certified that error appears in the above-identified patent and that said Letters Patent is hereby corrected as shown below:

On the title page, insert --[*] Notice: The portion of the term of this patent subsequent to April 9, 2002, has been disclaimed--.

Signed and Sealed this

Twenty-first Day of September, 1993

Attest:

BRUCE LEHMAN

*Attesting Officer*  *Commissioner of Patents and Trademarks*